(12) United States Patent
Fukui et al.

(10) Patent No.: US 7,992,791 B2
(45) Date of Patent: Aug. 9, 2011

(54) RFID TAG LABEL PRODUCING APPARATUS WITH PRINTING AND DATA TRANSMISSION DEFECT DETECTION

(75) Inventors: Tomoyasu Fukui, Inuyama (JP); Tsuyoshi Ohashi, Hashima (JP)

(73) Assignee: Brother Kogyo Kabushiki Kaisha, Nagoya-Shi, Aichi (JP)

( * ) Notice: Subject to any disclaimer, the term of this patent is extended or adjusted under 35 U.S.C. 154(b) by 69 days.

(21) Appl. No.: 12/308,147

(22) PCT Filed: Jun. 7, 2007

(86) PCT No.: PCT/JP2007/061584
§ 371 (c)(1), (2), (4) Date: Dec. 5, 2008

(87) PCT Pub. No.: WO2008/004401
PCT Pub. Date: Jan. 10, 2008

(65) Prior Publication Data
US 2009/0319072 A1    Dec. 24, 2009

(30) Foreign Application Priority Data
Jun. 8, 2006   (JP) .................................. 2006-159963

(51) Int. Cl.
*G06K 19/06* (2006.01)
*G06K 19/00* (2006.01)
(52) U.S. Cl. ........................................ 235/492; 235/487
(58) Field of Classification Search .................. 235/487, 235/492; 340/10, 572
See application file for complete search history.

(56) References Cited

U.S. PATENT DOCUMENTS

| | | | |
|---|---|---|---|
| 4,587,411 A * | 5/1986 | Obstfelder et al. | 235/437 |
| 6,593,853 B1 * | 7/2003 | Barrett et al. | 340/572.1 |
| 7,636,044 B1 * | 12/2009 | Callaghan | 340/568.1 |
| 2005/0058483 A1 * | 3/2005 | Chapman et al. | 400/76 |
| 2006/0061613 A1 * | 3/2006 | Fienup et al. | 347/19 |
| 2006/0126918 A1 * | 6/2006 | Oohashi et al. | 382/153 |
| 2006/0202800 A1 | 9/2006 | Ohashi | |

FOREIGN PATENT DOCUMENTS

| | | |
|---|---|---|
| JP | A-2003-150914 | 11/2001 |
| JP | A-2003-208573 | 1/2002 |
| JP | A-2004-82432 | 3/2004 |
| WO | 2005/028203 | 3/2005 |
| WO | WO2005/053180 | 6/2005 |

* cited by examiner

*Primary Examiner* — Daniel A Hess
*Assistant Examiner* — Matthew Mikels
(74) *Attorney, Agent, or Firm* — Day Pitney LLP

(57) ABSTRACT

This disclosure discloses a tag label producing apparatus comprising: a printing device; a transmitting/receiving device that performs information transmission/reception; a feeding device that feeds said tag medium; a coordination control portion; a communication determining portion that determines whether or not information transmission/reception has succeeded; and a decision portion that decides a feeding-stop condition for stopping feeding based on a feeding condition for the transmission/reception, and a feeding-condition for printing to a print area; wherein: said coordination control portion controls in coordination operations of said feeding device, said transmitting/receiving device, and said printing device so as to stop feeding based on said feeding-stop condition decided by said decision portion and to perform retry of said information transmission/reception when said communication determining portion determines that said information transmission/reception has failed.

18 Claims, 34 Drawing Sheets

OVERALL SCORES

| PRINTED CHARACTERS \ AREA | A | B | C |
|---|---|---|---|
| WHITE SOLID | 2.0 | 1.7 | 1.4 |
| BLACK SOLID | 1.7 | 1.4 | 1.1 |
| HORIZONTAL LINE | 1.5 | 1.2 | 0.9 |
| DIAGONAL/VERTICAL LINE | 1.3 | 1.0 | 0.7 |

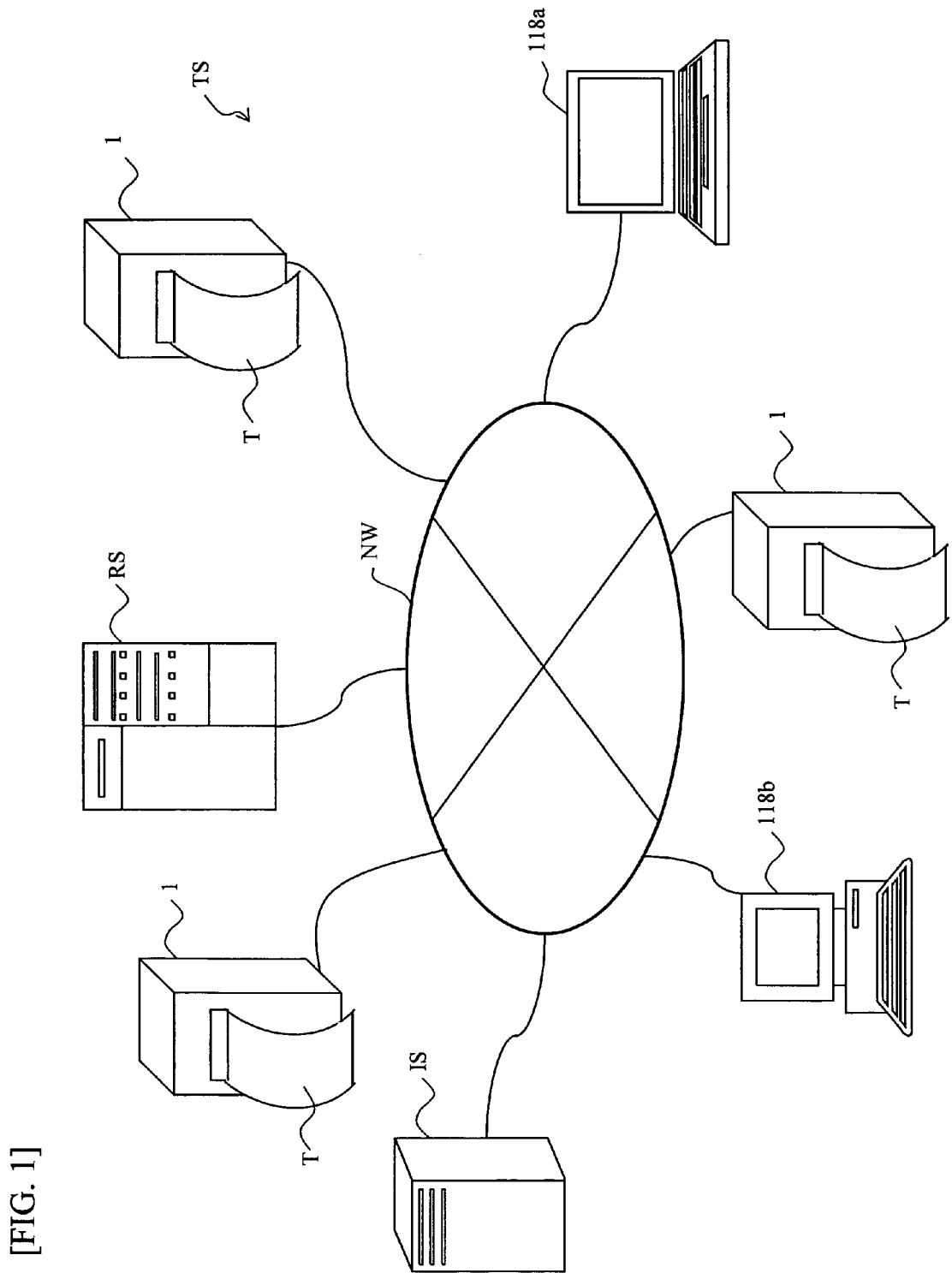
[FIG. 1]

[FIG. 2]
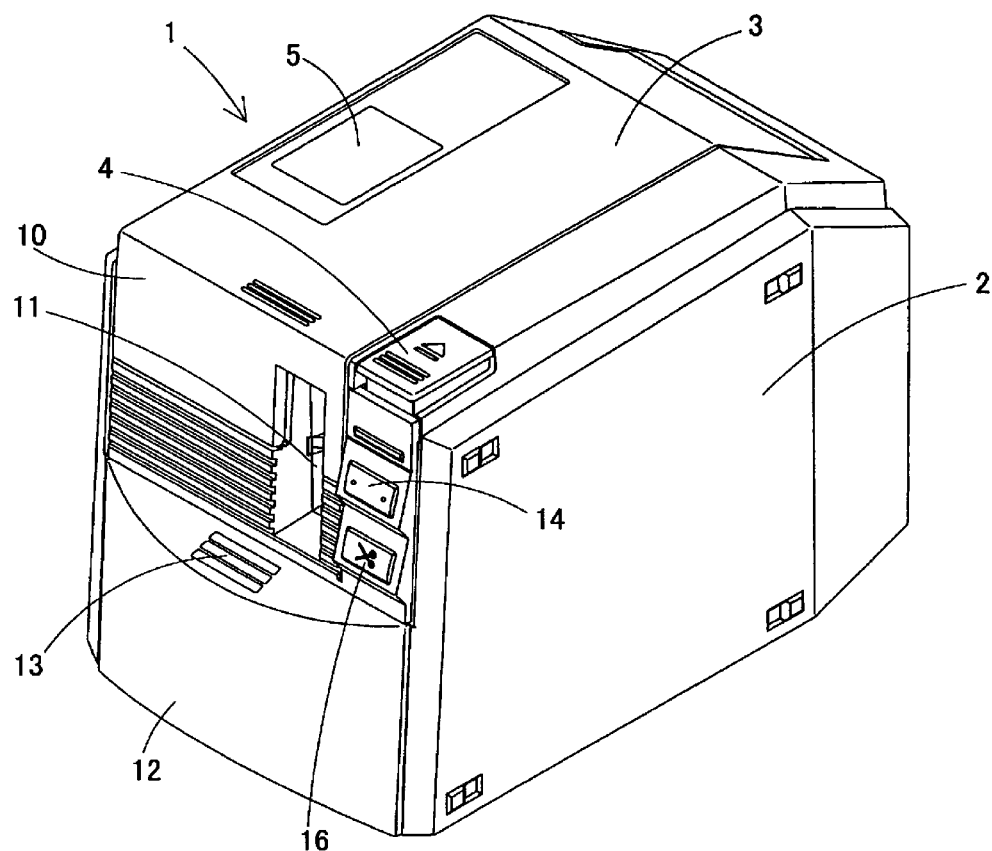

[FIG. 3]
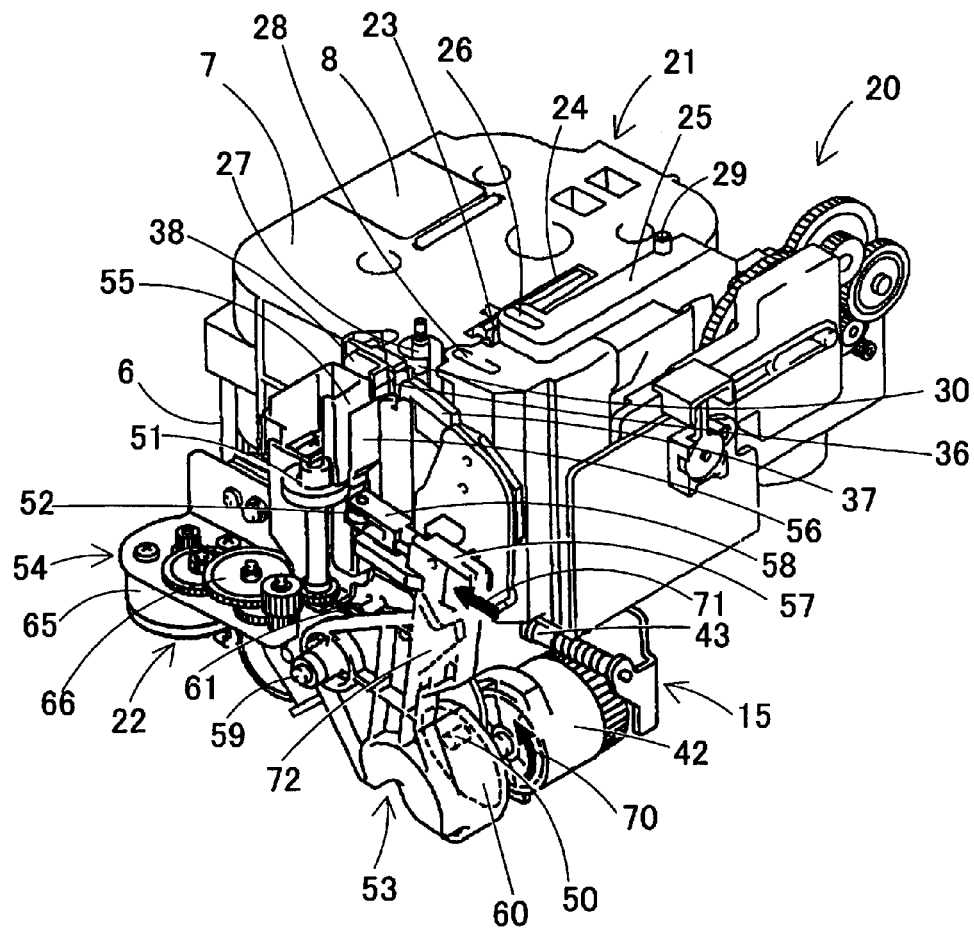

[FIG. 4]
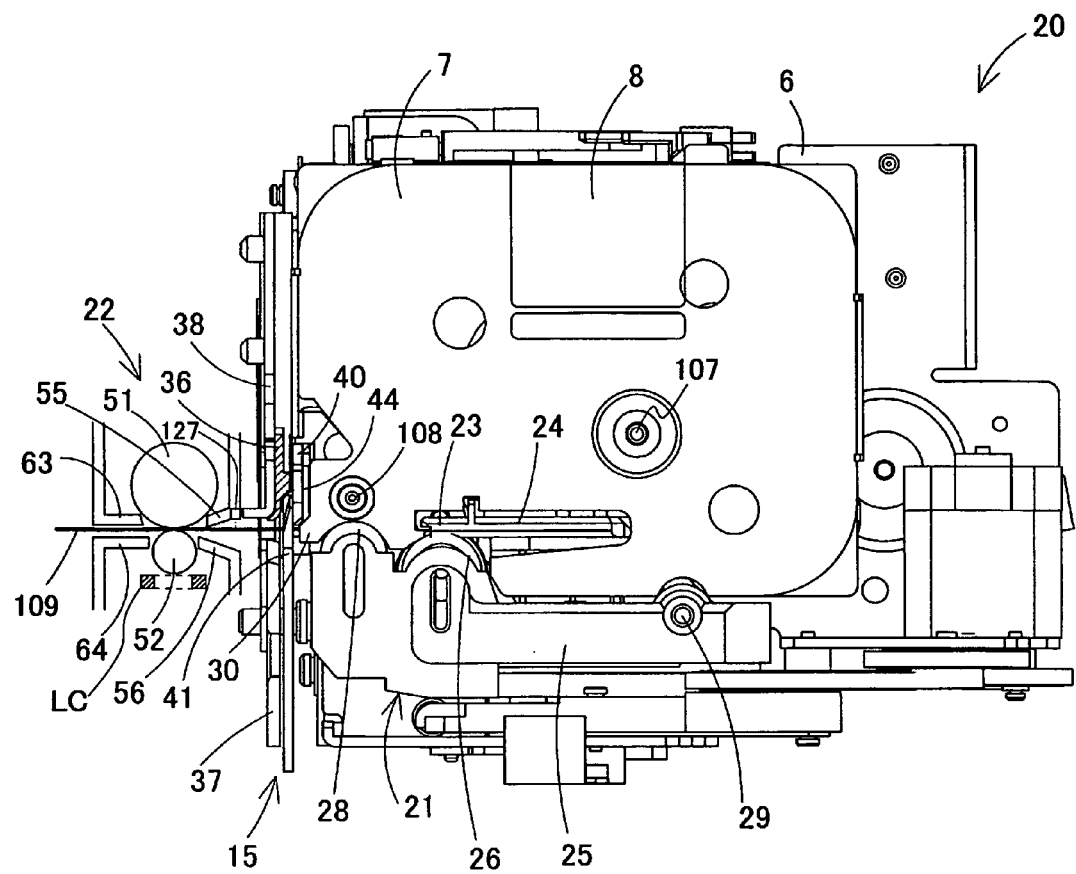

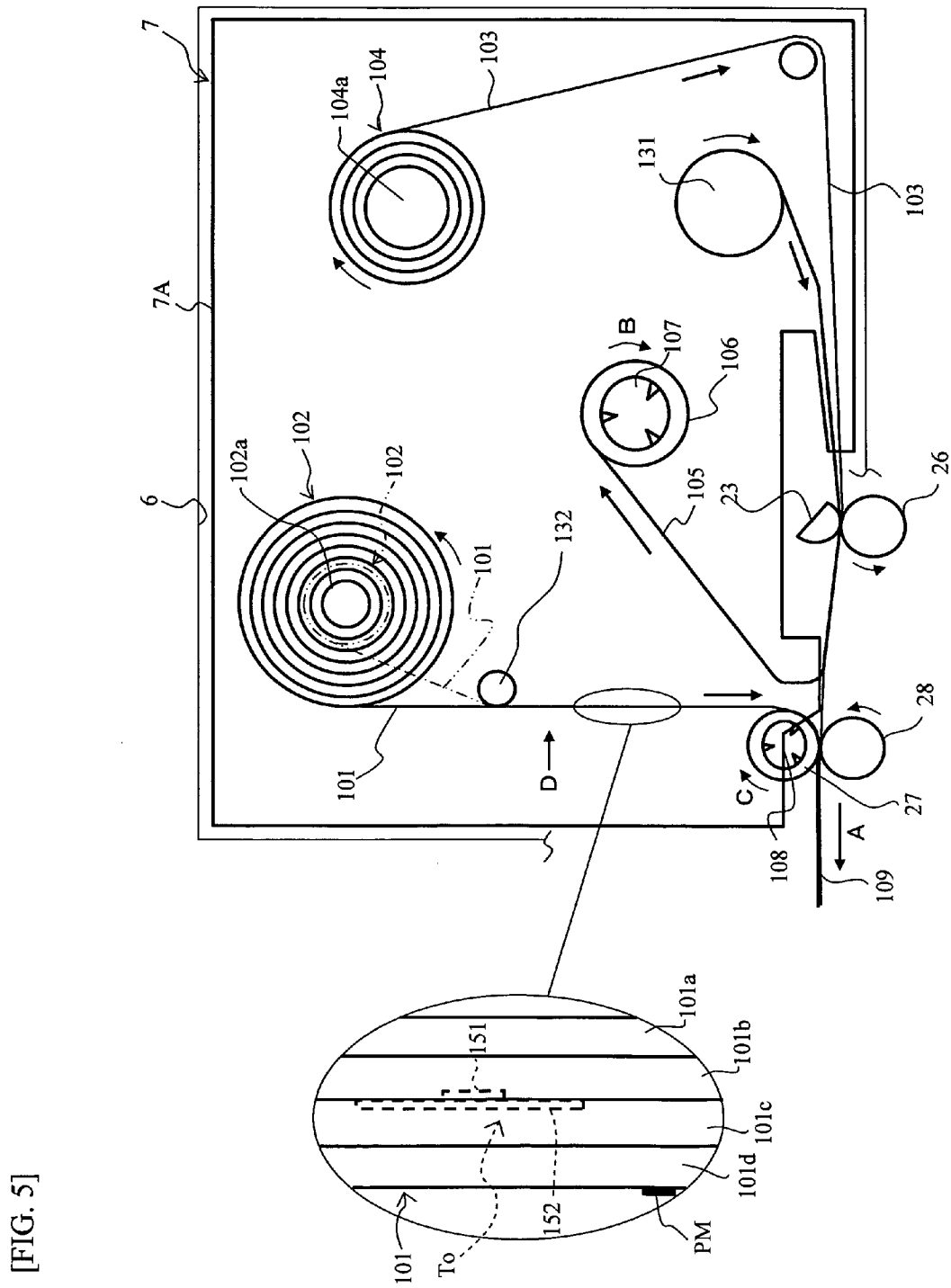
[FIG. 5]

[FIG. 6]
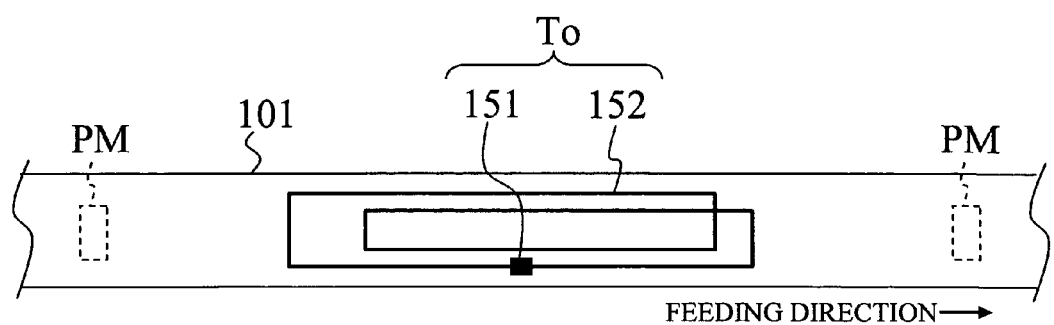

[FIG. 7]
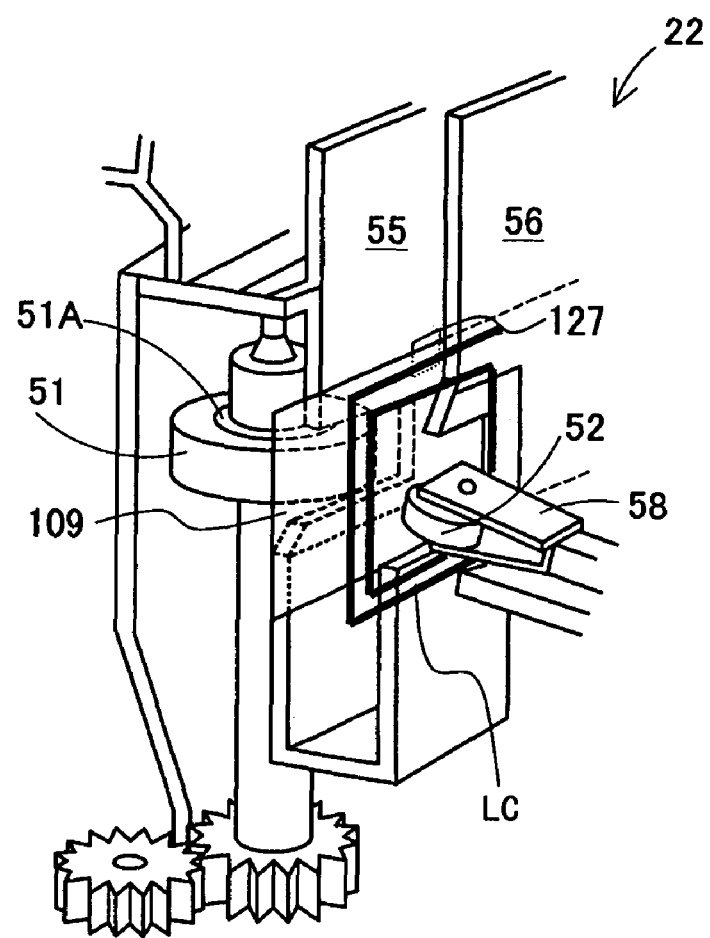

[FIG. 8]
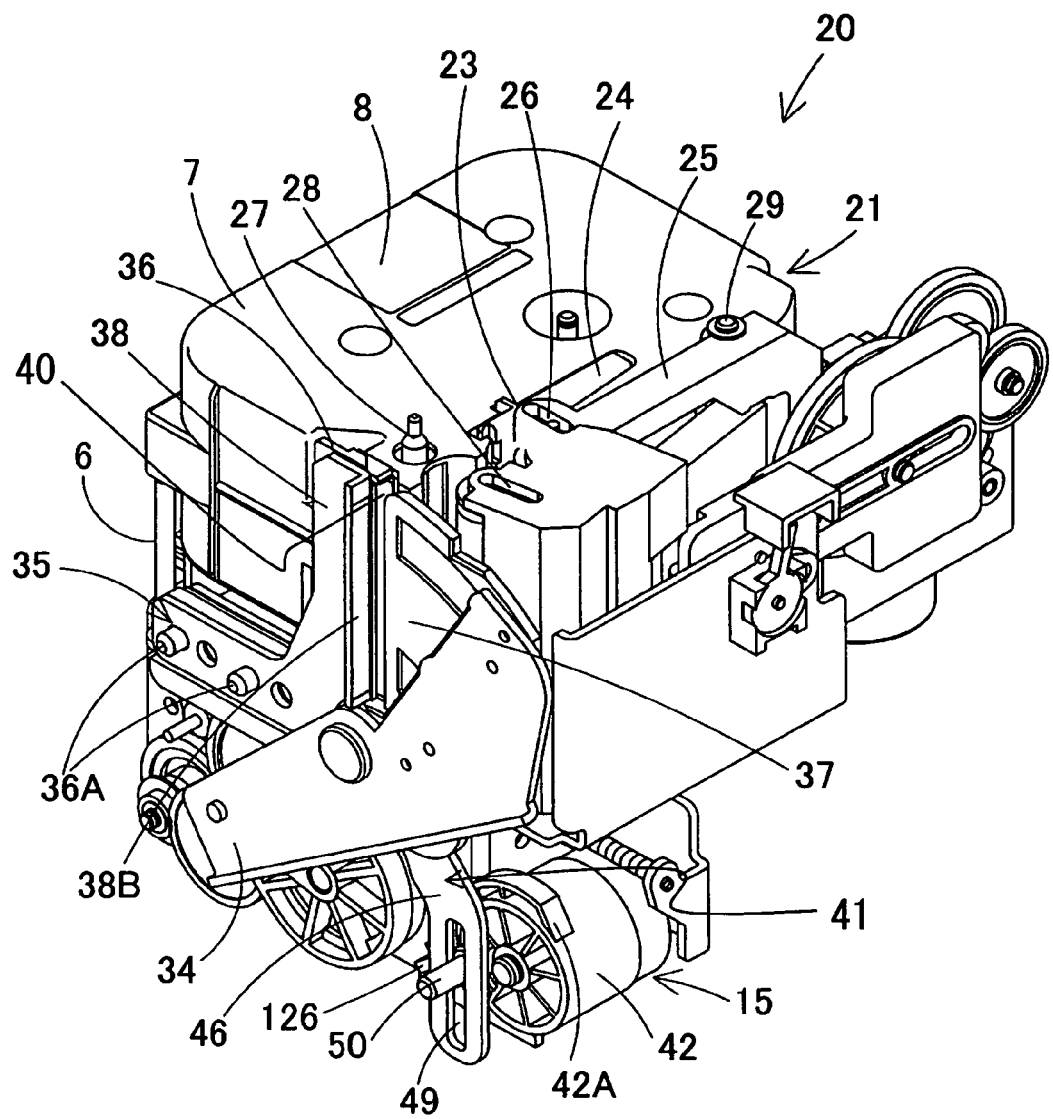

[FIG. 9]
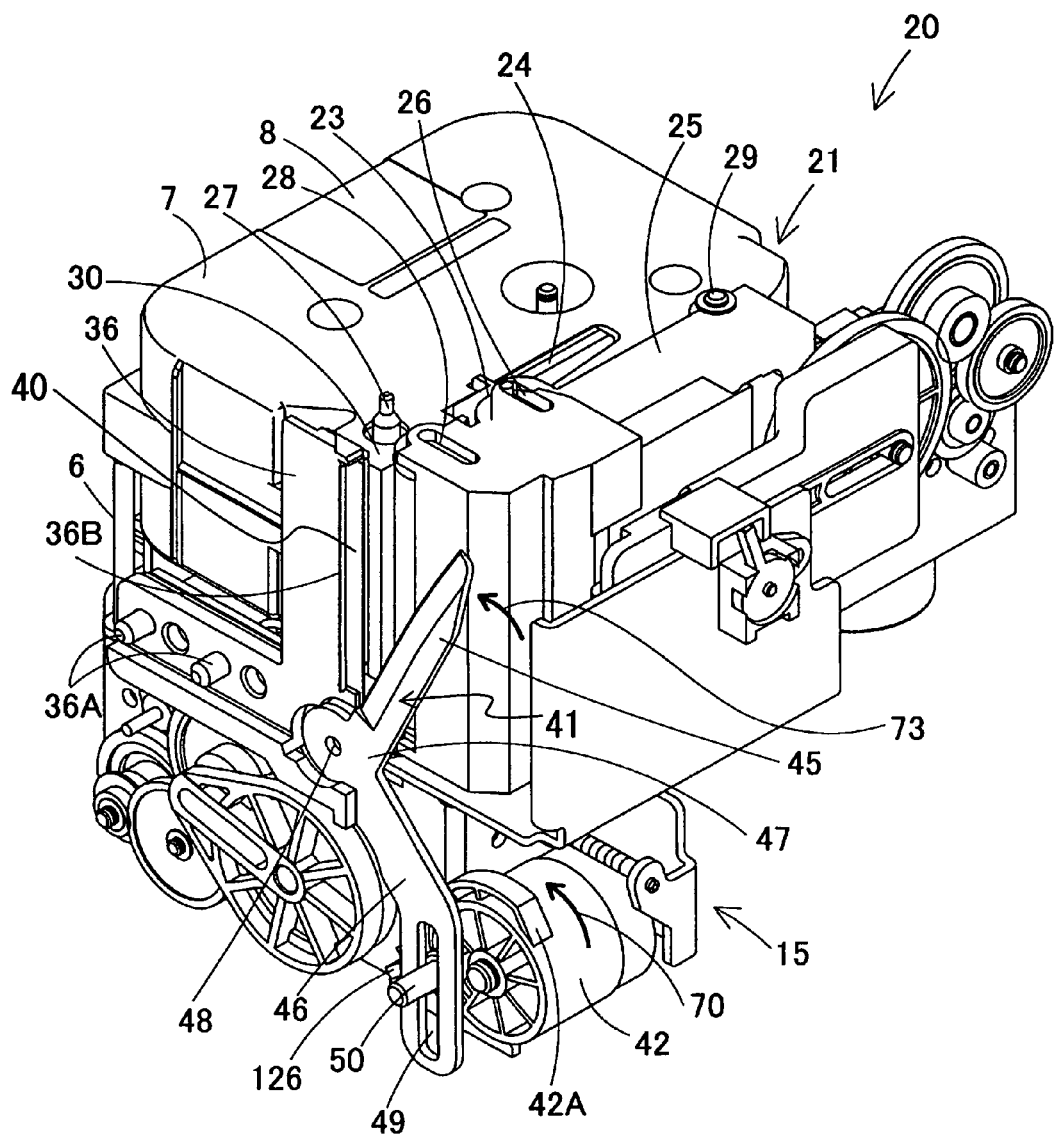

[FIG. 10]
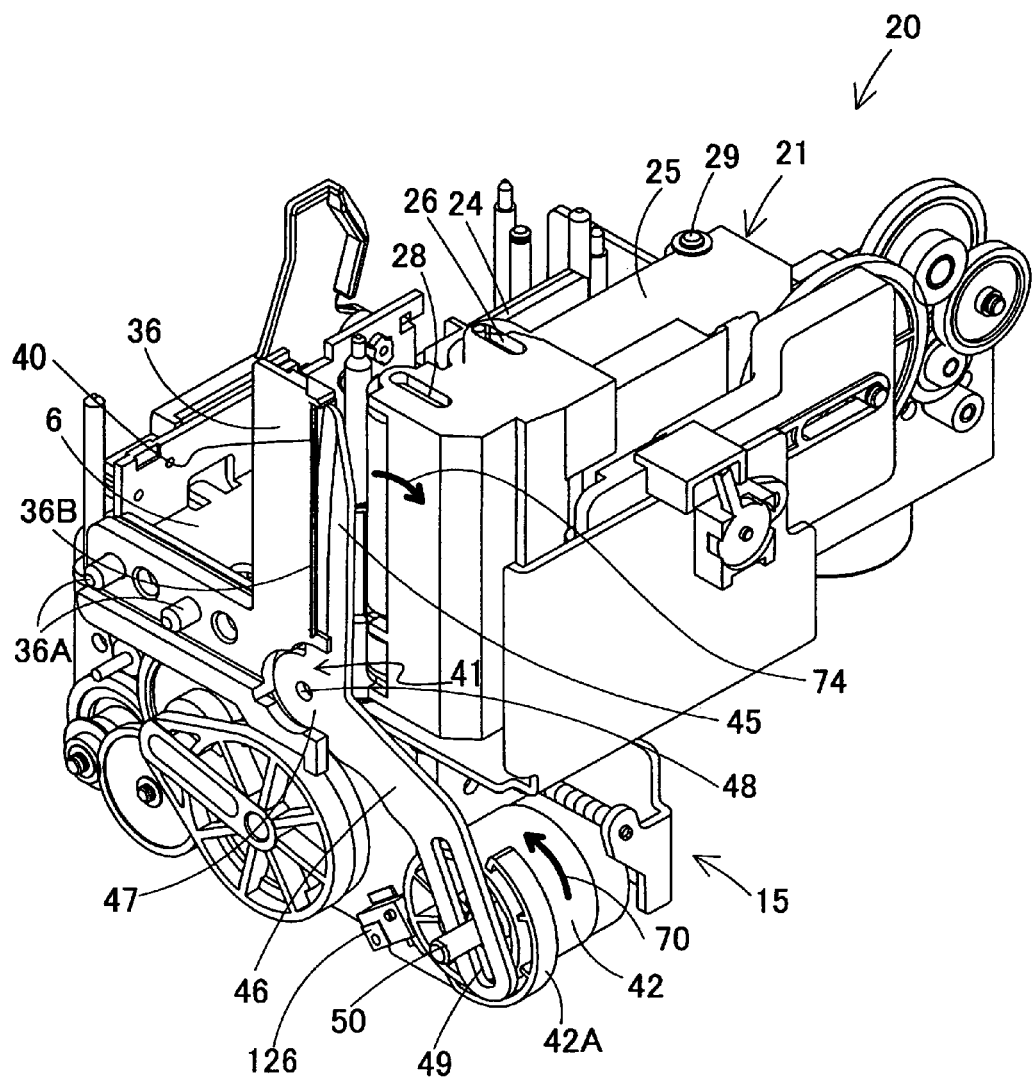

[FIG. 11]
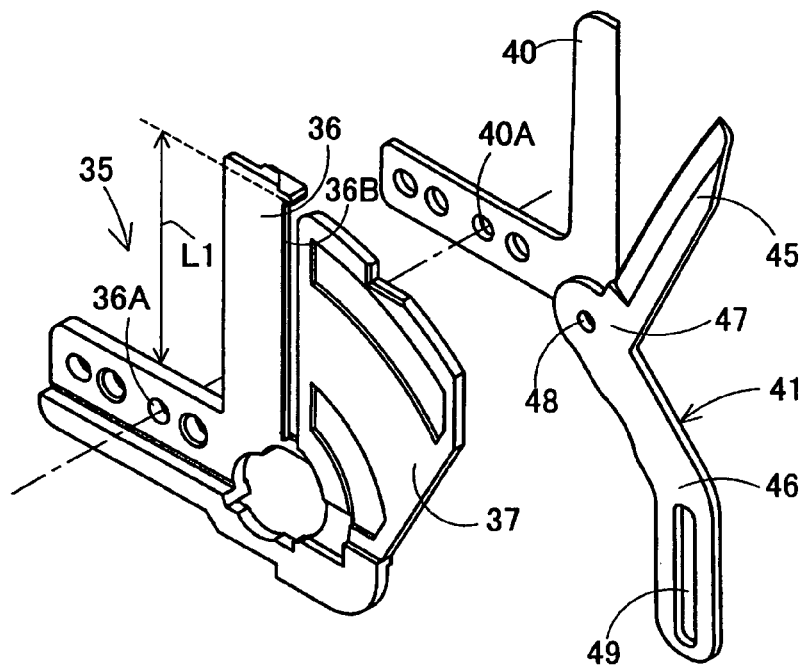
[FIG. 12]
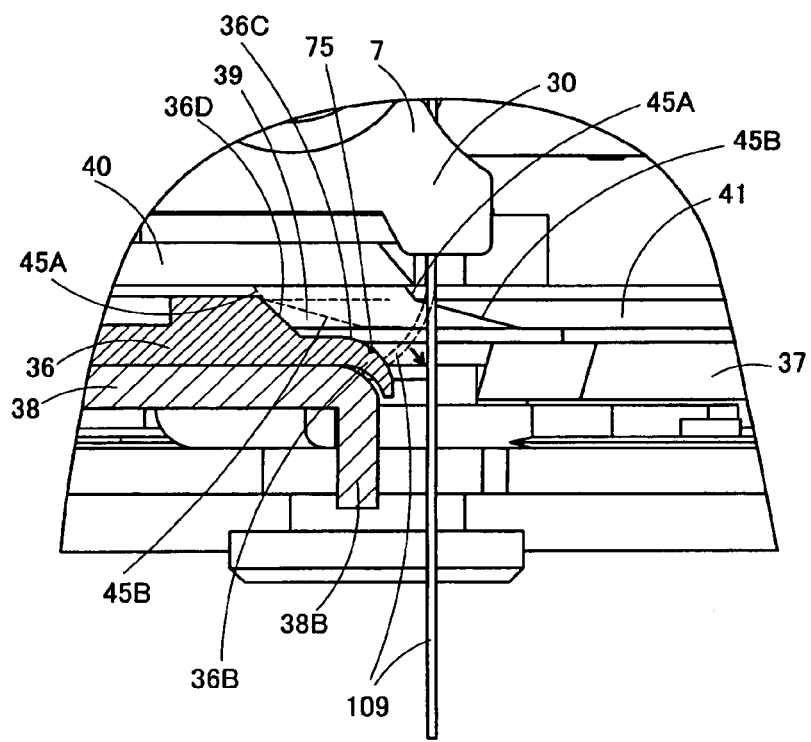

[FIG. 13]
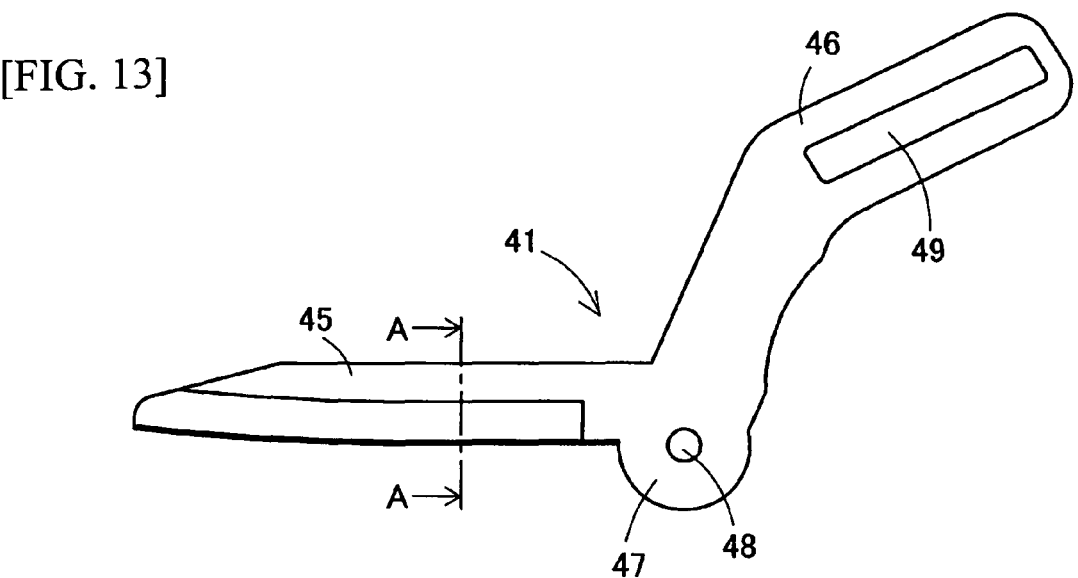
[FIG. 14]
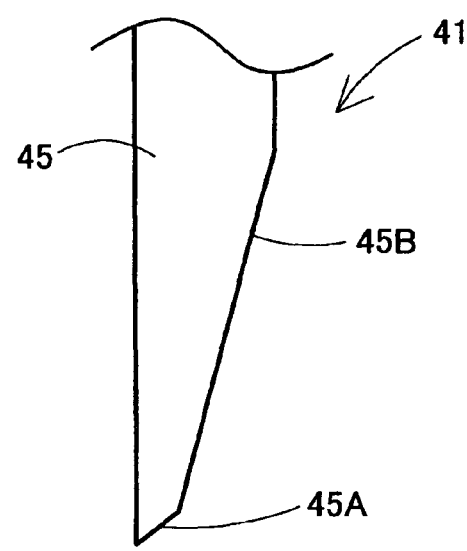

[FIG. 15]
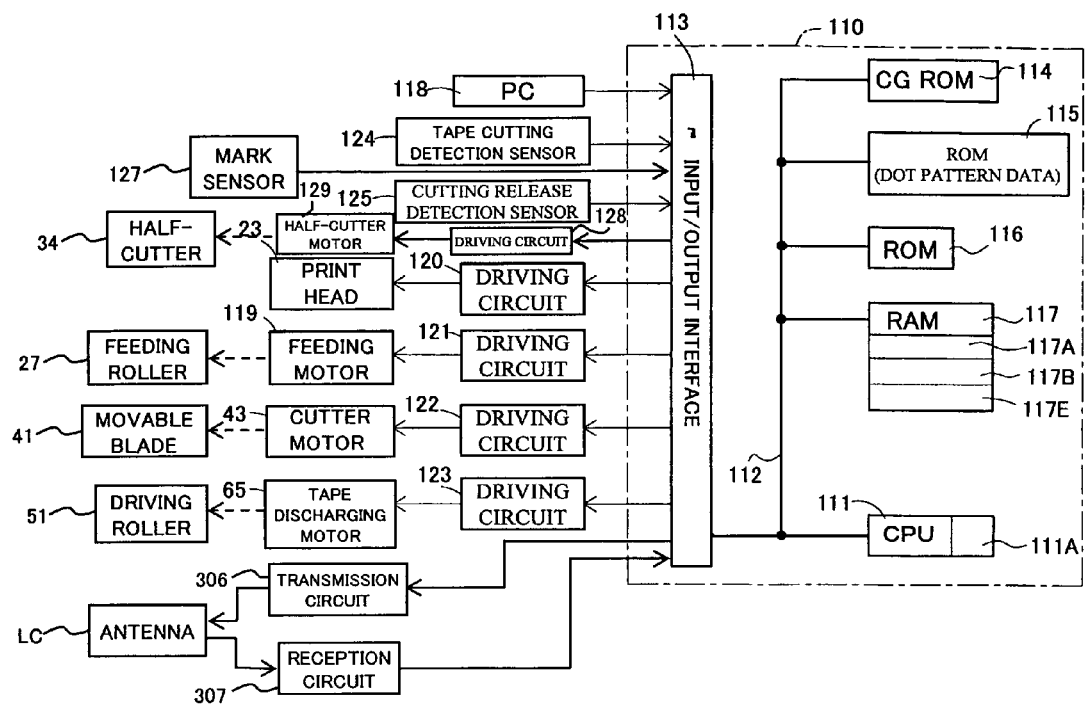

[FIG. 16]
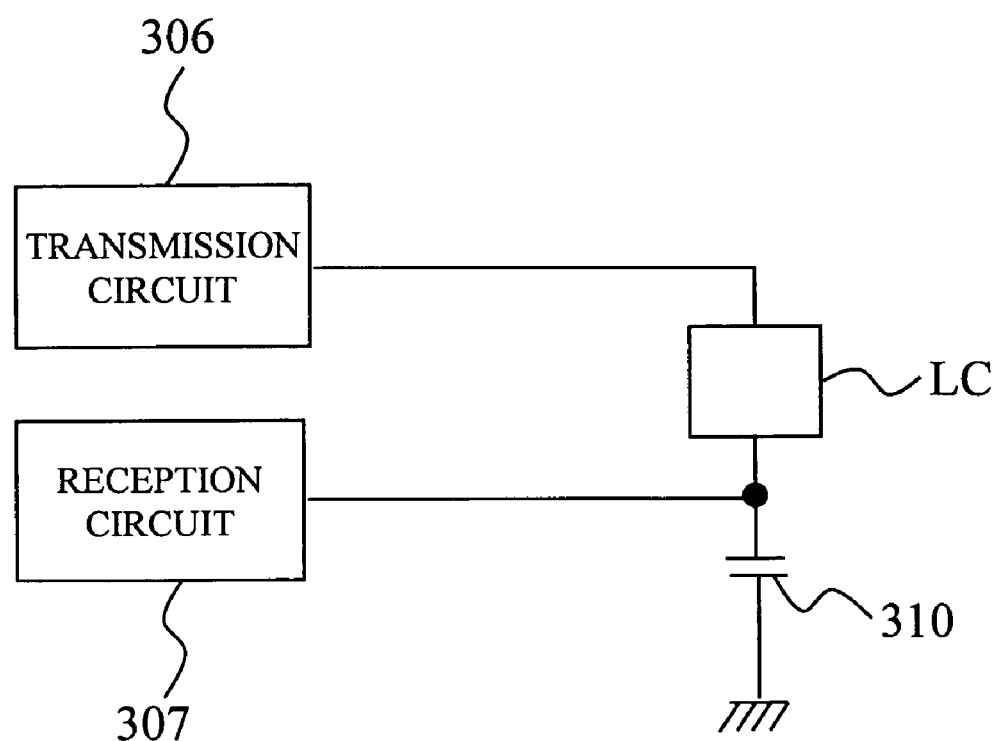

[FIG. 17]
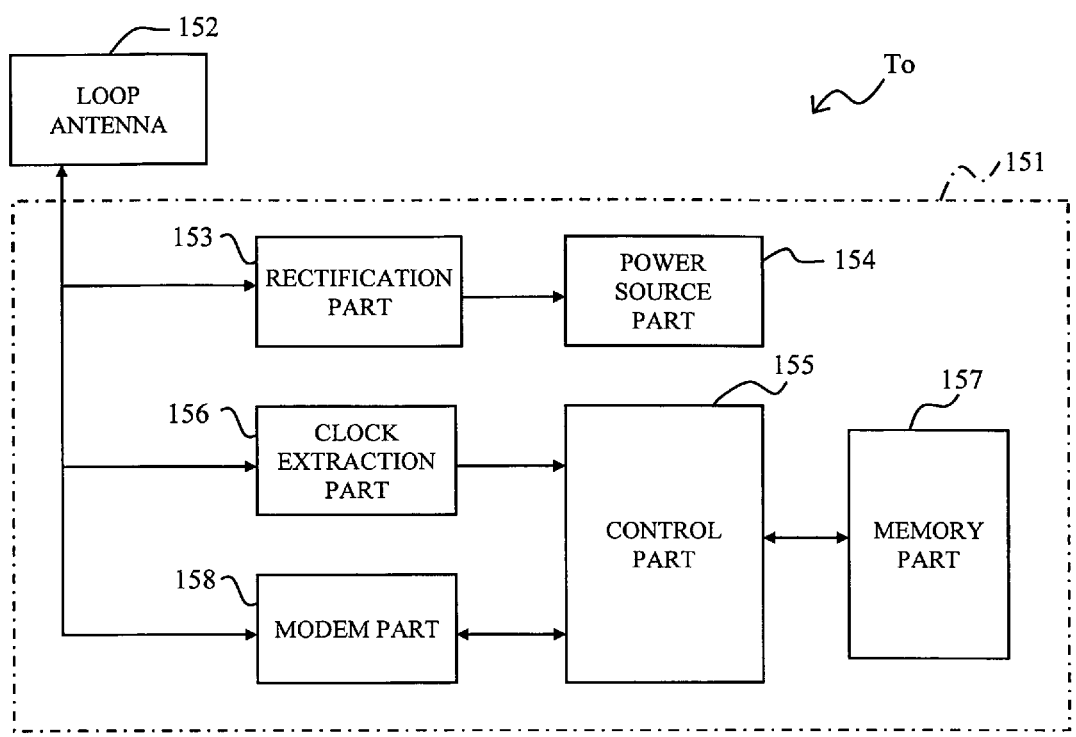

[FIG. 18A]
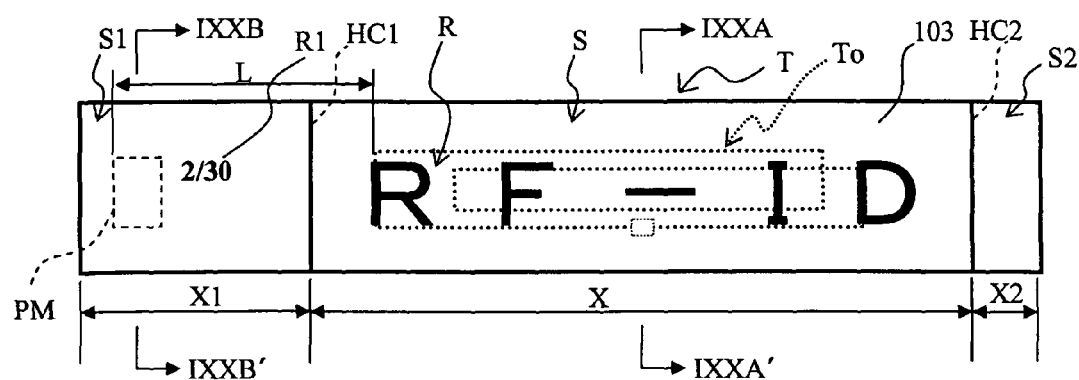
[FIG. 18B]
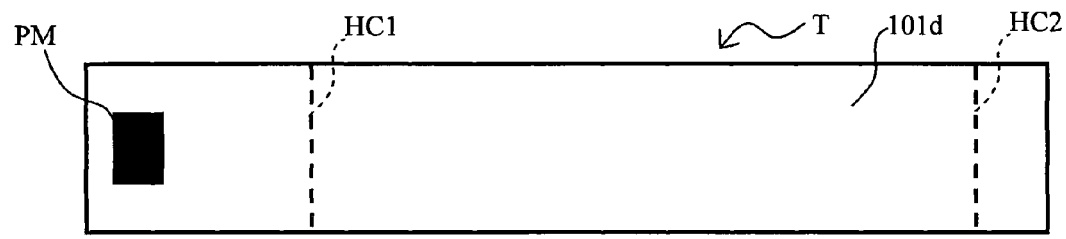

[FIG. 19A]
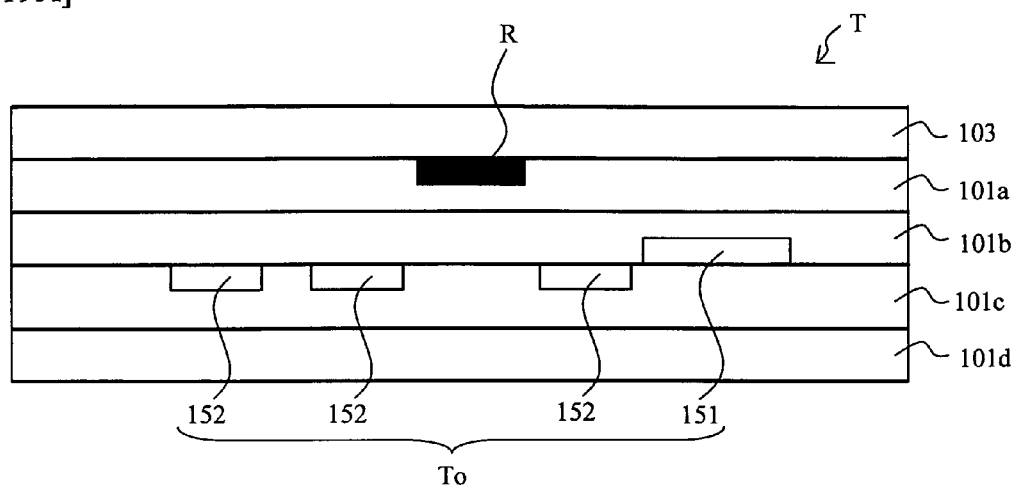
[FIG. 19B]
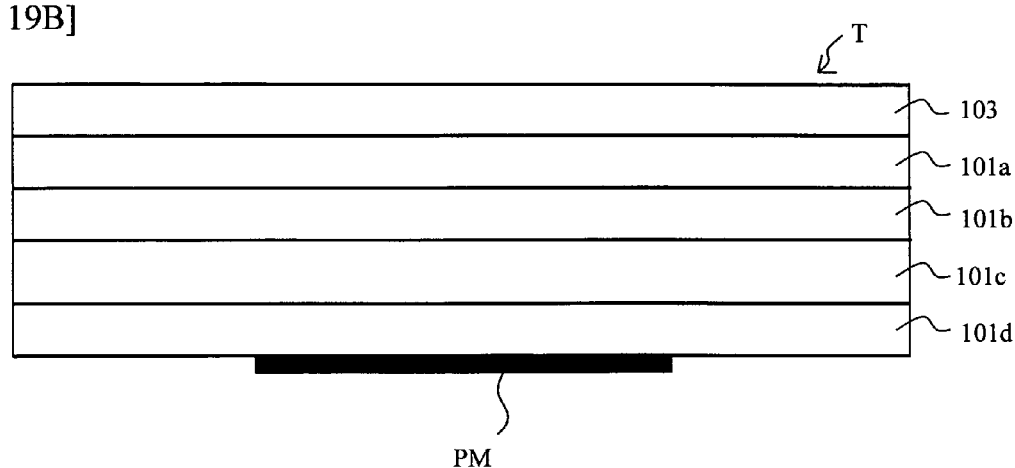

[FIG. 20]
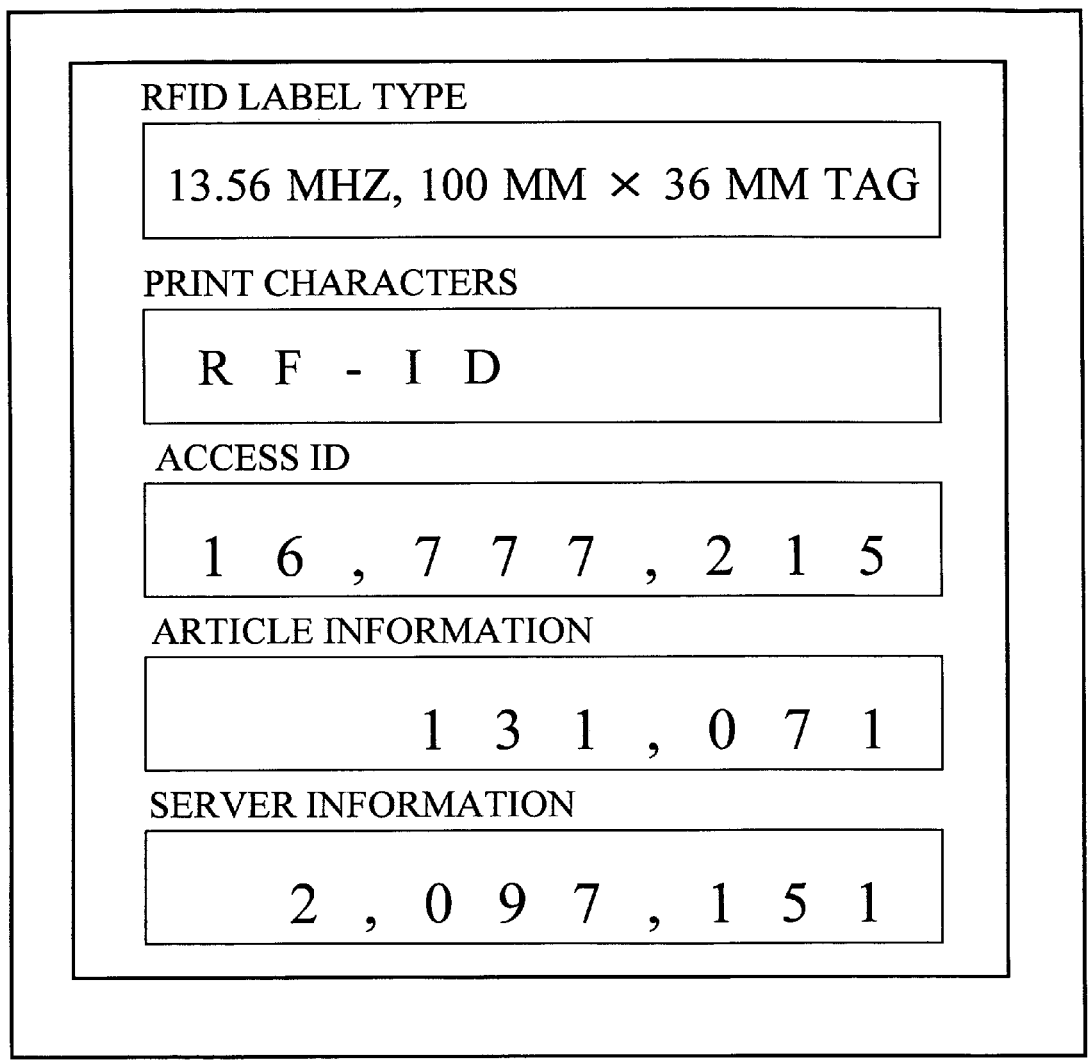

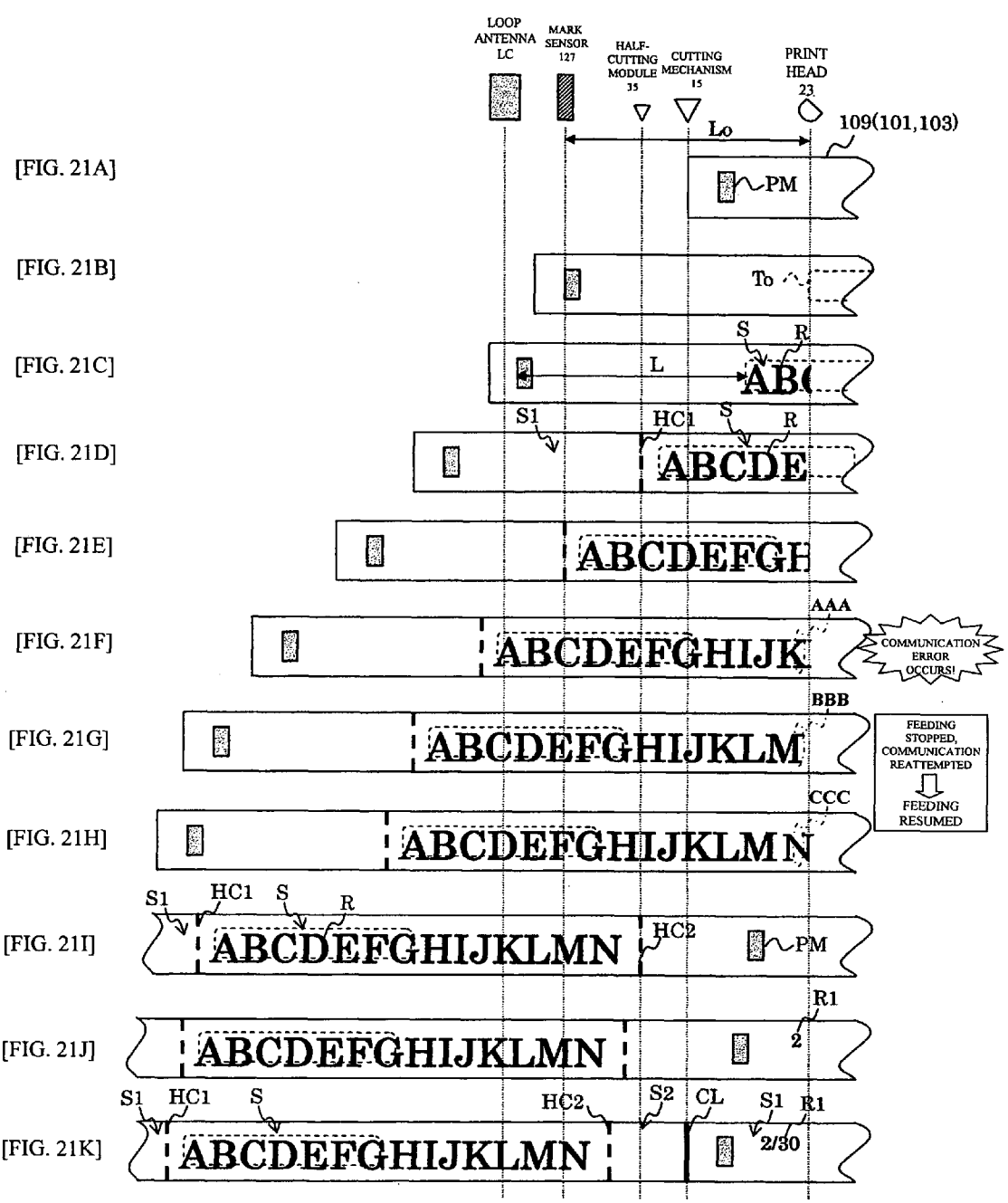

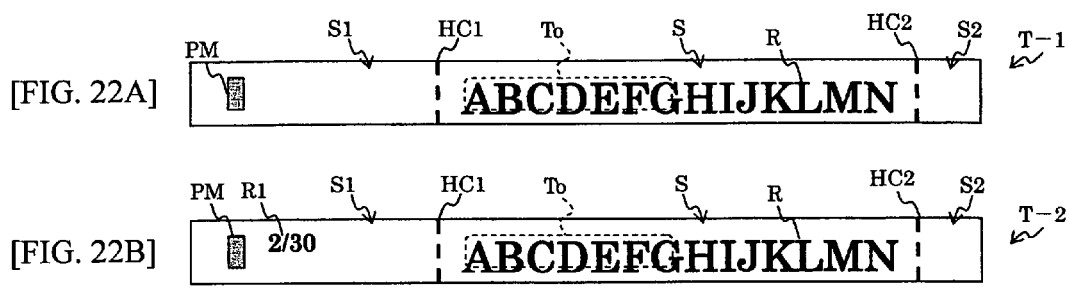
[FIG. 22A]
[FIG. 22B]
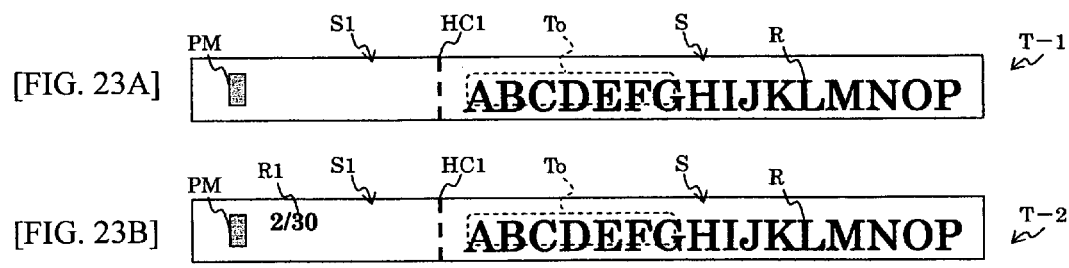
[FIG. 23A]
[FIG. 23B]

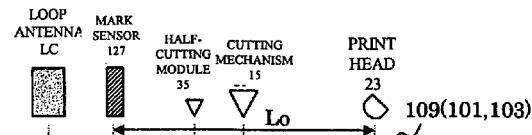
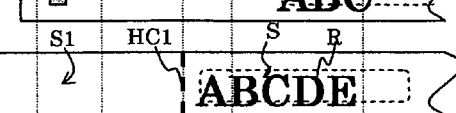
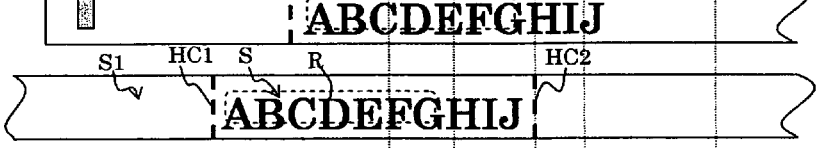
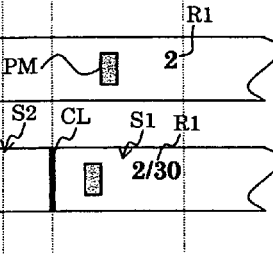

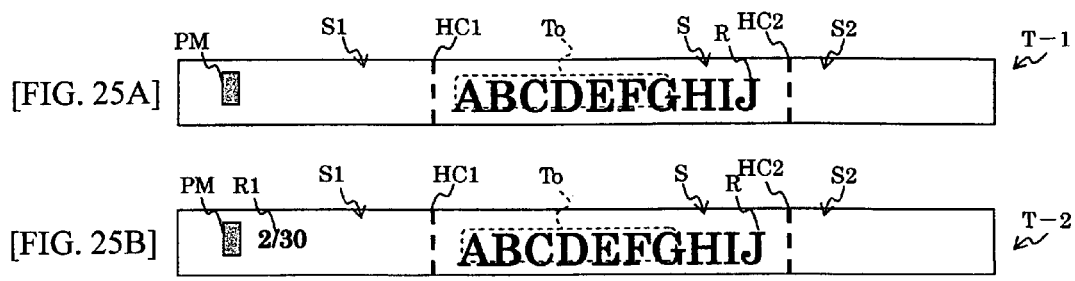

[FIG. 26]
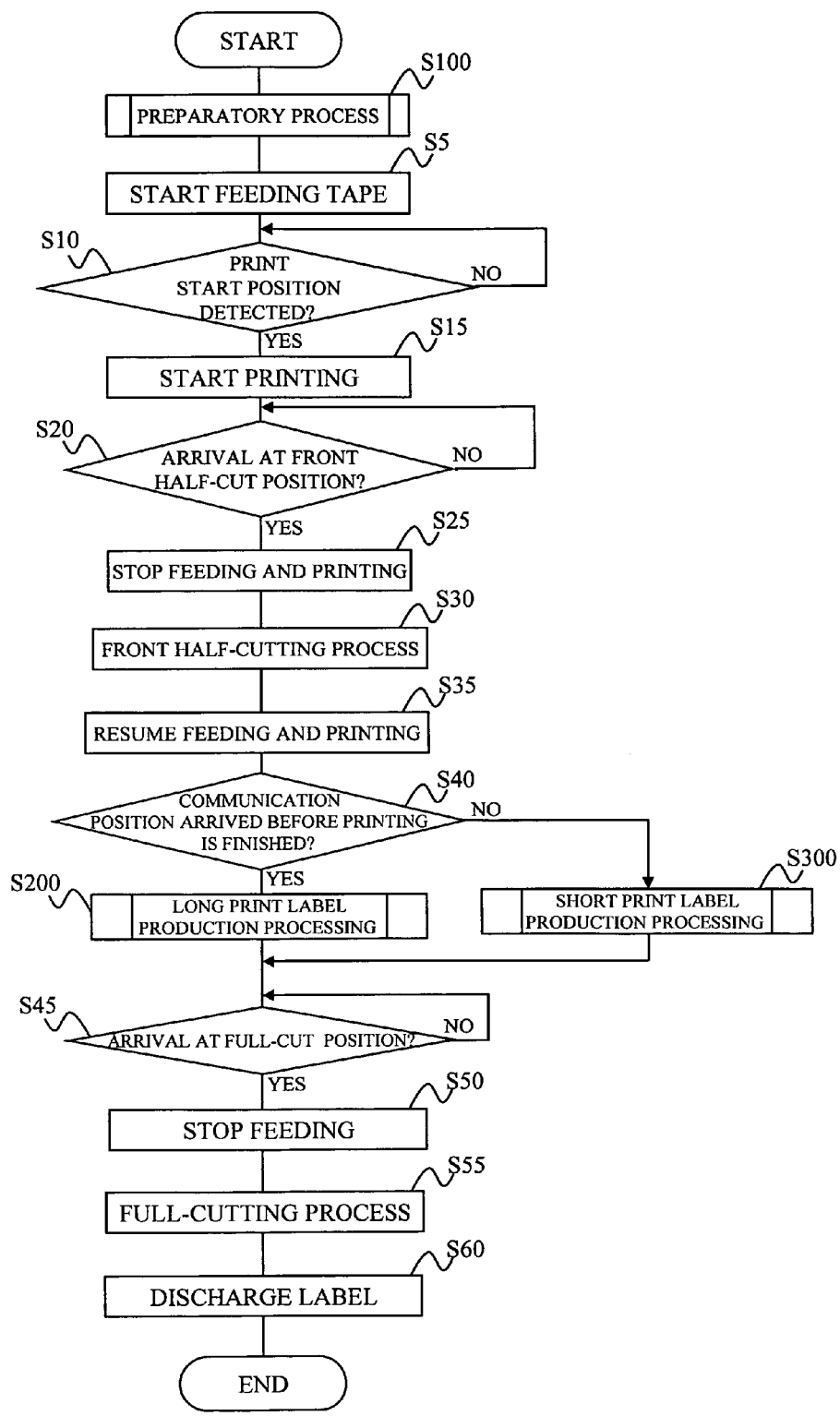

[FIG. 27]
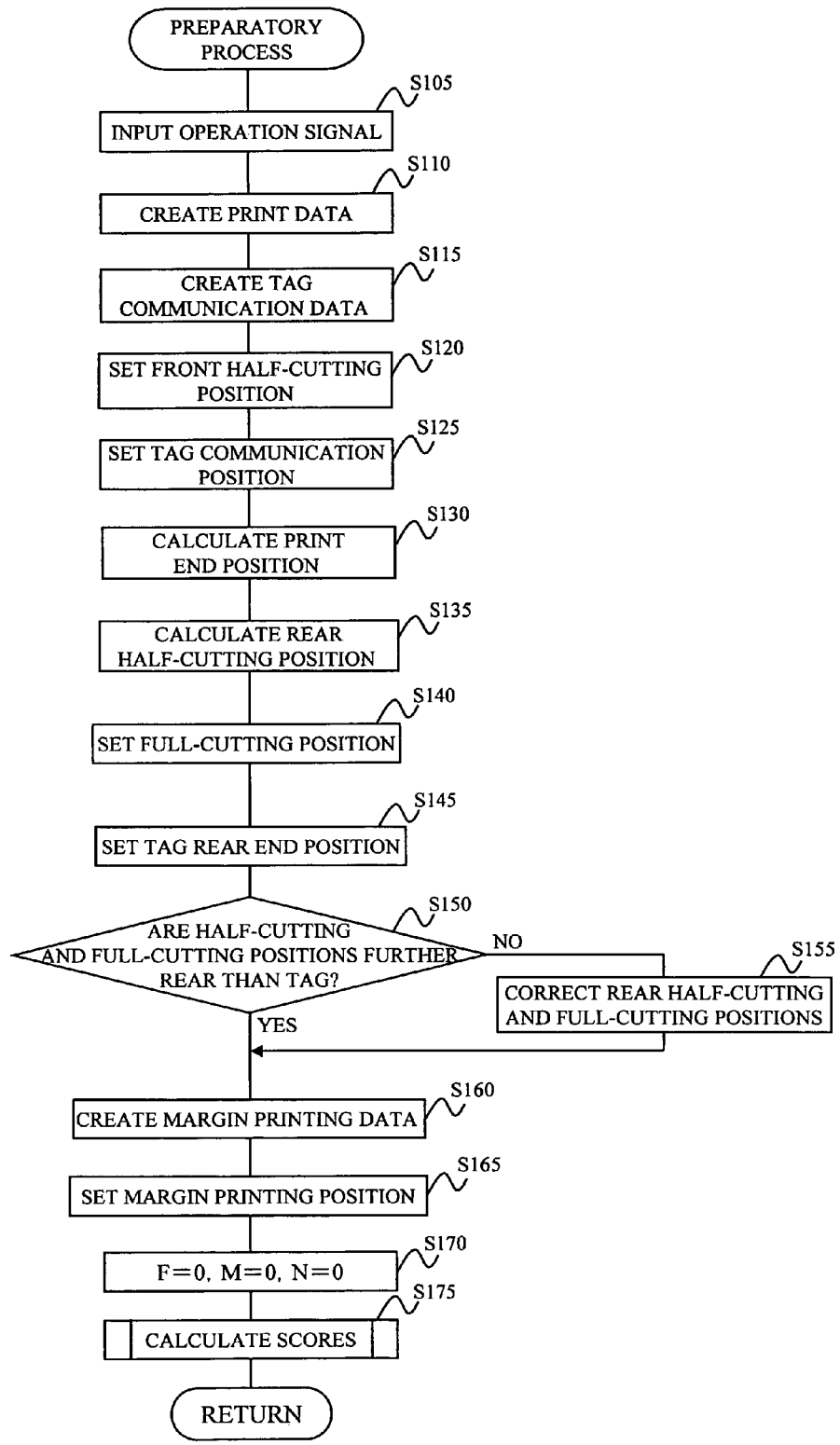

[FIG. 28A]

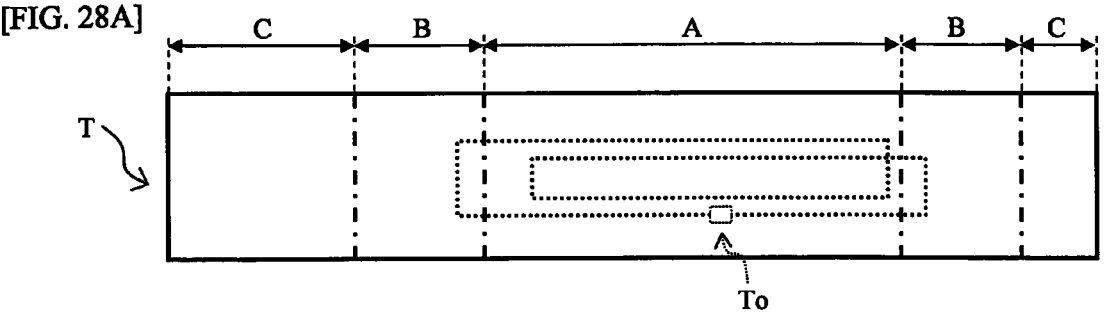

| AREA | A | B | C |
|---|---|---|---|
| COMMUNICATION CONDITION SCORE | 1.0 | 0.7 | 0.4 |

[FIG. 28B]

| PRINTED CHARACTERS | PRINTING SCORE |
|---|---|
| WHITE SOLID | 1.0 |
| BLACK SOLID | 0.7 |
| HORIZONTAL LINE | 0.5 |
| DIAGONAL/VERTICAL LINE | 0.3 |

OVERALL SCORES

[FIG. 28C]

| PRINTED CHARACTERS \ AREA | A | B | C |
|---|---|---|---|
| WHITE SOLID | 2.0 | 1.7 | 1.4 |
| BLACK SOLID | 1.7 | 1.4 | 1.1 |
| HORIZONTAL LINE | 1.5 | 1.2 | 0.9 |
| DIAGONAL/VERTICAL LINE | 1.3 | 1.0 | 0.7 |

SPECIFIC EXAMPLE OF OVERALL SCORES

[FIG. 28D]

| POSITION \ AREA | COMMUNICATION CONDITION SCORE | PRINTING SCORE | OVERALL SCORE |
|---|---|---|---|
| f | 0.7 | 0.5 | 1.2 |
| g | 1.0 | 1.0 | 2.0 |
| h | 1.0 | 0.3 | 1.3 |

[FIG. 29]
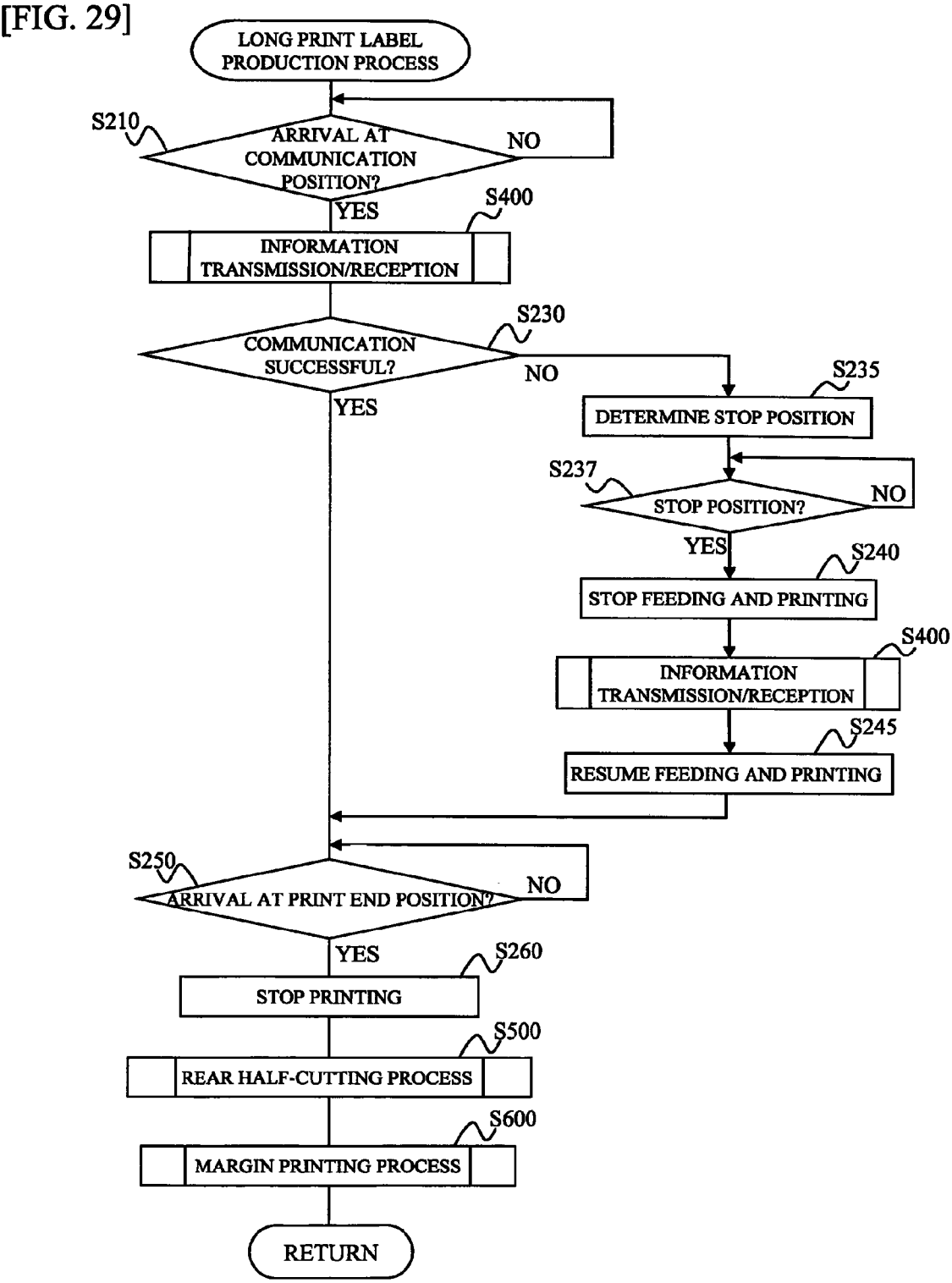

[FIG. 30]
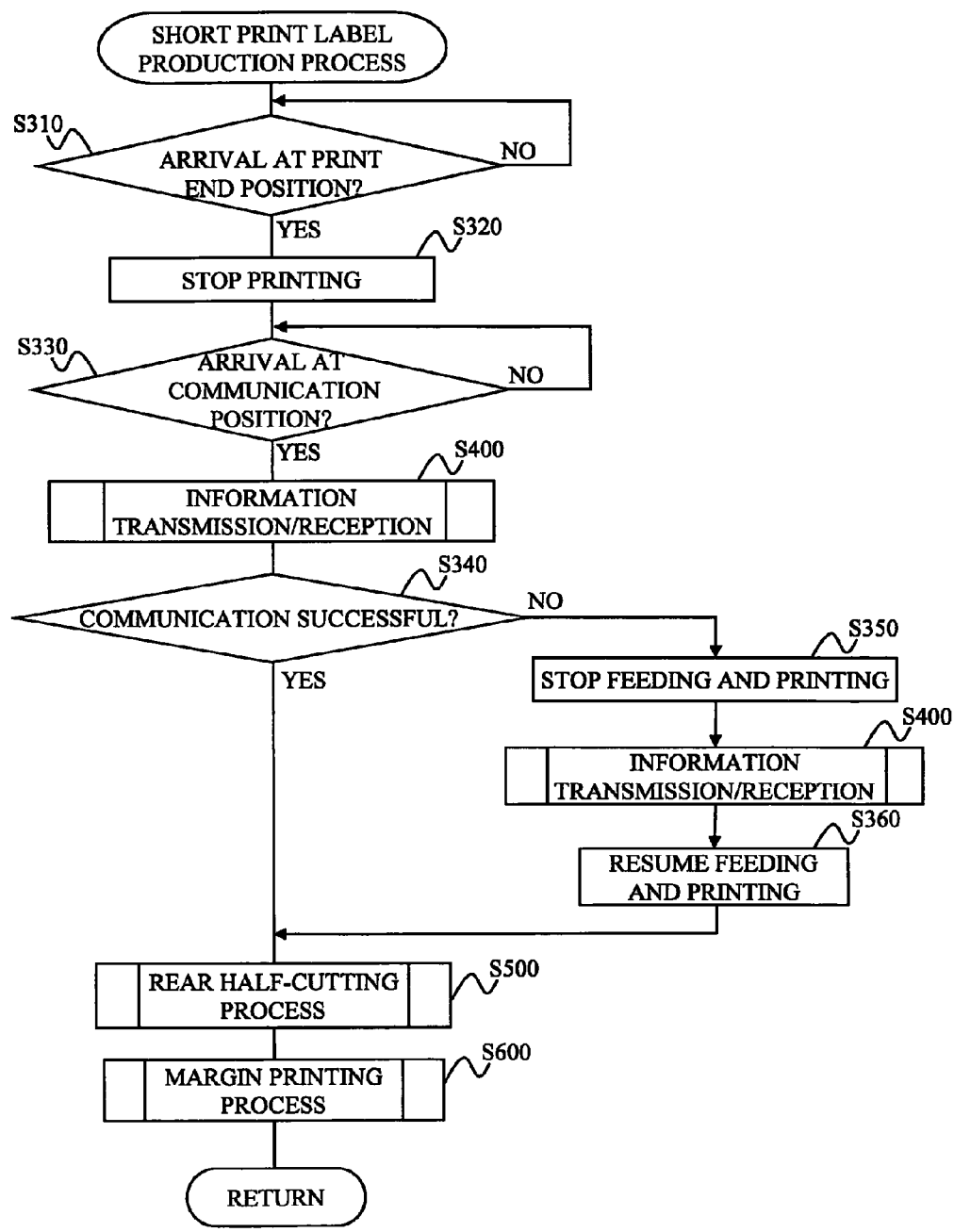

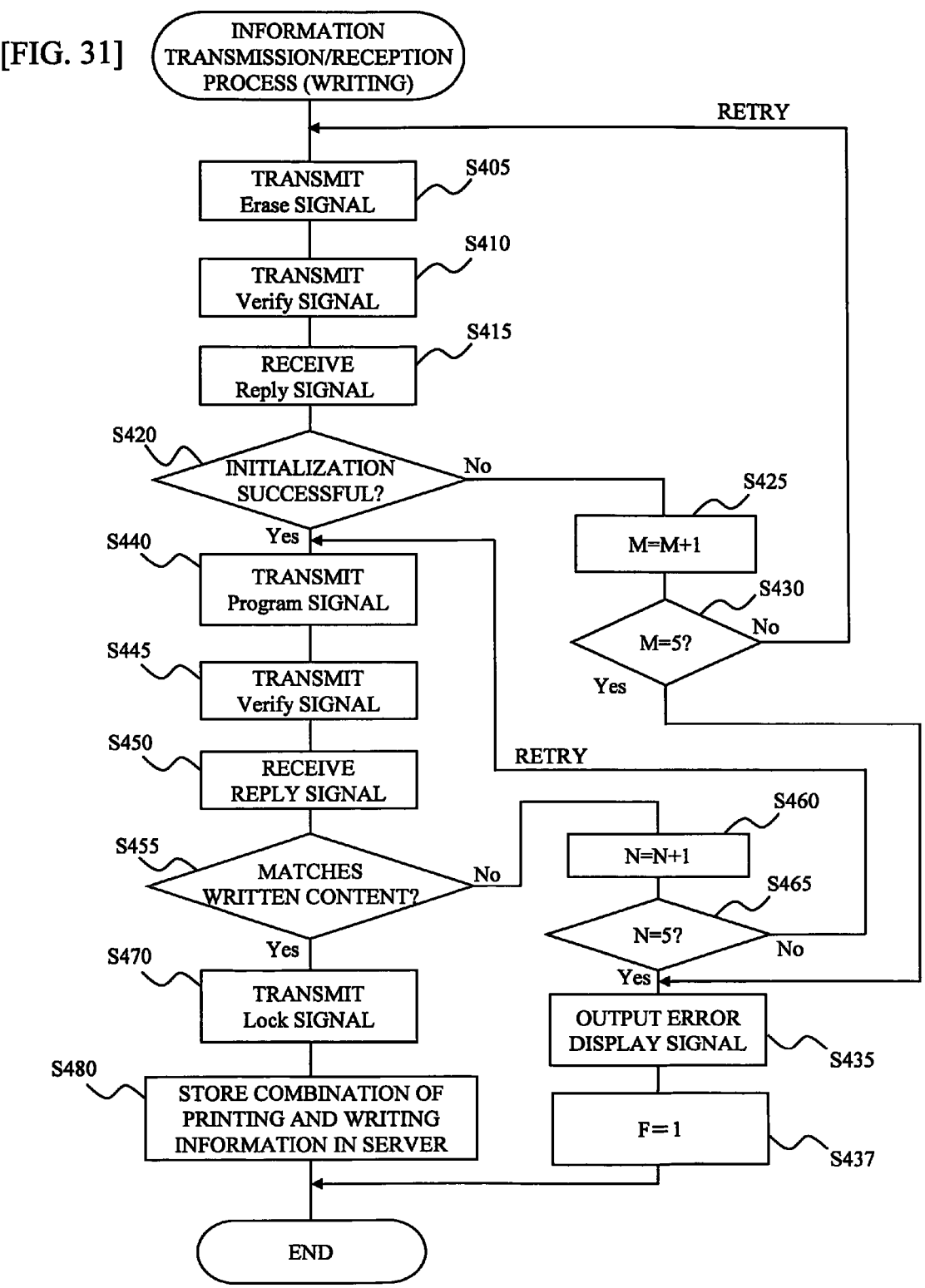

[FIG. 32]
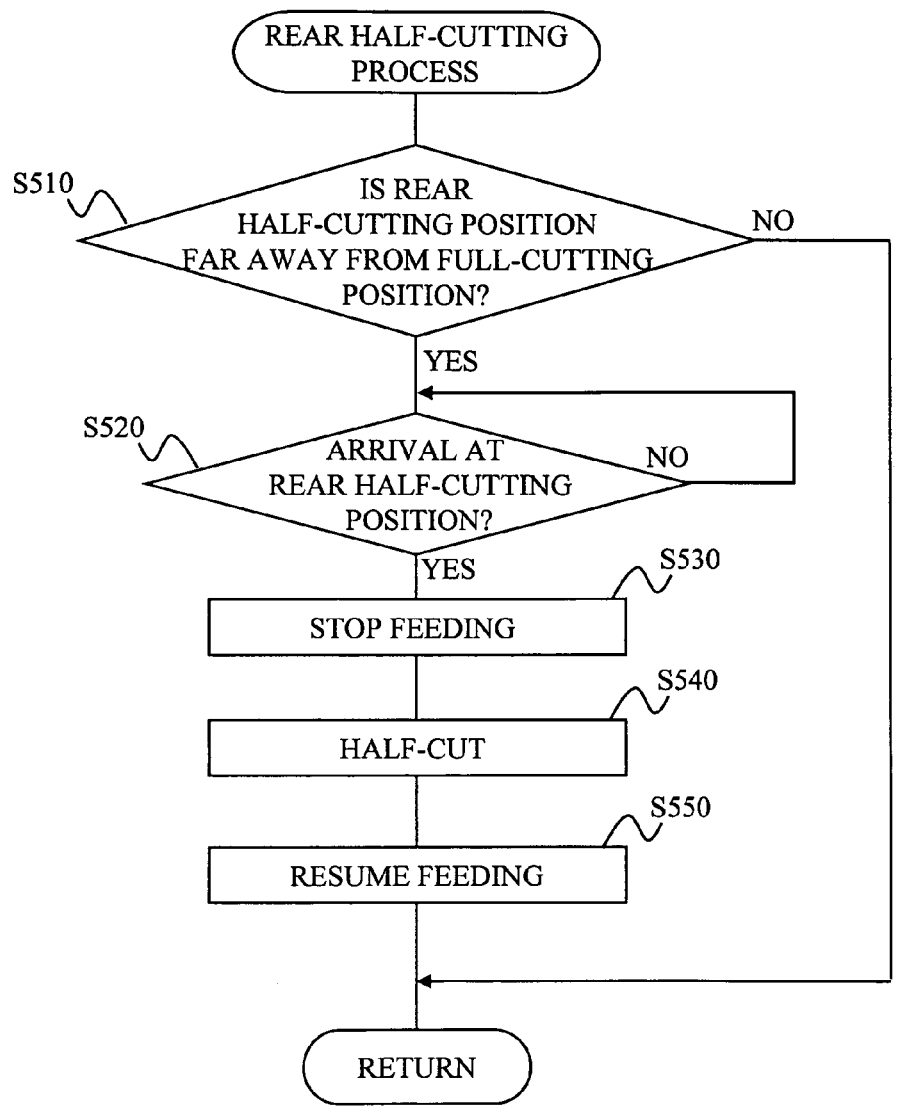

[FIG. 33]
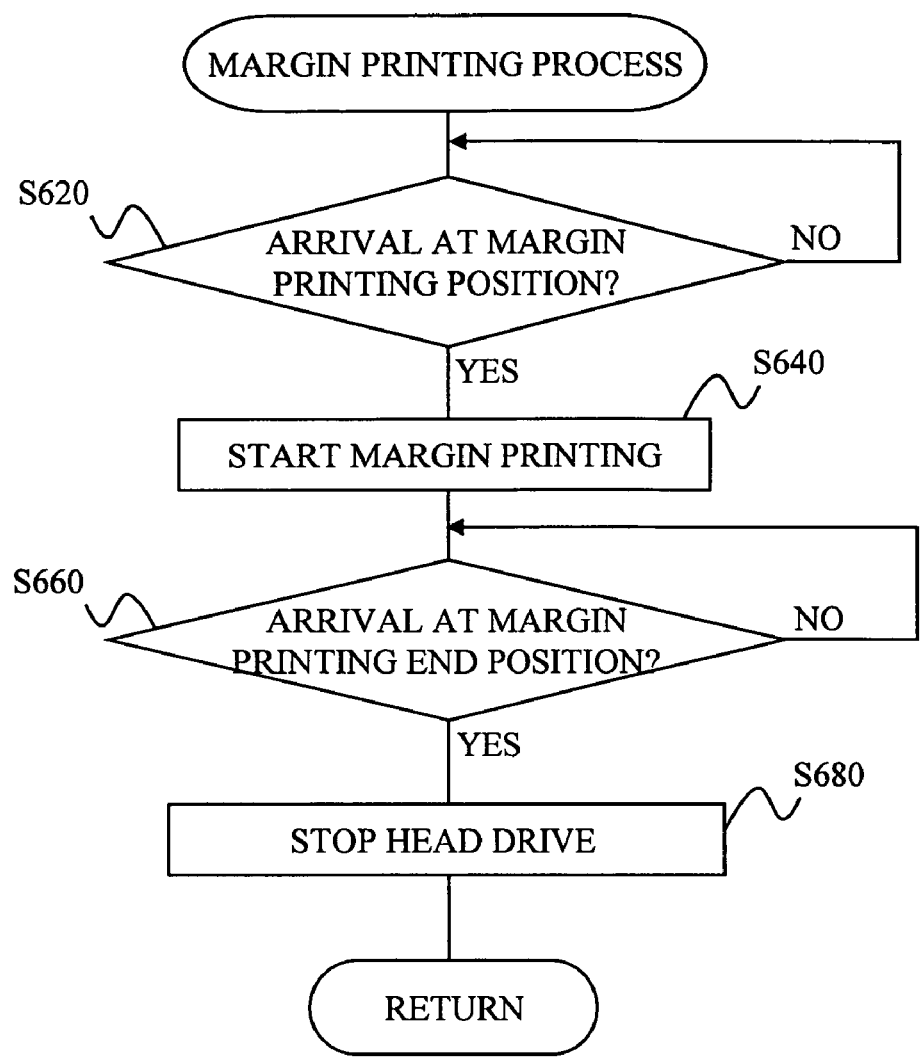

[FIG. 34]
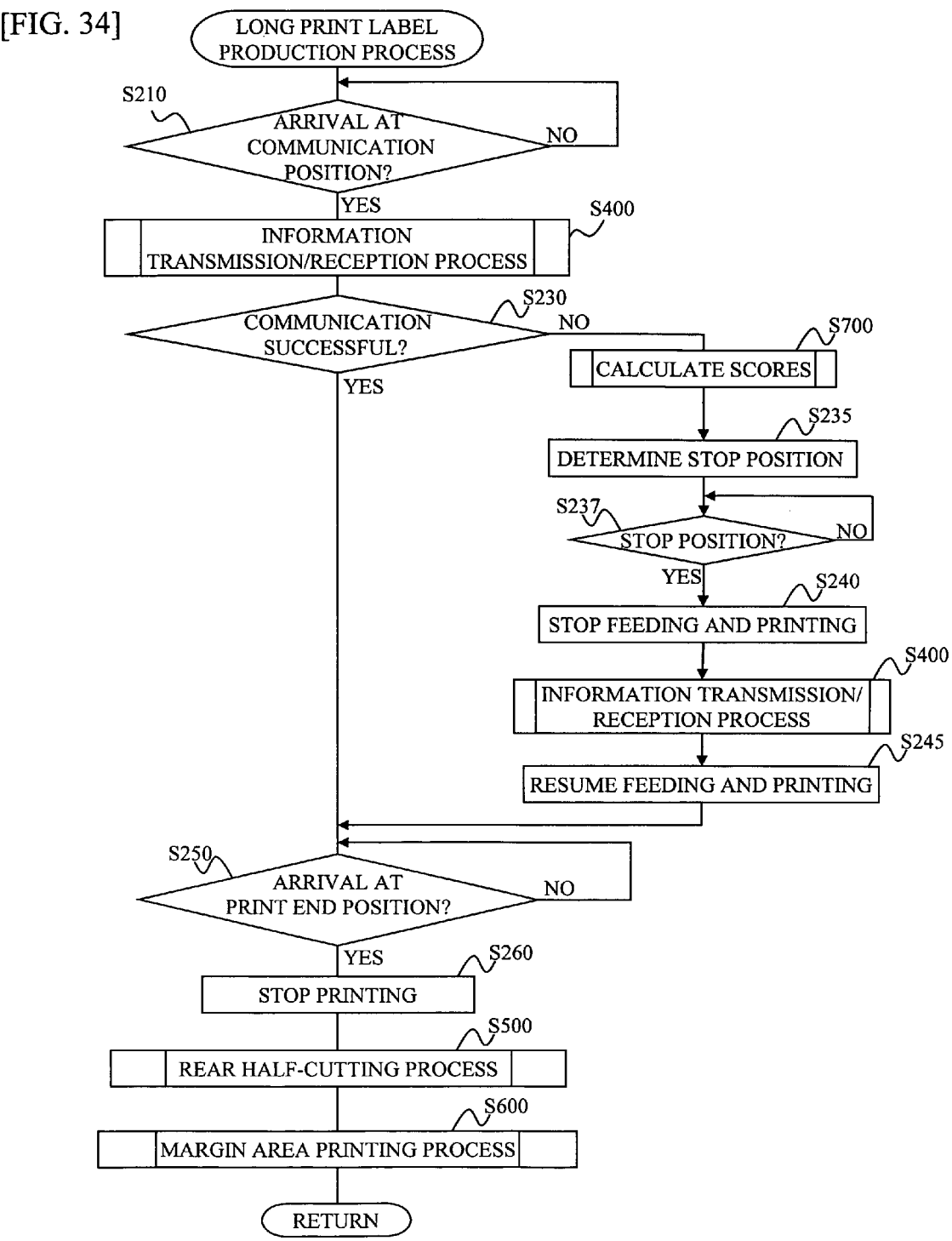

[FIG. 35]
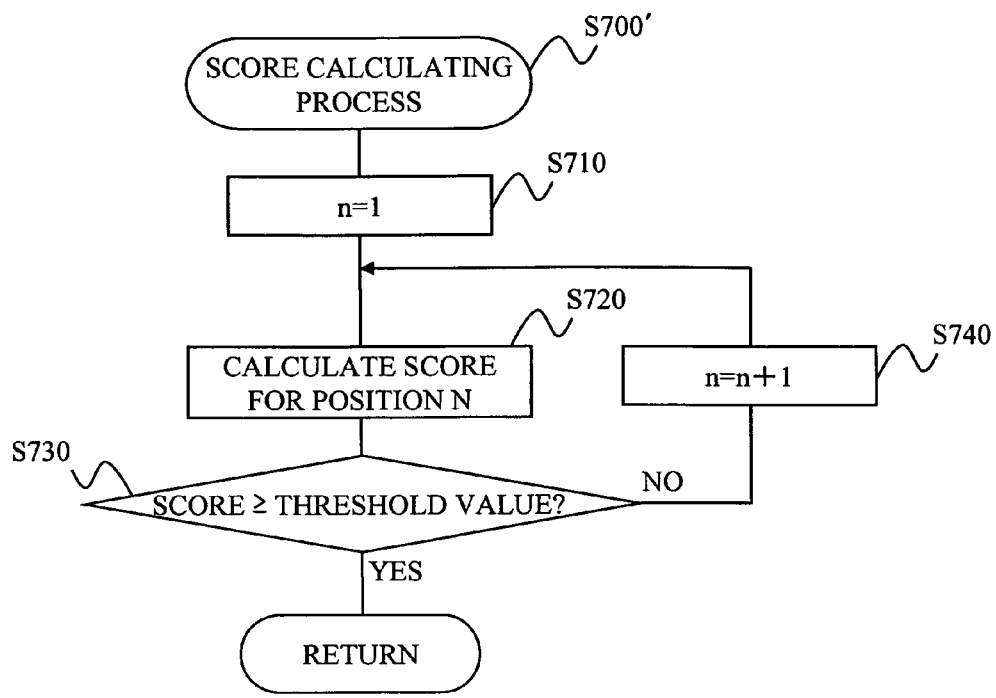

[FIG. 36]
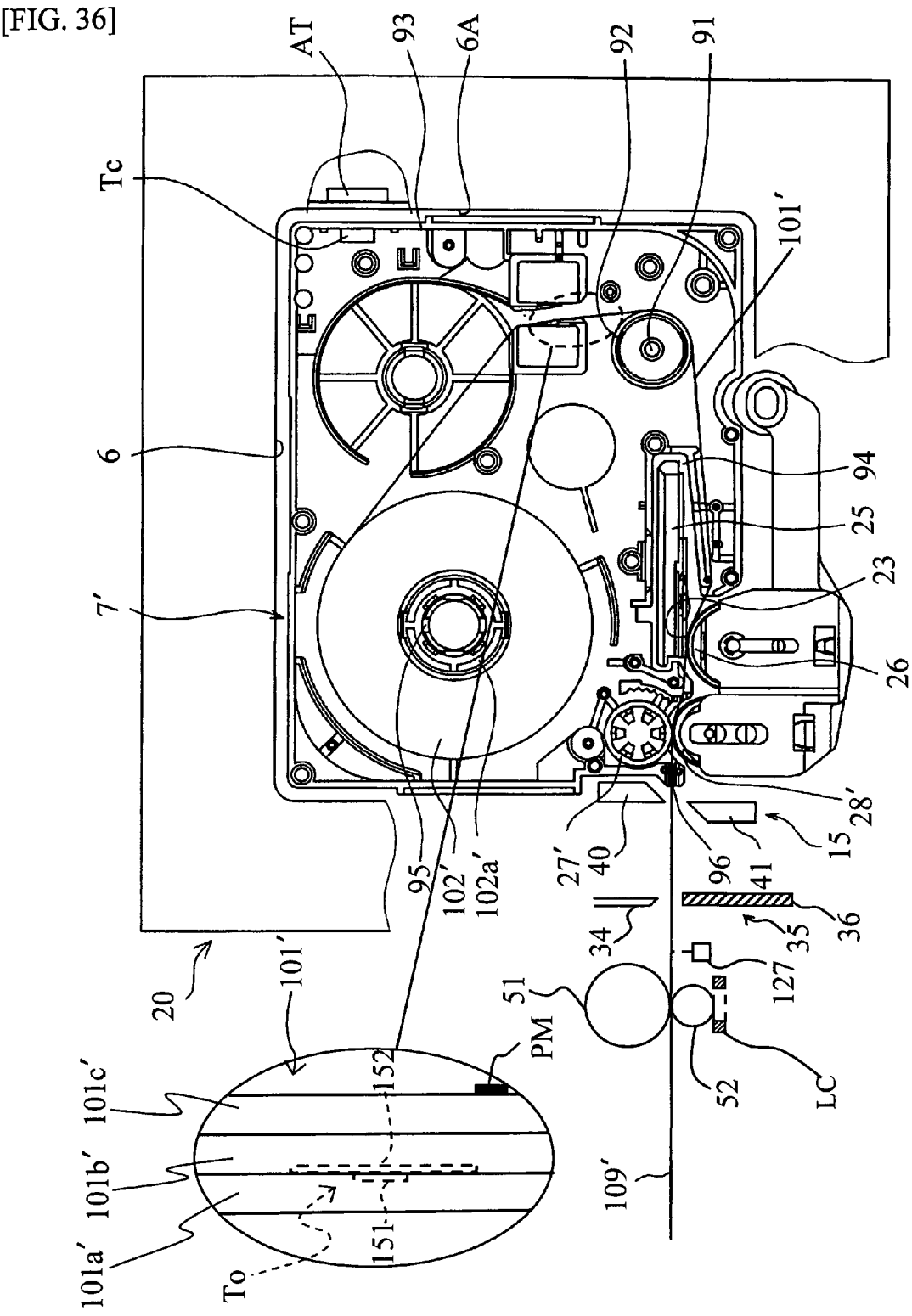

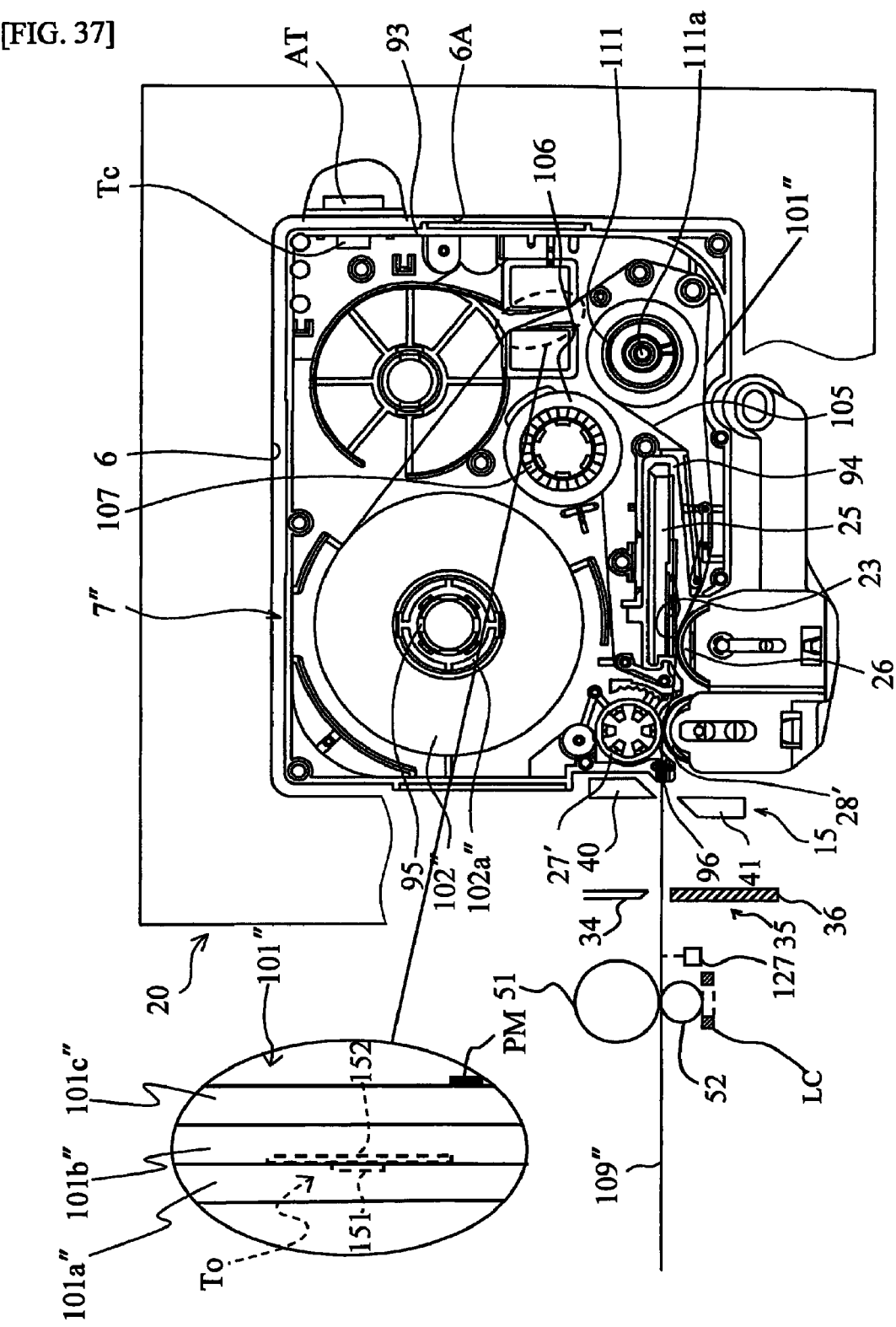

RFID TAG LABEL PRODUCING APPARATUS WITH PRINTING AND DATA TRANSMISSION DEFECT DETECTION

CROSS-REFERENCE TO RELATED APPLICATIONS

This is an application PCT/JP2007/61584, filed Jun. 7, 2007, which was not published under PCT article 21(2) in English and claims the benefits of Japanese Patent application No. 2006-159963 filed Jun. 8, 2006.

BACKGROUND

1. Field

The present disclosure relates to a tag label producing apparatus that produces RFID labels comprising RFID circuit elements for performing wireless communication of information with an external source.

2. Description of the Related Art

An RFID (Radio Frequency Identification) system that performs reading/writing between a small-sized RFID tag and a reader/writer (reading/writing apparatus) in a non-contact manner is known. For example, an RFID circuit element provided to a label-like RFID tag comprises an IC circuit part configured to store predetermined RFID tag information, and an antenna configured to transmit/receive information, connected to the IC circuit part. With such an arrangement, the reader/writer can access (read/write) the RFID tag information in the IC circuit part. Practical implementation is already proceeding in many fields.

Such an RFID tag is normally formed on a label-like material so as to provide an RFID circuit element thereto, and the RFID label is often adhered to a target article for classifying and organizing documents and articles, for example. Information related to the RFID tag information may thus be printed on the label separately from the RFID tag information stored internally, permitting the user to conveniently view the related information on the label. Accordingly, in prior art, a tag label producing apparatus for. producing RFID tags has been proposed from this perspective (see JP, A, 2004-82432, for example).

With the tag label producing apparatus of the prior art, labels provided with RFID circuit elements are bonded to a tape-like mount (label mount) which is made into a roll (recording medium). Printing means (a recording head) prints on the surface of the labels as the label mount is fed out from the roll, and predetermined information is written to RFID circuit elements by transmitting from a apparatus antenna (communication antenna) as the labels are being fed. RFID labels with print are thus produced continuously.

With the prior art, processing can be performed faster than in a case in which feeding is stopped in order to perform communication, as communication is performed without stopping the feeding of the RFID circuit elements. Furthermore, antennas are disposed to two locations upstream in the feeding direction, and if communication with the upstream antennas fails, communication can be retried with downstream antennas, thus making it possible to improve the communication success rate. However, providing multiple antennas raises costs and makes the apparatus larger. Also, since communication is performed without stopping the feeding even when reattempting communication, it cannot be said that there is no risk of communication failing again.

In order to avoid this, communicating after stopping the feeding when reattempting communication is possible, but depending on the feeding-stop position, there are cases in which feeding is stopped right in the middle of the printing means printing characters or symbols (i.e., in a part which is not blank). In this case, there is a risk of thin spots or small blank spaces, etc., occurring at the stop location when printing is restarted, resulting in problems such as print defects remaining on the label surface, reducing printing quality. Alternately, a need arises to correct such print defects by overlap printing (so called connection printing) the existing printed areas in order to prevent harmful effects, which entails the problem of lowering the efficiency of the label producing process.

SUMMARY

An object of the present disclosure is to provide a tag label producing apparatus capable of performing a label producing process with high efficiency while preventing the occurrence of print defects on the label surface.

To achieve this object, an aspect of the present application comprises: a printing device that prints to a predetermined print area of a tag medium, or a print-receiving medium bonded thereto, wherein an RFID circuit element provided with an IC circuit part that stores information and an antenna that transmits/receives information is disposed in said tag medium; a transmitting/receiving device that performs information transmission/reception in a non-contact manner with the RFID circuit element; a feeding device that feeds the tag medium for the printing device to perform printing to the print area; a coordination control portion that controls in coordination operations of the feeding device, the transmitting/receiving device, and the printing device so that feeding of the feeding device and the information transmission/reception by the transmitting/receiving device are performed; a communication determining portion that determines whether or not information transmission/reception with the RFID circuit element by the transmitting/receiving device has succeeded; and a decision portion that decides a feeding-stop condition for stopping feeding of the feeding device based on a feeding-condition for transmission/reception by the feeding device for information transmission/reception by the transmitting/receiving device, and a feeding-condition for printing by the feeding device for printing to the print area by the printing device wherein the coordination control portion controls in coordination operations of the feeding device, the transmitting/receiving device, and the printing device so as to stop feeding of the feeding device based on the feeding-stop condition decided by the decision portion and to perform retry of the information transmission/reception by the transmitting/receiving device when the communication determining portion determines that the information transmission/reception has failed.

In the aspect of the present disclosure usually feed of the feeding device are performed, and during retry only when information transmission/reception failed, the feed is stopped and information transmission/reception is performed, thus making it possible to reduce the amount of time needed for RFID label production, and to improve label production process efficiency.

The feeding-stop conditions (including a feeding-stop position and a feeding-stop period) during a retry is decided by the decision portion based on the feeding-conditions for transmission/reception and the feeding-conditions for printing. It is thus possible to decide the feeding-stop condition to be a stop position at, which the RFID circuit element and the transmitting/receiving device can transmit/receive information, and no print defects will occur in the print area. This makes it possible to. prevent the occurrence of print defects on the label surface, or it is possible to stop at a position where there is no need to perform overlap printing (so called connection printing) of existing printed areas in order to correct print defects, thus making it possible to improve label production process efficiency.

FIG. 1 is a system configuration diagram which shows an RFID tag manufacturing system comprising one embodiment of a tag label producing apparatus of the present disclosure;

FIG. 2 is a perspective view which shows the overall structure of one embodiment of the tag label producing apparatus of the present disclosure;

FIG. 3 is a perspective view which shows the structure of the internal module within the tag label producing apparatus;

FIG. 4 is a plan view which shows the structure of the internal module;

FIG. 5 is an enlarged plan view schematically showing the detailed structure of a cartridge; FIG. 6 is a conceptual view from the direction of arrow D in FIG. 5, illustrating the conceptual configuration of the RFID circuit element To provided in the base tape fed out from the first roll;

FIG. 7 is a partially extracted perspective view illustrating the detailed structure of the main part of the label discharging mechanism;

FIG. 8 is a perspective view showing the outer appearance of the internal module in a state with the label discharging mechanism removed from the structure shown in FIG. 3;

FIG. 9 is a perspective view showing the outer appearance of the cutting mechanism with the half-cutter removed from the internal module;

FIG. 10 is a perspective view showing the outer appearance of the cutting mechanism with the half-cutter removed from the internal module;

FIG. 11 is a perspective view showing the detailed structure of the movable blade and fixed blade along with the half-cutting module;

FIG. 12 is a partially enlarged cross-sectional view showing the detailed structure of the movable blade and fixed blade along with the half-cutting module;

FIG. 13 is a front view showing the outer appearance of the movable blade; FIG. 14 is a cross-sectional view taken along a line A-A in FIG. 13; FIG. 15 is a functional block diagram which shows the control system of the tag label producing apparatus;

FIG. 16 is a circuit diagram showing in an abbreviated manner a circuit configuration of a connection between a transmission circuit and a reception circuit, and a loop antenna;

FIG. 17 is a functional block diagram which shows the functional configuration of an RFID circuit element;

FIG. 18 is a top plan view and a bottom plan view illustrating the appearance of an exemplary RFID label;

FIG. 19 is a diagram illustrating the cross-sectional view of the IXXA-IXXA' cross-section and the IXXB-IXXB' cross-section in FIG. 18 rotated 90° counterclockwise;

FIG. 20 is a diagram which shows an example of a screen displayed on PC when RFID tag information is accessed (read or written);

FIG. 21 is a descriptive view which shows the positional relationship among the tag label tape with print, the loop antenna, the mark sensor, the half-cut unit, the cutting mechanism, and the print head;

FIG. 22 is a diagram illustrating an example of an RFID label; FIG. 23 is a diagram illustrating an example of an RFID label with no rear end area; FIG. 24 is a descriptive view which shows the positional relationship among the tag label tape with print, the loop antenna, the mark sensor, the half-cut unit, the cutting mechanism, and the print head;

FIG. 25 is a diagram illustrating an example of an RFID label; FIG. 26 is a flowchart illustrating a control procedure executed by the control circuit; FIG. 27 is a flowchart which shows the detailed procedure of step S100; FIG. 28 is a diagram for explaining how to score ability to ensure good communication between the RFID circuit element and the loop antenna, a diagram for explaining how to score ability to avoid print defects, and a view showing a table listing correlations of scores for ability to ensure communication and scores for ability to avoid print defects as well as a specific example of calculation of scores for several positions;

FIG. 29 is a flowchart which shows the detailed procedure of step S200; FIG. 30 is a flowchart which shows the detailed procedure of step S300; FIG. 31 is a flowchart which shows the detailed procedure of step S400; FIG. 32 is a flowchart which shows the detailed procedure of step S500; FIG. 33 is a flowchart which shows the detailed procedure of step S600;

FIG. 34 is a flowchart showing a control procedure executed by the control circuit in a modification of a case in which scores are calculated after a communication error occurs;

FIG. 35 is a flow chart showing a detailed procedure of step S700' executed by a control circuit in a modification of a case in which computation is ended when a score which satisfies predetermined conditions is found;

FIG. 36 is a plan view illustrating the detailed structure of a cartridge of a modification in a case where tape bonding is not performed; and FIG. 37 is a plan view illustrating the detailed structure of the cartridge of another modification in a case where tape bonding is not performed.

DETAILED DESCRIPTION OF THE PREFERRED EMBODIMENTS

The following describes an RFID label producing apparatus according to a first embodiment of the present disclosure with reference to accompanying drawings. The present embodiment is an embodiment of a case where the present disclosure is applied to an RFID label manufacturing system.

FIG. 1 is a diagram illustrating the system configuration of an RFID tag manufacturing system comprising a tag label producing apparatus of the present embodiment.

In this RFID tag manufacturing system TS shown in FIG. 1, a tag label producing apparatus 1 is connected to a route server RS, a plurality of information servers IS, a terminal 118a, and a general-purpose computer 118b via a communication line NW in a wired or wireless manner. The terminal 118a and the general-purpose computer 118b will hereinafter be suitably and simply referred to as a "PC 118" collectively.

FIG. 2 is a perspective view showing the overall structure of the tag label producing apparatus 1.

In FIG. 2, the tag label producing apparatus 1 is connected to the PC 118 so as to produce desired RFID labels with print based on operations performed from the PC 118, and comprises an apparatus main body 2 and an opening/closing lid 3 provided on the upper surface of the apparatus main body 2 so as to freely open and close.

The apparatus main body 2 is positioned on the front side (the left front side in FIG. 2), and comprises a side wall 10 comprising a label discharging exit 11 configured to discharge to the outside an RFID label T (described below) produced within the apparatus main body 2, and a side lid 12 provided below the label discharging exit 11 of the side wall 10 with a rotationally supported bottom end.

The front lid 12 comprises a pressing part 13, which is designed to release the side lid 12 forward when the pressing part 13 is pressed from above. A power button 14 configured to turn the power supply of the tag label producing apparatus 1 on and off is provided below an open/close button 4 of the side wall 10. A cutter driving button 16 for driving a cutting mechanism 15 (see FIG. 3 described below) disposed within the apparatus housing 2 based on a manual operation performed by the user is provided below the power button 14, and cuts a tag label tape 109 with print (described below) to a desired length when pressed so as to produce an RFID label T.

The opening/closing lid 3 is rotatably supported by a shaft at the edge of the right rear side in FIG. 2 of the apparatus main body 2, and is always biased in the release direction via a biasing member such as a spring, etc. Then, the opening/closing lid 3 and apparatus main body 2 are unlocked by the pressing of an open/close button 4 disposed adjacent to the opening/closing lid 3 on the upper surface of the apparatus main body 2, and released by the action of the biasing member. Furthermore, in the center side area of the opening/closing lid 3 is provided an inspection window 5 covered by a transparent cover.

FIG. 3 is a perspective diagram showing the structure (with the loop antenna LC described below omitted) of an internal module 20 located in the interior of the tag label producing apparatus 1. In FIG. 3, the internal module 20 generally comprises a cartridge holder 6 configured to house a cartridge 7, a printing mechanism 21 comprising a print head (thermal head) 23, the cutting mechanism 15, a half-cutting module 35 (see FIG. 8 described below), and a label discharging mechanism 22 configured to discharge a produced RFID label T (see FIG. 19 described below) from the label discharging exit 11 (see FIG. 2).

FIG. 4 is a plan view illustrating the structure of the internal module 20 shown in FIG. 3, and FIG. 5 is an enlarged plan view schematically illustrating the detailed structure of the cartridge 7.

In FIGS. 4 and 5, the cartridge holder 6 houses the cartridge 7 so that the orientation of the width direction of the tag label tape 109 with print to be discharged from the label discharging exit 11 is perpendicular. The cartridge 7 has a housing 7A, a first roll 102 disposed inside the housing 7A and around which a tape-shaped base tape 101 is wound, a second roll 104 around which is wound a the clear cover film 103 with substantially the same width as the base tap 101, a ribbon supply side roll 131 configured to feed out an ink ribbon 105 (thermal transfer ribbon, but unneeded if print receiving tape is thermal tape), a ribbon take-up roll 106 for taking up the ribbon 105 after printing, a feeding roller 27 rotatably supported near a tape discharging part 30 of the cartridge 7, and a guide roller 132 which functions as a feed position limiting means.

The feeding roller 27 is configured to affix the base tape 101 and the cover film 103 to each other by applying pressure and feeding the tag label tape 109 with print thus formed in the direction of the arrow A (i.e. functioning as a pressure roller as well).

The first roll 102 stores, in a manner such that it is wound around a reel member 102a, the base tape 101, which has a structure in which a plurality of RFID circuit elements To are serially formed at a predetermined interval along the longitudinal direction. In this example, the base tape 101 has a four-layer structure (see the partially enlarged view in FIG. 5) comprising an adhesive layer 101a formed of a suitable adhesive material, a colored base film 101b formed of PET (polyethylene terephthalate) or the like, an adhesive layer 101c formed of a suitable adhesive material, and a separation sheet 101d. The four layers of the base tape 101 are layered in that order from the side rolled to the inside (the right side in FIG. 5) to the side corresponding to the opposite side (the left side in FIG. 5).

A loop antenna 152 configured to transmit/receive information and constructed in a loop coil shape is provided on the back side of the base film 101b (on the left side in FIG. 5) in an integrated manner in this example, and an IC circuit part 151 configured to store information is formed so that it is connected to the loop antenna 152, thereby constituting an RFID circuit element To.

The adhesive layer 101a is formed on the front side of the base film 101b (on the right side in FIG. 5) for bonding the cover film 103 thereon at a later time. The separation sheet 101d is also bonded to the back side (on the left side of FIG. 5) of the base film 101b by the adhesive layer 101c for wrapping the RFID circuit element To therein.

The separation sheet 101d is peeled off when the RFID label T is affixed as a finished label-like product to a predetermined article or the like, thereby affixing the RFID label T to the article or the like by the adhesive layer 101c. A predetermined identification mark (a black identification mark in this example; a hole passing substantially through the base tape 101 by laser processing, etc. is also possible; see FIG. 19(c) below) PM for feeding control is provided in a predetermined location (a location further forward than the front end of the antenna 152 on the forward side of the feeding direction, in this example) corresponding to each RFID circuit element To on the front surface of the separation sheet 101d.

The second roll 104 has the cover film 103 wound around a reel member 104a. The cover film 103 fed out from the second roll 104 is pressed against the ribbon 105 driven by the ribbon supply side roll 131 and the ribbon take-up roller 106, which are disposed inward from the back side of the cover film 103 (i.e., the side of the cover film 103 which is affixed to the base tape 101), by the print head 23, such that the ribbon 105 is brought into close contact with the back side of the cover film 103.

The ribbon take-up roller 106 and the feeding roller 27 are rotationally driven in coordination by the driving power of a feeding motor 119 (see FIG. 15 described below), which is a pulse motor, for example, provided on the outside of each cartridge 7, that is transmitted to a ribbon take-up roller driving shaft 107 and a tape feeding roller driving shaft 108 via a gear mechanism.

Meanwhile, the print head 23 comprising a great number of heating elements is installed on a head installing part 24 provided on the cartridge holder 6, and is disposed upstream in the feeding direction of the cover film 103 from the feeding roller 27.

In front of the cartridge 7 on the cartridge holder 6 (on the lower side in FIG. 4), a roller holder 25 is rotatably pivoted by a support shaft 29, and is designed so as to be switchable to a print position (contact position; see FIG. 4) or to a release position (break away position) by a switching mechanism. On this roller holder 25 are rotatably provided a platen roller 26 and a tape pressure roller 28. When the roller holder 25 switches to the print position, the platen roller 26 and the tape pressure roller 28 press against the print head 23 and the feeding roller 27.

In the configuration described above, the base tape 101 fed out from the first roll 102 is supplied to the feeding roller 27. The cover film 103 fed out from the second roll 104, in turn, is pressed against the ink ribbon 105 driven by the ribbon supply side roll 131 and the ribbon take-up roller 106, which are disposed inward from the back side of the cover film 103 (i.e., the side of the cover film 103 which is affixed to the base tape 101), by the print head 23, such that the ink ribbon 105 is brought into close contact with the back side of the cover film 103.

Then, when the cartridge 7 is loaded to the cartridge holder 6, and the roll holder 25 is moved from the release position to the print position, the cover film 103 and the ink ribbon 105 are sandwiched between the print head 23 and the platen roller 26, while the base tape 101 and the cover film 103 are sandwiched between the feeding roller 27 and the pressure roller 28. Subsequently, the ribbon take-up roller 106 and the feeding roller 27 are synchronously rotationally driven along the directions denoted by the arrow B and the arrow C, respectively, by the driving force provided from the feeding motor 119. Furthermore, the tape feeding roller driving shaft 108, the pressure roller 28, and the platen roller 26 are connected to one another by a gear mechanism (not shown). With such an arrangement, upon driving the tape feeding roller driving shaft 108, the feeding roller 27, the pressure roller 28, and the platen roller 26 rotate, thereby feeding out the base tape 101 from the first roll 102 to the feeding roller 27 as described above. On the other hand, the cover film 103 is fed out from the second roll 104, and a plurality of heating elements of the print head 23 are powered by a print-head driving circuit 120 (see FIG. 15 described below). As a result, print R (see FIG. 18 described below), which corresponds to information stored in the RFID circuit element To, is printed on the base tape 101 that is to be bonded, on the back side of the cover film 103. Then, the base tape 101 and the printed cover film 103 are affixed to each other by the feeding roller 27 and the pressure roller 28 so as to form a single tape, thereby forming the tag label tape 109 with print, which is then fed to outside the cartridge 7 by the tape discharging part 30. Subsequently, the ribbon take-up roller driving shaft 107 is driven to take up the ink ribbon 105, which has been used to print the print on the cover film 103, onto the ribbon take-up roller 106.

On the upper surface of the housing 7A of the cartridge 7 is provided a tape identification display part 8 configured to display the tape width, tape color, etc., of the base tape 101 built within the cartridge 7, for example. When the cartridge 7 is loaded to the cartridge holder 6 and the opening/closing lid 3 is closed, the inspection window 5 and the tape identification display part 8 are opposite each other, making it possible to visually check the tape identification display part 8 via the transparent cover of the inspection window 5 from outside the apparatus main body 2. With this arrangement, the type of the cartridge 7 loaded to the cartridge holder 6 can be visually inspected with ease via the inspection window 5 from outside the apparatus main body 2.

On the other hand, on the internal module 20 are provided the cutting mechanism 15 and the label discharging mechanism 22 as described above, as well as a loop antenna LC configured to perform reading or writing of information via wireless communication with an RF1D circuit element To provided in the base tape 101 (tag label tape with print after bonding; the same hereafter). Then, after the information of the tag label tape 109 with print bonded and produced as described above is read from or written to the RFID circuit element To by the loop antenna LC, the tag label tape 109 with print is cut by the cutting mechanism 15 either automatically or by operating the cutter driving button 16 (see FIG. 2), thereby forming the RFID label T. This RFID label T is subsequently discharged from the label discharging exit 11 formed by the side wall 10 (see FIG. 2), by the label discharging mechanism 22.

The cutting mechanism 15 comprises a fixed blade 40, a movable blade 41 configured to perform a cutting operation with the fixed blade 40, a cutter helical gear 42 linked to the movable blade 41, and a cutter motor 43 linked by a gear train to the cutter helical gear 42.

The label discharging mechanism 22 is disposed near the label discharging exit 11 provided to the side wall 10 of the apparatus main body 2, and has functionality for forcibly discharging from the label discharging exit 11 the tag label tape 109 with print (i.e., the RFID label T; thus hereafter) after being cut by the cutting mechanism 15. That is, the label discharging mechanism 22 comprises a driving roller (feeding means) 51, a pressure roller 52 opposite the driving roller 51 and across from the tag label tape 109 with print, a pressure operation mechanism part 53 configured to apply pressure to the tag label tape 109 with print with the pressure roller 52 and release that pressure, and a discharge driving mechanism part 54 that is interlocked with the pressure release operation of the pressure operation mechanism part 53 so that it is rotated so as to discharge the tag label tape 109 with print by the driving roller 51.

At this time, on the inside of the label discharging exit 11 are provided first guide walls 55 and 56 and second guide walls 63 and 64 configured to guide the tag label tape 109 with print to the label discharging exit 11 (see FIG. 4). The first guide walls 55 and 56 and the second guide walls 63 and 64 are respectively formed into integrated units and disposed so that they are separated at predetermined intervals at the discharging location of the tag label tape 109 with print cut by the fixed blade 40 and the movable blade 41.

The pressure operation mechanism part 53, comprises a roller support holder 57, a roller support part 58 that is installed on the roller support holder 57 and holds the pressure roller 52 at the front end thereof, a holder support part 59 configured to rotatably support the roller support holder 57, a cam 60 interlocked with the cutting mechanism 15 so as to drive the pressure operation mechanism part 53, and a biasing spring 61.

The roller support part 58 is configured so that the pressure roller 52 is inserted from the vertical direction thereof, and is rotatably supported. Then, the roller support holder 57 rotates in the counterclockwise direction (the direction of arrow 71 in FIG. 3) around a holder support shaft 59 via the cam 60 by the rotation of the cutter helical gear 42, causing the pressure roller 52 to apply pressure to the tag label tape 109 with print. When the cutter helical gear 42 is rotated once again, the holder support shaft 59 rotates in the opposite direction by the biasing spring 61, causing the pressure roller 52 to separate from the tag label tape 109 with print.

The discharge driving mechanism part 54 comprises a tape discharging motor 65 and a gear train 66. After pressure is applied to the tag label tape 109 with print by the driving roller 51 by the pressure roller 52, the tape discharging motor 65 is driven so as to rotate the driving roller 51 in the discharging direction of the tag label tape 109 with print, thereby forcibly discharging the tag label tape 109 with print in the discharging direction.

Note that a mark sensor 127, capable of appropriately detecting the identification mark PM (see FIG. 6, etc., described below) provided to the separation sheet 101 on the base tape 101 corresponding to the position of each RFID circuit element, is provided upstream of the driving roller 51 in the feeding direction (i.e., between a half-cutter 34 described below and the loop antenna LC). This mark sensor 127 is a publicly-known reflective-type photoelectric sensor made up of an optical projector and an optical receiver. Control output from the optical receiver reverses according to whether or not the identification mark PM is present between the optical projector and the optical receiver. The front surface of the first guide wall 56 opposite the mark sensor 127 is of a color that does not reflect the light of the optical projector, and is tilted so that the optical receiver does not receive reflected light.

FIG. 6 is a conceptual view from the direction of arrow D in FIG. 5, illustrating the conceptual configuration of the RFID circuit element To provided in the base tape 101 fed out from the first roll 102. In FIG. 6, the RFID circuit element To comprises the loop antenna 152 constructed in a loop coil shape and configured to perform information transmission/reception, and an IC circuit part 151 connected thereto and configured to store information.

FIG. 7 is a partially extracted perspective view illustrating the detailed structure of the main part of the label discharging mechanism 22. In FIG. 7, the vertical middle section of the above-described first guide walls 55 and 56 is cut out, and the driving roller 51 is provided on the one first guide wall 55 so that it approaches the discharging position of the tag label tape 109 with print from the cutout part. The driving roller 51 comprises a roller cutout part 51A formed by a concentric groove on the upper surface. On the other hand, on the other first guide wall 56, the pressure roller 52 approaches the discharging position of the tag label tape 109 with print from the cutout part, and is supported by the roller support part 58 of the pressure operation mechanism part 53.

The loop antenna LC is disposed near the pressure roller 52 as the pressure roller is positioned at the radial center thereof, and accesses (performs reading/writing with) the RFID circuit element To provided in the tag label tape 109 with print by magnetic induction (including electromagnetic induction, magnetic coupling, and other non-contact method performed via a magnetic field).

FIG. 8 is a perspective view showing the outer appearance of the internal module 20 in a state where the label discharging mechanism 22 is removed from the structure shown in FIG. 3.

In FIG. 8, the cutter helical gear 42 is provided with a boss 50 that is formed in a protruding shape and configured to be inserted in a long hole 49 of the movable blade 41 (see FIG. 11 and FIG. 9 described below). The half-cutting module 35 is installed in the downstream side of the fixed blade 40 and the movable blade 41, along the tape discharging direction, between the fixed blade 40 and the movable blade 41, and the first guide walls 55 and 56 (see FIG. 4).

The half-cutting module 35 comprises a receptacle 38 disposed in alignment with the fixed blade 40, a half-cutter 34 disposed on the movable blade 41 side opposite the receptacle 38, a first guide part 36 disposed in alignment with the fixed blade 40, between the fixed blade 40 and the receptacle 38, and a second guide part 37 disposed in alignment with the movable blade 41, opposite the first guide part 36 (refer also to FIG. 11 described below). The first guide part 36 and the second guide part 37 are configured as a single unit and installed on a side plate 44 (see FIG. 4) along with the fixed blade 40 by a guide fixing part 36A provided in a position corresponding to a fixing hole 40A of the fixed blade 40.

In order to cause the half-cutter 35 to rotate around a rotational fulcrum point (not shown), a half-cutting motor 129 (not shown; see FIG. 15 described below) is provided. A driving mechanism of the half-cutter 34 using the half-cutter motor 129 can be constituted as below, for example, although a detailed illustration is omitted. Specifically, the half-cutter motor 129 is, for example, constituted by an electric motor which can rotate both forward and backward, and is connected to a crank member (not shown) provided with a pin (not shown) via a series of gears (not shown), and long groove for joining with the pin of the crank member is drilled into the half-cutter 34. When the crank member is rotated by the driving force of the half-cutter motor 129, the half-cutter 34 can be rotated in a desired direction (clockwise or counterclockwise) by moving the pin of the crank member along the long groove.

The receptacle 38 is bent so that the end part opposite the tag label tape 109 with print discharged from the tape discharging part 30 is parallel with the tape, forming a receiving surface 38B. Here, the tag label tape 109 with print, as described above, has a five-layer structure in which the base tape 101 of the four-layer structure comprising the adhesive layer 101a, the base film 101b, the adhesive layer 101c, and the separation sheet 101d is bonded to the cover film 103 (refer also to FIG. 19 described below). Then, the cover film 103, the adhesive layer 101a, the base film 101b, and the adhesive layer 101c of the tag label tape 109 with print disposed between the half-cutter 34 and the receiving surface 38B are cut by pressing the half-cutter 34 against the receiving surface 38B using the driving force of the half-cutter motor 129 as described above, leaving only the separation sheet 101d uncut, and forming a half-cut line HC (see FIG. 18 described below) substantially along the tape width direction. Note that a constitution is preferable, for example, in which no overload occurs in the half-cutter motor 129 by a slipping clutch not shown disposed between the gears in the constitution, after the half-cutter 34 and the receiving surface 38B abut. The receiving surface 38B also has the role of guiding the tag label tape 109 with print to the label discharging exit 11, along with the first guide parts 55 and 56.

FIG. 9 and FIG. 10 are perspective views illustrating the outer appearance of the cutting mechanism 15 with the half-cutter 34 removed from the internal module 20.

In these FIGS. 9 and 10, the cutting mechanism 15 is designed so that the movable blade 41 swings from the boss 50 and the long hole 49 with a shaft hole 48 as the fulcrum point when the cutter helical gear 42 rotates by the cutter motor 43 (see FIG. 3), thereby cutting the tag label tape 109 with print.

That is, first, when the boss 50 of the cutter helical gear 42 is positioned on the inside (left side in FIG. 9), the movable blade 41 is positioned away from the fixed blade 40 (hereinafter, referred to as the "initial state"; see FIG. 9). Then, in this initial state, when the cutter motor 43 is driven, rotating the cutter helical gear 42 counterclockwise (in the direction of arrow 70), the boss 50 moves to the outside and the movable blade 41 rotates counterclockwise (in the direction of arrow 73) around the shaft hole 48, cutting the tag label tape 109 with print with the fixed blade 40 fixed in the internal module 20 (hereinafter, referred to as the "cutting state"; see FIG. 10).

After the tag label tape 109 with print is cut so as to form an RFID label in this manner, the movable blade 41 needs to be returned to the initial state in order to cut the next tag label tape 109 with print to be fed. Thus, once again the cutter motor 43 is driven so as to rotate the cutter helical gear 42 counterclockwise (in the direction of arrow 70), thereby once again moving the boss 50 to the inside and rotating the movable blade 41 clockwise (in the direction of arrow 74), separating the movable blade 41 from the fixed blade 40 (see FIG. 9). Then, the next tag label tape 109 with print to be printed and fed from the cartridge 7 is in a cuttable state.

At this time, on the cylindrical outer wall of the cutter helical gear 42 is provided a cutter helical gear cam 42A, and when the cutter helical gear 42 is rotated by the cutter motor 43, a microswitch 126 provided adjacent to the cutter helical gear 42 is switched from an off state to an on state by the action of the cutter helical gear cam 42A. With this, the cutting state of the tag label tape 109 with print is detected.

FIG. 11 is a perspective view illustrating the detailed structure of the movable blade 41 and the fixed blade 40 along with the half-cutting module 35, and FIG. 12 is an enlarged cross-sectional view of that section. In these FIGS. 11 and 12, the fixed blade 40 is fixed by a screw, etc., through the fixing hole 40A to the side plate 44 (see FIG. 4) provided in a standing state on the left side of the cartridge holder 6 within the printing mechanism 15.

The movable blade 41 forms a rough V shape, and comprises a blade part 45 provided on the cutting section, a handle part 46 positioned opposite the blade part 45, and a bent part 47. On the bent part 47 is provided the shaft hole 48, and the movable blade 41 is supported by the side plate 44 at the shaft hole 48 so as to enable rotation with the bent part 47 as the fulcrum point. Further, on the handle part 46 on the side opposite the blade part 45 provided on the cutting section of the movable blade 41 is formed the long hole 49. The blade part 45 is formed by a double-step blade, and the blade surface is constructed by two inclined surfaces, a first inclined surface 45A and a second inclined surface 45B, having different angles of incline and a thickness of the blade part 45 that gradually decreases.

On the other hand, of the first guide part 36 of the above-described half-cutting module 35, an end part 36B opposite the tag label tape 109 with print to be discharged protrudes along the receiving surface 38B formed at the end of the receptacle 38, bending toward the discharging direction of the tag label tape 109 with print. Thus, the end part 36B of the first guide part 36 has a smooth curving surface in the discharging direction of the tag label tape 109 with print at a contact surface 36C of the tag label tape 109 with print discharged from the cartridge 7.

With the end part 36B of the first guide part 36 protruding outward and the contact surface 36C designed as a curved surface, the front end part of the tag label tape 109 with print curled at a constant rate of curvature or higher first comes in contact with the contact surface 36C of the first guide part 36. At this time, when the front end part of the tag label tape 109 with print comes in contact with the downstream side of the discharging direction (downward in FIG. 12) of the tag label tape 109 with print from a boundary point 75 on the contact surface 36C of the first guide part, the front end part of the tag label tape 109 with print moves toward the downstream side along that curved surface and is guided toward the label discharging exit 11 without entering the area between the fixed blade 40 and the first guide part 36 or the receptacle 38.

The first guide part 36 is formed so that a guide width L1 (see FIG. 11) that comes in contact with the feeding path of the tag label tape 109 with print is greater than the maximum width (36 mm in the present embodiment) of the loaded tag label tape 109 with print, and an inner surface 36D is formed continuously to the contact surface 36C. The inner surface 36D is formed opposite the first and second inclined surfaces 45A and 45B (details described below) of the movable blade 41, and comes in partial contact with the first and second inclined surfaces 45A and 45B of the movable blade 41 during cutting (see FIG. 12). Because the blade part is formed from a double-step blade, the movable blade 41 is designed so that a gap 39 is formed between the contact surface 36C and the inner surface 36D of the end part of the first guide part 36 and the second inclined surface 45B of the movable blade 41 (see FIG. 12) when the tag label tape 109 with print is cut by the movable blade 41.

FIG. 13 is a front view of the outer appearance of the movable blade 41, and FIG. 14 is a cross-sectional view of the cross-section A-A in FIG. 13.

In these FIGS. 13 and 14, with regard to the first inclined surface 45A of the present embodiment, the angle formed by the first inclined surface 45A of the blade part 45 and the back surface of the opposite side is 50 degrees.

FIG. 15 is a functional block diagram illustrating a control system of the tag label producing apparatus 1 of the present embodiment. In FIG. 15, a control circuit 110 is disposed on a control board (not shown) of the tag label producing apparatus 1.

On the control circuit 110 are provided the CPU 111 that comprises a timer 111A and is configured to control each device, an input/output interface 113 connected to the CPU 111 via a data bus 112, a CG ROM 114, ROMs 115 and 116, and a RAM 117.

The CG ROM 114 stores dot pattern data for display corresponding with code data for each of the great number of characters.

The ROM (dot pattern data memory) 115 classifies print dot pattern data on a per font (Gothic font, Ming-style font, etc.) basis, and stores the data correspondingly with the code data on a per font basis for the print character sizes of each font, in relation to the respective great number of characters used for printing characters such as letters, symbols, etc. Additionally, the ROM 115 also stores graphic pattern data for printing graphic images including gradation expressions.

The ROM 116 stores the print-head drive control program configured to read the print buffer data in relation to the code data of the characters such as the letters and numbers inputted from the PC 118, and drive the print head 23, the feeding motor 119, and the tape discharging motor 65, the pulse count determining program configured to determine the pulse count corresponding to the formation energy amount of each print dot, the cutting drive control program configured to drive the cutter motor 119 so as to feed the tag label tape 109 with print to the cutting position when printing is completed, and subsequently drive the cutter motor 43 so as to cut the tag label tape 109 with print, the tape discharging program configured to drive the tape discharging motor 65 so as to forcibly discharge the cut tag label tape 109 with print (RFID label T) from the label discharging exit 11, and other various programs required for controlling the tag label producing apparatus 1. The CPU 111 performs various operations based on each such program stored in the ROM 116.

The RAM 117 is provided with a text memory 117A, a print buffer 117B, a parameter storage area 117E, and the like. The text memory 117A stores document data inputted from the PC 118. The print buffer 117B stores a plurality of dot patterns for printing characters and symbols as well as the number of applied pulses, i.e., the amount of energy for forming each dot, as dot pattern data, and the print head 23 performs dot printing according to the dot pattern data stored in the print buffer 117B. The parameter storage area 117E stores the various operation data.

The input/output interface 113 is connected to the PC 118, the print-head driving circuit 120 for driving the print head 23, a feeding motor driving circuit 121 for driving the feeding motor 119, a cutter motor driving circuit 122 for driving the cutter motor 43, a half-cutter motor driving circuit 123 for driving the half-cutter motor 129, a tape discharging motor driving circuit 123 for driving the tape discharging motor 65, a transmission circuit 306 configured to produce carrier waves for accessing (performing reading/writing with) the RFID circuit element To via the loop antenna LC and modulate the carrier wave based on a control signal inputted from the control circuit 110, a reception circuit 307 configured to demodulate and output to the control circuit 110 the response signal received via the loop antenna LC from the RFID circuit element To, a tape cutting sensor 124, and a cutting release detection sensor 125.

In such a control system with the control circuit 110 at its core, when character data and the like are inputted via the PC 118, the text (text data) is successively stored in the text memory 117A, the print head 23 is driven via the driving circuit 120 and each heating element is selectively exothermically driven according to the print dots of one line so as to print the dot pattern data stored in the print buffer 117B, while the feeding motor 119 synchronously controls the feeding of the tape via the driving circuit 121. The transmission circuit 306 controls the modulation of the carrier wave based on a control signal from the control circuit 110, and the reception circuit 307 processes the demodulated signal based on a control signal from the control circuit 110.

The tape cutting sensor 124 and the cutting release detection sensor 125 comprise the cutter helical gear cam 42A and the microswitch 126 provided on the cylindrical outer wall of the cutter helical gear 42 (see FIG. 9 and FIG. 10). Specifically, when the cutter helical gear 42 rotates by the cutter motor 43, the action of the cutter helical gear cam 42A switches the microswitch 126 from an off state to an on state, resulting in the detection of cutting completion of the tag label tape 109 with print by the movable blade 45. The tape cutting sensor 124 is configured based on this process. When the cutter helical gear 42 is further rotated, the action of the cutter helical gear cam 42A switches the microswitch 126 from an ON state to an OFF state, resulting in the detection of the return of the movable blade 45 to the release position. The cutting release detection sensor 125 is configured based on this process.

FIG. 16 is a circuit diagram simply illustrating the circuit configuration of the connection section of the transmission circuit 306, the reception circuit 307, and the loop antenna LC. In FIG. 16, the transmission circuit 306 is connected to the apparatus loop antenna LC, and the reception circuit 307 is connected to a capacitor 310 connected in series with the apparatus loop antenna LC.

FIG. 17 is a functional block diagram which shows the functional configuration of the RFID circuit element To. In FIG. 17, the RFID circuit element To comprises the loop antenna 152 configured to transmit/receive signals in a non-contact manner by magnetic induction with the loop antenna LC of the tag label producing apparatus 1, and the IC circuit part 151 connected to the loop antenna 152.

The IC circuit part 151 comprises a rectification part 153 configured to rectify the carrier wave received via the loop antenna 152, a power source part 154 configured to store the energy of the carrier wave thus rectified by the rectification part 153 as a driving power source, a clock extraction part 156 configured to extract a clock signal from the carrier wave thus received from the loop antenna 152 and supply the clock signal thus extracted to a control part 155, a memory part 157 configured to store a predetermined information signal, a modem part 158 connected to the loop antenna 152, and the control part 155 for controlling the operation of the RFID circuit element To via the rectification part 153, the clock extraction part 156, the modem part 158, etc.

The modem part 158 demodulates the communication signals which have been transmitted from the loop antenna LC of the tag label producing apparatus 1, and which have been received via the antenna 152, and modulates and reflects the carrier waves received via the antenna 152 based on a response signal from the control part 155.

The control part 155 executes basic control, such as interpreting a received signal demodulated by the modem part 158, generating a reply signal based on the information signal stored in the memory part 157, and returning the reply signal from the modem part 158.

FIGS. 18A and 18B are diagrams which show an example of the outer appearance of an RFID label T formed from the cut tag label tape 109 with print after RFID circuit element To information writing (or reading) by the tag label producing apparatus 1 having a configuration such as described above. FIG. 18A is a top view, and FIG. 18B is a bottom view. FIG. 19A is a diagram in which the cross-sectional view of the cross-section IXXA-IXXA' in FIG. 18 is rotated 90° C. in the counter-clockwise direction, and FIG. 19B is a diagram in which the cross-sectional view of the cross-section IXXB-IXXB' in FIG. 18 is rotated 90° C. in the counter-clockwise direction.

In FIGS. 18A, 18B, 19A, and 19B, the RFID label T has a five-layer structure in which the cover film 103 is added to the four-layer structure illustrated in FIG. 5 as described above. The five layers are comprised of the cover film 103, the adhesive layer 101a, the base film 101b, the adhesive layer 101c, and the separation sheet 101d, which are layered from the cover film 103 (upper side in FIG. 19) to the opposite side (lower side in FIG. 19). Furthermore, the RFID circuit element To, including the loop antenna 152 provided on the back side of the base film 101b as described above, is provided within the base film 101b and the adhesive layer 101c, and the label print R (in the example, the text "RF-ID" which indicates the type of RFID label T) corresponding to the stored information, etc., of the RFID circuit element To is printed on the back face of the cover film 103.

On the cover film 103, the adhesive layer 101a, the base film 101b, and the adhesive layer 101c are formed half-cut lines HC (two lines in this example: a front half-cut line HC1 and a rear half-cut line HC2; details described below) substantially along the tape width direction by the half-cutter 34 as previously described. On the cover film 103, the area between these half-cut lines HC1 and HC2 is the print area S where the label print R is printed, and the front end area SI and the rear end area S2 are respectively either side in the tape longitudinal direction from the print area S with the half-cut lines HC1 and HC2 therebetween. Further, with the tag label producing apparatus 1, one set of the base tape 101 and the cover film 103 described above is used to produce a plurality of RFID labels T in sequence using the tag label tape 109 with print bonded thereto, but in the present embodiment, the sequential production remaining number information (in this example, information on the order of the RFID circuit elements To associated with that RFID label T, or in other words, usage count information to the effect that of the 30 RFID circuit elements To in the base tape 101, this is the second RFID circuit element) R1 of the RFID circuit elements To in the base tape 101 is printed in the front end area of the cover film 103 of each RFID label T.

Moreover, a dimension X of the print area S in the tape longitudinal direction (a distance from the half-cut line HC1 to the half-cut line HC2) is set variably according to the content and aspect of the label print R (e.g., number of characters, font, etc.). A dimension X1 of the front end area in the tape longitudinal direction (a distance from the front edge of the tape to the half-cut line HC1) and a dimension X2 of the rear end area in the tape longitudinal direction (a distance from the half-cut line HC2 to a rear edge of the tape) are set to predetermined values (fixed, in this example) in advance (note that the rear half-cut line HC2 is sometimes not provided as described below). Further, the aforementioned identification mark PM remains on the separation sheet 101d, and the distance from the tape feeding direction front end of the identification mark PM to the tape feeding direction front end of the RFID circuit element To offset thereby is a predetermined value L.

FIG. 20 is a diagram illustrating an exemplary screen which may be displayed on the PC 118 (the terminal 118a or the general-purpose computer 118b) when the tag label producing apparatus 1 such as described above accesses RFID tag information (for reading or writing) in the IC circuit part 151 of the RFID circuit element To.

In FIG. 20, the type of RFID label (the access frequency and tape dimensions), the label print R printed correspondingly to the RFID circuit element To, an access (writing/reading) ID which is the unique ID (tag ID) of the RFID circuit element To, an article information address stored in the information server IS, a storage destination address of the corresponding information stored in the router server RS, etc., can be displayed on the PC 118. With such an arrangement, based on an operation performed on the PC 118, the tag label producing apparatus 1 begins operation. Specifically, the label print R are printed on the cover film 103. Furthermore, information such as the writing ID and the article information is written to the IC circuit part 151 (or, information such as the reading ID and article information stored beforehand in the IC circuit part 151 is read out).

At the time of the above-described writing (or readout), the correspondence between the tag ID of the RFID circuit element To of the RFID label T thus produced and the information read from (or written to) the IC circuit part 151 of the RFID label T is stored in the route server RS, and can be referred to as required.

With the tag label producing apparatus 1 having this basic constitution, information transmission/reception is performed between the RFID circuit element To and the loop antenna LC without stopping the feeding of the tag label tape 109 with print. If the information transmission/reception is determined to have failed, the feeding of the tag label tape 109 with print is stopped, and information transmission/reception is reattempted with the feeding stopped. The most important feature of the present embodiment is that if information transmission/reception between the RFID circuit element To and the loop antenna LC fails before printing using the print head 23 is finished, control is performed so as to stop feeding of the tag label tape 109 with print at a stop position at which information transmission/reception is possible and print defects will not occur (or at least be minimized). On the other hand, if information transmission/reception fails between the RFID circuit element To and the loop antenna LC after printing by the print head 23 is complete, the above control is not performed, since stopping the tape feed will not affect printing. Thus, control after information transmission/reception fails in the present embodiment depends on whether or not printing with the print head 23 is finished. Accordingly, the behavior of control is described below using FIG. 21-25 according to the stop position, divided into a case in which printing is finished and a case in which printing is not finished, by the print head 23 at the moment information transmission/reception fails.

(A) When the Print Length is Relatively Long

FIG. 21A to FIG. 21J each constitute an explanatory diagram illustrating the positional relationship between the identification mark PM, the RFID circuit element To, and the print area S of the label print R of the tag label tape 109 with print continually being fed out, as well as the loop antenna LC, the mark sensor 127, the half-cutting module 35, the cutting mechanism 15, and the print head 23. As shown in the figures, in the present embodiment, the distance L from the tape feeding direction front end position of the identification mark PM to the tape feeding direction front end of the RFID circuit element To of the base tape 101 is preset so that it is equivalent to the tape feeding direction distance Lo between the mark sensor 127 and the print head 23.

First, FIG. 21A shows the status immediately after the feed-out of the tag label tape 109 with print begins from the cartridge 7. The identification mark PM has not yet been detected by the mark sensor 127 in the state shown in the figure.

As feeding of the tag label tape 109 with print proceeds further from this state (in other words, feeding of the base tape 101 and the cover film 103; thus hereafter), the area near the tip of the RFID circuit element in the tape feeding direction arrives at the position of the print head 23 (FIG. 21B). Here, as described above, because L=Lo, when the front end of the identification mark PM arrives at the position of the mark sensor 127 due to the movement of the tag label tape 109 with print, the position corresponding to the RFID circuit element To of the cover film 103 (the position where bonding is performed with the RFID circuit element To position of the base tape 101) arrives at the position of the print head 23. In response, the identification mark PM is detected by the mark sensor 127, and the printing of the label print R begins on the cover film 103 (FIG. 21C). In this example, as shown in FIG. 21I to FIG. 21K described below, the example given is of a case where a relatively long text (the letters "ABCDEFGHIJKLMN") is printed.

When the feeding of the tag label tape 109 with print proceeds further from the state of FIG. 21C, the preset position of the front half-cut line HC1 (the position of distance X1 from the tape front end, as previously described; see FIG. 18) arrives at the position of the half-cutting module 35 (FIG. 21D). In this state, because the identification mark PM has already been detected by the mark sensor 127, the detection of arrival at this position is performed by detecting that the tag label tape 109 with print has proceeded a predetermined distance from the state of FIG. 21B (the identification mark PM detection start state). The feeding of the tag label tape 109 with print is then stopped according to this detection, and the front half-cut line HC1 is formed by the half-cutting module 35 (FIG. 21D).

Subsequently, the feeding of the tag label tape 109 with print resumes and, when the feeding of the tag label tape 109 with print further proceeds from the state of FIG. 21D (FIG. 21E), the RFID circuit element To arrives at the position of the loop antenna LC (FIG. 21F). In the present embodiment, in order to shorten the tag label production time wireless communication with the RFID circuit element is performed using the loop antenna LC without stopping the feeding of the tag label tape 109 with print. Furthermore, because relatively long text ("ABCDEFGHIJKLMN") is to be printed as the label print R in this example as previously described, all printing in the print area S is not yet completed at this point in time.

Let us assume that at this point information transmission/reception between the loop antenna LC and the RFID circuit element To fails. In that case, a stop position at which information transmission/reception is possible and print defects will not occur is decided based on a score (discussed below) calculated ahead of time before starting label production, and the tag label tape 109 with print is fed up to that position. Feeding of the tag label tape 109 with print is stopped at that position, and information transmission/reception is reattempted with the RFID circuit element To using the loop antenna LC (FIG. 21G). Once this communication reattempt is finished, feeding of the tag label tape 109 with print is restarted, and ultimately all the printing ("ABDEFGHIJKLMN") is completed.

When the feeding of the tag label tape 109 with print further proceeds from the state of FIG. 21H, the preset position of the rear half-cut line HC2 (the position of distance X2 from the tape rear end, as previously described; see FIG. 18) arrives at the position of the half-cutting module 35. Detection of arrival at this position, similar to the position detection of the front half-cut line HC1, is performed by detecting that the tag label tape 109 with print has proceeded a predetermined distance from the state of FIG. 21B. The feeding of the tag label tape 109 with print is then stopped according to this detection, and the rear half-cut line HC2 is formed by the half-cutting module 35 (FIG. 21I).

Note that in the present embodiment, as discussed above, remaining number information of the RFID circuit elements To is printed on the front end area S1 of the cover film 103 in the RFID label T. Depending on the front-rear positional relation between the loop antenna LC and the print head 23 described above, the remaining number information associated with a particular RFID label T is printed ahead of time on the front end area S1 of the cover film 103 during production of the immediately preceding RFID label T. In other words, as feeding of the tag label tape 109 with print proceeds further from the state in FIG. 21I, the front end area S1 of the cover film 103 corresponding to the next RFID label T arrives at the position of the print head 23. Detection of arrival at this position, similar to the above, is performed by detecting that the tag label tape 109 with print has proceeded a predetermined distance from the state of FIG. 21B. In response to this detection, printing of a print count R1 as the remaining number information is initiated on the cover film 103 (FIG. 21J).

When the feeding of the tag label tape 109 with print further proceeds from the state of FIG. 21J, the position of the cutting line CL (cutting site) corresponding to the tape longitudinal dimension X of the print area S of each RFID label T variably set according to the length of the label print R arrives at the position of the cutting mechanism 15 (note that at this stage, printing of the print count R1 is finished). Detection of arrival at this position, similar to the above, is also performed by detecting that the tag label tape 109 with print has proceeded a predetermined distance from the state of FIG. 21B. The feeding of the tag label tape 109 with print is then stopped according to this detection, cutting is performed on the cutting line CL by the cutting mechanism 15 (FIG. 21K), and the front end side of the tag label tape with print is cut off so as to form the RFID label T.

FIG. 22A and FIG. 22B illustrate an example of the RFID label T completed as described above and substantially correspond to FIG. 18A described above. FIG. 22A illustrates an example of an RFID label T-1 produced first (that is, the first one) using a new base tape 101 and cover film 103, and FIG. 22B illustrates an example of other RFID labels T-2 (that is, all the ones produced after the first one). The RFID circuit elements To are disposed in the center in the tape longitudinal direction of the RFID labels T-1 and T-2 and the label print R is printed in the print area S. The front end area S1 where the identification mark PM is located and the rear end area S2 are provided between the front and rear half-cut lines HC1 and HC2. As described above, in FIG. 22A the remaining number information is not printed in the front end area S1 since the label is the RFID label T-1, which is the first one, but in FIG. 22B, the print count R1 is printed in the front end area S1, since the label is one of the later RFID labels T-2 (in this example the second one).

Note that the length of the print area S varies depending on the aspect of the label print R as described above. If the length of the print area S grows past a certain length due to a large number of letters in the label print R, for example, the rear half-cut line HC2 is omitted (in other words, the rear end area S2 is not set), and the area up to the rear end of the tag label tape 109 with print becomes the print area S in which the label print R is performed.

FIG. 23A and FIG. 23B illustrate examples of RFID labels T with no rear end area S2, and correspond to FIG. 22A and FIG. 22B, respectively. FIG. 23A illustrates an example of an RFID label T-1 produced first (that is, the first one) using a new base tape 101 and cover film 103, and FIG. 23B illustrates an example of other RFID labels T-2 (that is, all the ones produced after the first one). In FIG. 23A and FIG. 23B, the RFID circuit element To is disposed in the center in the tape longitudinal direction of the RFID labels T-1 and T-2 and the label print R is done in the print area S corresponding thereto. Only the front print area S1, where the identification mark PM is located, is provided, on the other side of the front half-cut line HC1 from the print area S. As described above, in FIG. 23A the remaining number information is not printed in the front end area S1 since the label is the RFID label T-1, which is the first one, but in FIG. 23B, the print count R1 is printed in the front end area S1, since the label is one of the later RFID labels T-2.

(B) When the Print Length is Relatively Short

FIG. 24A to FIG. 24K are, like FIG. 21A to FIG. 21K explanatory diagrams illustrating the positional relationship between the identification mark PM, the RFID circuit element To, and the print area S of the label print R of the tag label tape 109 with print continually being fed out, as well as the loop antenna LC, the mark sensor 127, the half-cutting module 35, the cutting mechanism 15, and the print head 23. In this example, as shown in FIG. 24F to FIG. 24K described below, the example given is of a case where relatively short text (the letters "ABCDEFGHIJ") is printed.

First, FIG. 24A to FIG. 24E are similar to the above-described FIG. 21A to FIG. 21E. In other words, feeding of the tag label tape 109 with print from the cartridge 7 is started (FIG. 24A), feeding progresses, the front end of the identification mark PM arrives at the position of the mark sensor 127 (FIG. 24B), and then printing of the label print R on the cover film 103 begins (FIG. 24C). The feeding then further proceeds and the position of the front half-cut line HC1 arrives at the position of the half-cutting module 35. The front half-cutting line HC1 is then formed by the half-cutting module 35 (FIG. 24D), the feeding of the tag label tape 109 with print is resumed, and the feeding of the tag label tape 109 with print further proceeds (FIG. 24E).

Subsequently, because the character count of the label print R is relatively short in this example, the printing of the label print R ("ABCDEFGHIJ") is completed (FIG. 24F) before the RFID tag element To arrives at the position of the loop antenna LC (see FIG. 24G described below).

Thereafter, feeding continues, and the RFID circuit element To arrives at the position of the loop antenna LC (FIG. 24G). As in the case of (A) above, wireless communication with the RFID circuit element is performed using the loop antenna LC without stopping the feeding of the tag label tape 109 with print. Unlike the case of (A), however, all printing to the print area S is finished by this time.

Let us assume that at this point information transmission/reception between the loop antenna LC and the RFID circuit element To fails. In that case, unlike in the case of (A) above, the feeding of the tag label tape 109 with print is immediately stopped, and wireless communication with the RFID circuit element is reattempted using the loop antenna LC. When this communication reattempt is finished, feeding of the tag label tape 109 with print is resumed (FIG. 24H).

The subsequent FIG. 24I to FIG. 24K are similar to the above-described FIG. 21I to FIG. 21K. That is, when the feeding of the tag label tape 109 with print further proceeds from the state of FIG. 45H and the position of the half-cut line HC2 arrives at the position of the half-cutting module 35, the feeding of the tag label tape 109 with print is stopped and the rear half-cut line HC2 is formed by the half-cutting module 35 (FIG. 24I). As feeding continues and the front end area S1 of the cover film 103 corresponding to the next RFID label T arrives at the position of the print head 23, the printing of the print count R1 begins (FIG. 24J), and when feeding continues and the position of the cutting line CL arrives at the position of the cutting mechanism 15 feeding stops, cutting is performed at the cutting line CL by the cutting mechanism 15 (FIG. 24K), and the front end of the tag label tape 109 with print is cut off, resulting in the RFID label T.

FIG. 25A and FIG. 25B illustrate an example of the RFID label T completed as described above and substantially correspond to FIG. 22A and FIG. 22B described above. As described above, in FIG. 25A the remaining number information is not printed in the front end area S1 since the label is the RFID label T-1, which is the first one, but in FIG. 25B, the print count R1 is printed in the front end area S1, since the label is one of the later RFID labels T-2.

Thus, in the present embodiment, if information transmission/reception between the RFID circuit element To and the loop antenna LC fails before printing by the print head 23 is complete, control is performed such that tape feeding is stopped and another attempt is made at a stop position at which information transmission/reception is possible and print defects will not occur.

FIG. 26 is a flowchart showing a control procedure executed by the control circuit 110 for performing such control.

In FIG. 26, the flow begins when a predetermined RFID label producing operation is performed from the tag label producing apparatus 1 via the PC 118. First, in step S100, an operation signal from the PC 118 is inputted (via the communication line NW and the input/output interface 113) and, based on this operation signal, preparatory process configured to set print data and communication data with the RFID circuit element To, as well as for calculating scores for positions in the tape feeding direction (discussed below) is executed (for details, see FIG. 27 described below).

Subsequently, the flow proceeds to step S5, where a control signal is outputted to the feeding motor driving circuit 121 via the input/output interface 113, and the feeding roller 27 and the ribbon take-up roller 106 are rotationally driven by the driving force of the feeding motor 121. Furthermore, a control signal is outputted to the tape discharging motor 65 via the tape discharging motor driving circuit 123, and the driving roller 51 is rotationally driven. With this arrangement, the base tape 101 is fed out from the first roll 102 and supplied to the feeding roller 27, the cover film 103 is fed out from the second roll 104, and the base tape 101 and the cover film 103 are affixed to each other by the feeding roller 27 and the sub-roller 109 so as to form a single tape, thereby forming the tag label tape 109 with print, which is then further fed to outside the tag label producing apparatus 1 from the outward direction of the cartridge 7.

Subsequently, in step S10, a determination is made as to whether or not the identification mark PM of the tag label tape 109 with print has been detected (in other words, whether or not the tag label tape 109 with print has arrived at the print start position), based on the detection signal of the mark detection sensor 127 inputted via the input/output interface 113. Until the identification mark PM is detected, a determination is made that the condition is not satisfied and this step is repeated. Once the identification mark PM is detected, a determination is made that the condition is satisfied, and the flow proceeds to the next step S15.

In step S15, a control signal is outputted to the print-head driving circuit 120 via the input/output interface 113 so as to supply power to the print head 23 and start the printing of the label print R such as letters, symbols, barcodes, or the like (see FIG. 21B and FIG. 21C), corresponding to the print data generated in step S100 in the above-described print area S of the cover film 103 (the area to be substantially bonded to the back face of the RFID circuit element To disposed at an equal interval at a predetermined pitch in the base tape 101).

Subsequently, in step S20, a determination is made as to whether or not the tag label tape 109 with print has been fed to the above-described front half-cut position (in other words, whether or not the tag label tape 109 with print has arrived at the position where the half-cutter 34 of the half-cutting module 35 is in front of the front half-cut line HC1 set in step S100). This decision may be made by detecting, for example, the fed distance after the identification mark PM of the base tape 101 has been detected in step S10, using a predetermined known method (by counting, for example, the number of pulses outputted by the feeding motor driving circuit 121 configured to drive the feeding motor 119, which is a pulse motor). Until the front half-cut position is arrived, a determination is made that the condition is not satisfied and this step is repeated. Once the position has been arrived, a determination is made that the condition is satisfied, and the flow proceeds to the next step S25.

In step S25, a control signal is outputted to the feeding motor driving circuit 121 and the tape discharging motor driving circuit 123 via the input/output interface 113 so as to stop the driving of the feeding motor 119 and the tape discharging motor 65, thereby stopping the rotation of the feeding roller 27, the ribbon take-up roller 106, and the driving roller 51. With this arrangement, in the process wherein the tag label tape 109 with print fed out from the cartridge 7 is moved in the discharging direction, the feed-out of the base tape 101 from the first roll 102, the feed-out of the cover film 103 from the second roll 104, and the feeding of the tag label tape 109 with print are stopped with the half-cutter 34 of the half-cutting module 35 in front of the front half-cut line HC1 set in step S100. At this time, a control signal is also outputted to the print-head driving circuit 120 via the input/output interface 113 so as to stop the power supply to the print head 23, thereby stopping (interrupting) the printing of the above-described label print R.

Subsequently, in step S30, a control signal is outputted to the half-cutter motor driving circuit 128 via the input/output interface 113 so as to drive the half-cutter motor 129 and rotate the half-cutter 34, thereby cutting the cover film 103, the adhesive layer 101a, the base film 101b, and the adhesive layer 101c of the tag label tape 109 with print and perform the front half-cutting process which forms the front half-cut line HC1 (see FIG. 21D).

Then, the flow proceeds to step S35 and, similar to step S5, the feeding roller 27, the ribbon take-up roller 106, and the driving roller 51 are rotationally driven so as to resume the feeding of the tag label tape 109 with print, and, similar to step S15, power is supplied to the print head 23 so as to resume the printing of the label print R.

Subsequently, in step S40, a determination is made as to whether the tag label tape 109 with print will arrive at the communication position (the position where the RFID circuit element To is in front of the loop antenna LC) before the printing of all label print R to the print area S is completed (the state of the aforementioned in FIG. 21F) or whether the printing of all label print R to the print area S will be completed before the tag label tape 109 with print will arrive at the communication position (the position where the RFID circuit element To is in front of the loop antenna LC; the state of the aforementioned in FIG. 21G), according to the print end position that is variably set according to print content (the number of print characters, font, etc.) in step S100 and the tag rear end position (see step S145 described below) set according to the various information of the cartridge 7 included in the operation signal inputted from the operator in step S100.

For example, if the length of the label print R that is to be printed is relatively long and the positional relationship is similar to the state shown in FIG. 21F, the condition of step S40 is satisfied and the flow proceeds to step S200, where long print label production processing is performed. That is, once the tag label tape 109 with print has been fed to the communication position of the RFID circuit element To (to the position where the RFID circuit element To is in front of the loop antenna LC), feeding and printing are stopped and information transmission/reception is performed. Subsequently, feeding and printing are resumed, printing is completed, feeding is further executed, and feeding is stopped at the rear half-cut position so as to form the rear half-cut line HC2, after which the print count R1 for the next RFID label T is printed (margin printing) (see FIG. 33 described below).

On the other hand, if the length of the label print R that is to be printed is relatively short and the positional relationship is similar to the state shown in FIG. 24G, the condition of step S40 is not satisfied and the flow proceeds to step S300, where short print label production processing is performed. That is, the feeding and printing continues as is and, once printing is completed, feeding continues until the tag label tape 109 with print arrives at the communication position of the RFID circuit element To (the position where the RFID circuit element To is in front of the loop antenna LC), where feeding is stopped and information transmission/reception is performed. Subsequently, feeding is resumed once again and then stopped at the rear half-cut position so as to form the rear half-cut line HC2, after which the print count R1 for the next RFID label T is printed (margin printing) (see FIG. 33 described below).

When step S200 or step S300 is completed as described above, the flow proceeds to step S45 (at this moment, the feeding of the tag label tape 109 with print is resumed in step S200 or step S300). In step S45, a determination is made as to whether or not the tag label tape 109 with print has been fed to the above-described full-cut position (in other words, whether or not the tag label tape 109 with print has arrived at the position where the movable blade 41 of the cutting mechanism 15 is in front of the cutting line CL set in step S100). This determination may also be made by detecting, for example, the fed distance after the identification mark PM of the base tape 101 has been detected in step S120, using a predetermined known method (by counting, for example, the number of pulses outputted by the feeding motor driving circuit 121 configured to drive the feeding motor 119, which is a pulse motor) as described above. Until the full-cut position is arrived, a determination is made that the condition is not satisfied and this step is repeated. Once the position has been arrived, a determination is made that the condition is satisfied, and the flow proceeds to the next step S50.

In step S50, similar to step S25, the rotation of the feeding roller 27, the ribbon take-up roller 106, and the driving roller 51 is stopped, thereby stopping the feeding of the tag label tape 109 with print. With this arrangement, the feed-out of the base tape 100 from the first roll 102, the feed-out of the cover film 103 from the second roll 104, and the feeding of the tag label tape 109 with print are stopped with the movable blade 41 of the cutting mechanism 15 in front of the cutting line CL set in step S3001.

Subsequently, in step S55, a control signal is outputted to the cutter motor driving circuit 122 so as to drive the cutter motor 43 and rotate the movable blade 41 of the cutting mechanism 15, thereby performing the full-cut processing wherein the cover film 103, the adhesive layer 101a, the base film 101b, the adhesive layer 101c, and the separation sheet 101d of the tag label tape 109 with print are all cut (separated) to form the cutting line CL (see FIG. 21K). Thus, a label-like RFID label T, which includes the RFID circuit element To to which the RFID tag information has been written, and on which desired printing has been performed correspondingly thereto, is formed by cutting the RFID label T from the tag label tape 109 with print by the separation action executed by the cutting mechanism 15.

Subsequently, the flow proceeds to step S60 where a control signal is outputted to the tape discharging motor driving circuit 123 via the input/output interface 113 so as to drive the tape discharging motor 65 again, thereby rotating the driving roller 51. As a result, the driving roller 51 begins feeding once again. Accordingly, the RFID label T thus formed in the shape of a label in step S55 is fed toward the label discharging exit 11 and discharged to outside the tag label producing apparatus 1 from the label discharging exit 11, and the flow ends.

Furthermore, the cutting processing of step S55 and the label discharging processing of step S60 may be performed in coordination as described below, for example.

For example, first, during the cutting operation performed by the cutting mechanism 15, the cutter motor 43 is driven via the input/output interface 113 and the cutter motor driving circuit 122 so as to rotate the cutter helical gear 42 counterclockwise (in the direction of the arrow 70 in FIG. 3) and, in turn, rotate the roller support holder 57 counterclockwise (the direction of the arrow 71 in FIG. 3) around the holder support part 59 by the boss 50 and the cam 60. Then, immediately before the tag label tape 109 with print is cut by the fixed blade 40 and the movable blade 41, the tag label tape 109 with print is pressed by the driving roller 51 and the pressure roller 52 so as to hold the tag label tape 109 with print until the tape is cut.

Subsequently, a determination is made by the control circuit 110 as to whether or not the cutting of the tag label tape 109 with print has been completed, based on the detection signal of the tape cutting detection sensor 124. When a determination is made that the detection signal of the microswitch 126 has been switched from an OFF state to an ON state and the cutting has been completed, rotation of the cutter motor 43 via the input/output interface 113 and the cutter motor driving circuit 122 is paused. On the other hand, when the cutting has not been complete, the driving of the cutter motor 43 continues until the microswitch 126 switches from an off state to an on state.

When cutting has been completed and the cutter motor 43 stops, the tape discharging motor 65 rotates via the input/output interface 113 and the tape discharging motor driving circuit 123 so as to rotate the driving roller 51 via the gear train 66, thereby discharging the held tape (RFID label T). Then, a determination is made by the control circuit 110 as to whether or not the RFID label T has been discharged based on whether or not a predetermined amount of time (0.5-1.0 sec, for example) has passed since the start of tape feed-out. If so, the rotation of the tape discharging motor 64 is stopped via the input/output interface 113 and the tape discharging motor driving circuit 123. If not, the rotation continues until the RFID label T has been discharged.

After the rotation of the tape discharging motor 65 has stopped, the cutter motor 43 is once again rotated via the input/output interface 113 and the cutter motor driving circuit 122. As a result, the cutter helical gear 42 is also once again rotated so as to rotate and return the movable blade 41 to a released position (see FIG. 12), and the roller support holder 57 is rotated in a direction that causes the biasing sprint 61 to move the pressure roller 52 away (in the direction opposite the arrow 71 of FIG. 3) and is held for a certain interval by the stopper 72. Subsequently, the control circuit 110 detects whether or not the cutting release operation has been completed based on a detection signal from the cutting release detection sensor 125. In a case where the microswitch 126 has not switched from the on state to the off state and the cutting release operation has not been completed, rotation of the cutter motor 43 continues until the cutting release operation is completed. Then, in a case where the microswitch 126 has switched from the ON state to the OFF state and the cutting release operation has been completed, the rotation of the cutter motor 43 is stopped and the full-cut processing and the label discharging processing ends.

FIG. 27 is a flowchart which shows the detailed procedure of step S100. In the flow shown in FIG. 27, first, in step S105, the operation signal entered from the PC 118 is inputted (identified) via the input/output interface 113. This operation signal includes print information such as the characters, design, pattern, and font (character style, size, thickness, etc.) of the label print R and the print count R1 specified by the operator, or the code data of the letters, numbers, and other characters, as well as the write information (at least the RFID tag information including the tag ID as identification information) in a case where information is to be written to the RFID circuit element To. Further, the operation signal also includes information related to the type of the cartridge 7 loaded to the cartridge holder 6 (in other words, tag attribute information such as the disposed interval of the RFID circuit element within the base tape 101, and the tape width of the base tape 101).

The part to be detected (an identification mark having a concavo-convex shape, for example) for cartridge information that is separately provided on the cartridge 7 is detected by suitable detecting means (means configured to perform mechanical detection such as a mechanical switch, a sensor configured to perform optical detection, a sensor configured to perform magnetic detection, etc.), and the type of the cartridge 7 is automatically detected and found based on this detection signal.

Subsequently, the flow proceeds to step S100, where print data corresponding to the print information is created based on the operation signal inputted in step S105.

Then, in step S115, communication data corresponding to the write information is created based on the operation signal inputted in step S105. While this procedure is executed in a case where information is written to the RFID circuit element To so as to produce an RFID label T as described above, the procedure may be omitted in a case where information is stored in advance in the RFID circuit element To and read so as to produce an RFID label T.

Subsequently, the flow proceeds to step S120, where the position of the above-described front half-cut line HC1 is set. This setting sets the position on the tape of the front half-cut line HC1 corresponding to the cartridge information, based on the operation signal inputted in step S105. That is, the disposed interval of the RFID circuit element within the base tape 101 (in other words, the distance between two cutting lines CL; the length of one RFID label T) is uniquely determined as described above according to the type of the cartridge 7, and the position of the front half-cut line HC1 (unlike the position of the rear half-cut line HC2) is determined in advance (stored in a suitable location of the control circuit 110 in table format, etc.) as a certain position from the front end of the tag label tape 109 with print, regardless of the content of the label print R, according to the length of the RFID label T. In this procedure, based on such a premise, the position of the front half-cut line HC1 is set (fixed) to a predetermined position for each cartridge 7.

Then, in step S125, the communication position on the tape based on the above-described RFID circuit element To is set. This setting as well, similar to step S120, sets (fixes) based on the operation signal inputted in step S105 the disposed position of the tag label tape 109 with print of the RFID circuit element To to a predetermined position for each cartridge 7 based on premise that the type (size) and disposed position of the RFID circuit element To are predetermined according to the type of the cartridge 7, the latter as a certain position from the front end of the tag label tape 109 with print.

Subsequently, the flow proceeds to step S130, where the position on the tape where the printing of the label print R is to end is calculated based on the print data created in step S110. That is, the print end position changes according to the content of the label print R, ending (relatively) close to the label rear end side when the print length is long, and ending (relatively) close to the label front end side when the print length is short.

Then, in step S135, the position of the above-described rear half-cut line HC2 is set. This setting sets the position on the tape of the rear half-cut line HC2 corresponding to the cartridge information, based on the operation signal inputted in step S105 and the print end position calculated in step S130. That is, based on the operation signal inputted in step S105, the position of the rear half-cut line HC2 on the tape is calculated by adding (interposing) the distance determined with respect to the print end position calculated in step S130, based on the premise that the distance from the print end position to the rear half-cut line HC2 is constantly predetermined by the type of the cartridge 7.

Subsequently, the flow proceeds to step S140, where the position (full-cut position) of the cutting line CL of the tag label tape 109 with print is set. This setting as well, similar to step S120, sets (fixes) based on the operation signal inputted in step S105 the cutting position of the tag label tape 109 with print to a predetermined position for each cartridge 7, based on the premise that the label size is constantly predetermined according to the type of the cartridge 7.

Then, in step S145, the rear end position of the tape of the above-described RFID circuit element To is set. This setting as well, similar to the above, sets (fixes) based on the operation signal inputted in step S105 the rear end position of the tag label tape 109 with print of the RFID circuit element To to a predetermined position for each cartridge 7 based on the premise that the type (size) and the disposed position of the RFID circuit element To are predetermined according to the type of the cartridge 7.

Then, the flow proceeds to step S150, where a determination is made as to whether or not the position of the rear half-cut line HC2 set in step S135 and the position of the cutting line CL set in step S140 are further on the label rear end side than the rear end position of the RFID circuit element To of step S145. When the position of the rear half-cut line HC2 and the position of the cutting line CL are set on the label rear end side, a determination is made that the condition is satisfied and the flow proceeds to step S160.

In a case where the position of the rear half-cut line HC2 or the cutting line CL is set further on the label front end side than the rear end position of the RFID circuit element To, a determination is made that the condition is not satisfied, and the flow proceeds to S155. In step S155, because the possibility exists that a part of the RFID circuit element To may be cut if left as is, position correcting (resetting) is performed so that both the position of the rear half-cut line HC2 and the position of the cutting line CL are further on the label rear end side than the rear end position of the RFID circuit element To, and the flow proceeds to step S160.

Subsequently, the flow proceeds to step S160, where margin print data (remaining number information data) corresponding to the print information is created based on the operation signal inputted in step S105. Note that as regarding counting the remaining number, it is sufficient simply for the operator to mount the cartridge 7 in the cartridge holder 6 as described above and enter, for example, the total number of RFID circuit elements To which can be produced in the cartridge 7 after the first RFID label T (or alternately a running count) (and it is also possible to increment this sequentially with a counter provided separately in the tag label producing apparatus 1 as production is performed). Alternately, it is also possible to automatically acquire the remaining number (or number used) by placing the production count in a server, for example, associated with the part to be detected provided separately to the cartridge 7 and searching in the server when the cartridge 7 is mounted, as with the cartridge information described above. Further, it is also possible to acquire this through information transmission/reception with each RFID circuit element To.

Thereafter, the flow moves to step S165, and a printing position for the margin printing data (remaining number information) created in step S160 is set. This setting as well, similar to the above, sets (fixes) based on the operation signal inputted in step S105 the position of the front end area S1 for executing margin printing, based on the cutting line CL of the tag label tape 109 with print to a predetermined position for each cartridge 7, based on the premise that the label size is constantly predetermined according to the type of the cartridge 7.

Thereafter, in step S170, when communication is performed from the loop antenna LC to the RFID circuit element To as described below, variables L, M, and N configured to count the number of times communication is reattempted (the number of access attempts) in a case where there is no response from the RFID circuit element To, and a flag F used to indicate whether or not communication was successful are initialized to zero (0).

Thereafter, in step S175, a process for calculating an overall score is performed. The overall score is a comprehensive (numerical) evaluation of the ability to ensure good communication between an RFID circuit element To and the loop antenna LC and the ability to avoid print defects, given positions in the feeding direction (e.g., positions at each dot) within the print area S of the tag label tape 109 with print. The overall score is calculated for each feeding-direction position on the tag label tape 109 with print, based on a predetermined table (see FIG. 28C described below) stored in the RAM 117 ahead of time. The routine finishes once the calculation of these scores is finished. The calculated overall score is stored in memory (e.g., in the RAM 117) as described below.

FIG. 28A is a view for explaining how scoring is done in terms of the ability to ensure good communication between an RFID circuit element To and the loop antenna LC when calculating scores. As shown in FIG. 28A, the tag label tape 109 with print is scored at three areas, A, B, and C (note that three areas is not a limitation: scoring may be divided for two areas or even more areas). When the RFID circuit element To is substantially directly opposite the loop antenna LC, the distance from the loop antenna LC less than or equal to a predetermined value, or the electric field intensity of the loop antenna LC is greater than or equal to a predetermined value, and therefore the area A is an area where the ability to ensure good communication is relatively good. On the other hand, the area C is an area where the ability to ensure good communication is relatively low, since the distance from the loop antenna LC greater than or equal to a predetermined value, or the electric field intensity of the loop antenna LC is less than or equal to a predetermined value. The area B is an area in which the ability to ensure good communication is between those of the area A and the area C. The communication condition scores for the areas A, B, and C are 1.0, 0.7, and 0.4, respectively. Note that the range of areas and the scores may be appropriately changed according to tag properties, or communication conditions such as communication protocol, transmission power, and the like.

FIG. 28B is a view for describing how scoring is done in terms of the ability to avoid print defects, when calculating scores. As shown in FIG. 28B, the ability to avoid print defects is scored according to whether the printed characters (the printed characters is determined based on the print data created at step S110) at each position is a non-print blank part located between printed characters or inside printed visual objects ("white solid" in the drawing; hereafter called "white solid" as appropriate), a print fill area of a predetermined size ("black solid" in the drawing; hereafter called "black solid" as appropriate), in the middle of drawing a straight line extending in the feeding direction ("horizontal line" in the drawing; hereafter called "horizontal line" as appropriate), or in the middle of drawing a straight line intersecting the feeding direction at a predetermined angle or more ("diagonal line/vertical line" in the drawing; hereafter called "diagonal line/vertical line" as appropriate). The print condition scores for the printed characters are 1.0, 0.7, and 0.5, respectively. Note that the types of printed characters and scores may be changed appropriately according to the print head characteristics, the feeding speed of the tag label tape 109 with print, and so on.

FIG. 28C is a table showing overall scores set from the communication condition scores regarding the ability to ensure communication and print scores regarding the ability to avoid print defects, and was made by adding together the scores shown in FIG. 28A and FIG. 28B. As described above, this table is stored in the RAM 117 ahead of time, and calculation of overall scores with regard to positions in the feeding direction in the print area S of the tag label tape 109 with print is performed based on this table.

The calculation of scores based on this table and control behavior based on these scores is described with reference to FIG. 21 and FIG. 28D described above. Print scores are made preferably in units of dots, but to simplify the description here, a few positions will be scored. FIG. 28D is a view showing specific examples of scores at these positions (communication condition score, print condition score, overall score).

For example, in the state shown in FIG. 21F described above, the score regarding the ability to ensure communication is for the area B and the printed characters at the position corresponding to the print head 23 is a horizontal line as shown by AAA in FIG. 21F. Therefore the communication condition score is 0.7, the print score is 0.5, and the overall score is 1.2. In the state shown in FIG. 21O; the area is A, and the printed characters at the position corresponding to the print head 23 is "all white" as shown by BBB in FIG. 21G Therefore the communication condition score is 1.0, the print score is 1.0, and the overall score is 2.0. In the state shown in FIG. 21H, the area is A, and the printed characters at the position corresponding to the print head 23 is "vertical line" as shown by CCC in FIG. 21H. Therefore the communication condition score is 1.0, the print score is 0.3, and the overall score is 1.3. As a result, if a communication error occurs in the state of FIG. 21F, that will be the maximum overall score of later positions in the feeding direction; in other words, the position in FIG. 21G at which the overall score is 2.0 is decided as the feeding-stop position, and the tape feed is controlled so as to stop at that position (see FIG. 30 below).

By making the position with the maximum overall score the feeding-stop position for reattempts in this way, it is possible to decide a feeding-stop position based on a feeding-condition for transmission/reception (a feeding-condition at which good information transmission/reception is possible between the RFID circuit element To and the loop antenna LC) and a feeding-condition for printing (a feeding-condition at which print defects will not arise during stoppage). As a result, it is possible to decide a feeding-stop position to be a stop position at which information transmission/reception between the RFID circuit element To and the loop antenna LC is possible and at which print defects will not occur in the print area.

FIG. 29 is a flowchart which shows the detailed procedure of step S200. In the flow shown in FIG. 29, first, in step S210, a determination is made as to whether or not the tag label tape 109 with print has been fed to the aforementioned position of communication with the loop antenna LC (in other words, whether or not the tag label tape 109 with print has arrived at the position where the loop antenna LC is substantially in front of the RFID circuit element To, which is set in step S125). A determination at this time as well, similar to step S20 of the FIG. 26, may be made by detecting, for example, the fed distance after the identification mark PM of the base tape 101 has been detected in step S10, using a predetermined known method. Until the communication position is arrived, a determination is made that the condition is not satisfied and this step is repeated. Once the position has been arrived, a determination is made that the condition is satisfied, and the flow proceeds to the next step S400.

In step S400, information transmission/reception is performed via wireless communication between the antenna LC and the RFID circuit element To so as to perform information transmission/reception processing (for details, see FIG. 31 described below) which writes the information created in step S115 of FIG. 27 to the IC circuit part 151 of the RFID circuit element To (or which reads information stored in advance in the IC circuit part 151).

Subsequently, the flow proceeds to step S230 where a determination is made as to whether or not the information transmission/reception of step S400 succeeded. Specifically, in step S400, because the flag F should equal 1 when communication fails (see step S437 of FIG. 31 described below), a determination is made as to whether or not F=0.

If F=0, a determination is made that the condition is satisfied, communication is deemed successful, and the flow proceeds to step S3250.

On the other hand, if F=1, a determination is made that the condition is not satisfied, communication is deemed a failure, and the flow proceeds to step S3250.

In step S235, the area with the highest overall score at each position in the feeding direction of the tag label tape 109 with print after communication fails is selected based on the calculation results of the scores in step S175 above, and the selected area is made the feeding-stop position.

Subsequently, in step S237, a determination is made as to whether or not the tag label tape 109 with print has been fed to the tape feeding position decided above (in other words, whether or not the tag label tape 109 with print has arrived at the position at which the feeding-stop position decided in step S235 is substantially opposite the print head 23). A determination at this time as well, similar to step S20 of the FIG. 26, may be made by detecting, for example, the fed distance after the identification mark PM of the base tape 101 has been detected in step S10, using a predetermined known method. Until the communication position is arrived, a determination is made that the condition is not satisfied and this step is repeated. Once the position has been arrived, a determination is made that the condition is satisfied, and the flow proceeds to the next step S240.

In step S240, similar to step S25, the rotation of the feeding roller 27, the ribbon take-up roller 106, and the driving roller 51 is stopped, thereby stopping the feeding of the tag label tape 109 with print, with the print head 23 substantially opposite the feeding-stop position. Also, the power supply to the print head 23 is stopped so as to stop (interrupt) the printing of the label print R (see FIG. 21G).

Subsequently, in step S400, information transmission/reception between the antenna LC and the RFID circuit element To is reattempted (see FIG. 31 described below for details).

In step S245, similar to step S35 of FIG. 26, the feeding roller 27, the ribbon take-up roller 106, and the driving roller 51 are rotationally driven so as to resume the feeding of the tag label tape 109 with print, and power is supplied to the print head 23 so as to resume the printing of the label print R.

At this time, in a case where the communication attempt count (retry count) of step S400 is high, causing the power stopped time period of the print head 23 of step S240 and thereafter to lengthen a certain degree, the possibility exists that the temperature of the print head 23 is low. In response, the amount of power (amount of energy per unit time) supplied to the print head 23 may be increased more than usual when the printing is resumed in step S245.

Once step S230 or step S245 is finished, the flow moves to step S250. In step S250, a determination is made as to whether or not the tag label tape 109 with print has been fed to the above-described print end position (calculated in step S130 of FIG. 27). A determination at this time as well, similar to the above, may be made by detecting, for example, the fed distance after the identification mark PM of the base tape 101 has been detected in step S10, using a predetermined known method. Until the print end position is arrived, a determination is made that the condition is not satisfied and this step is repeated. Once the position has been arrived, a determination is made that the condition is satisfied, and the flow proceeds to the next step S260.

In step S260, similar to step S25 of FIG. 26, the power supply to the print head is stopped, thereby stopping the printing of the label print R. As a result, the printing of the label print R in the print area S is completed (see FIG. 21H).

Subsequently, the flow proceeds to step S500, where rear half-cutting process configured to form the rear half-cut line HC2 by the half-cutter 34 of the half-cutting module 35 is performed after the tag label tape 109 with print has been fed to a predetermined rear half-cut position (for details, see FIG. 32 described below). Subsequently, in step S600, a margin printing process is executed for printing the print count R1 described above on the front end area S1 (of the next RFID label T) positioned away from the cutting line CL in the direction of the tape end (see FIG. 33 described below for details), and the routine ends.

FIG. 30 is a flowchart which shows the detailed procedure of step S300. In the flow shown in FIG. 30, first, in step S310, similar to step S250 of FIG. 28, a determination is made as to whether or not the tag label tape 109 with print has been fed to the print end position (calculated in step S130 of FIG. 48). A determination at this time may also be made using the same method as that in step S250. Until the print end position is arrived, a determination is made that the condition is not satisfied and this step is repeated. Once the position has been arrived, a determination is made that the condition is satisfied, and the flow proceeds to the next step S320.

In step S320, similar to step S260 of FIG. 29, the power supply to the print head 23 is stopped, thereby stopping the printing of the label print R. As a result, the printing of the label print R in the print area S is completed (see FIG. 24F).

Subsequently, the flow proceeds to step S330 where, similar to step S210 of FIG. 29, a determination is made as to whether or not the tag label tape 109 with print has been fed to the above-described position of communication with the loop antenna LC. A determination at this time may also be made using the same method as that in step S210. Until the communication position is arrived, a determination is made that the condition is not satisfied and this step is repeated. Once the position has been arrived, a determination is made that the condition is satisfied, and the flow proceeds to the next step S400.

Step S400 is identical to that shown in FIG. 29, where information transmission/reception processing configured to perform information transmission/reception by wireless communication between the antenna LC and the RFID circuit element To is performed (for details, see FIG. 31 described below).

Subsequently, the flow proceeds to step S340 where, similar to step S230 of FIG. 29, a determination is made as to whether or not the information transmission/reception of step S400 was successful according to whether or not F=0.

If F=1, the determination is not satisfied, and the flow moves to step S350. In step S350, similar to step S240, the rotation of the feeding roller 27, the ribbon take-up roller 106, and the driving roller 51 is stopped, thereby stopping the feeding of the tag label tape 109 with print, with the print head 23 substantially opposite the feeding-stop position. Also, the power supply to the print head 23 is stopped so as to stop (interrupt) the printing of the label print R (see FIG. 24G).

Subsequently, in step S400, information transmission/reception between the antenna LC and the RFID circuit element To is reattempted (see FIG. 31 below for details).

Subsequently, in step S360, similar to step S245, the feeding roller 27, the ribbon take-up roller 106, and the driving roller 51 are rotationally driven so as to resume the feeding of the tag label tape 109 with print, and power is supplied to the print head 23 so as to resume the printing of the label print R.

The next steps, S500 and S600, are the same as that of FIG. 29, and a description thereof will be omitted.

FIG. 31 is a flowchart which shows the detailed procedure of step S400 described in FIG. 29 and FIG. 30. In this example, of the above-described information writing and information reading, information writing will be described as an example.

First, in step S405 of the flow shown in FIG. 31, a control signal is outputted to the transmission circuit 306 (see FIG. 15, etc.) via the input/output interface 113 so as to transmit a carrier wave subjected to predetermined modulation to the RFID circuit element To of the write target via the loop antenna LC as an "Erase" signal configured to initialize the information stored in the memory part 157 of the RFID circuit element To. As a result, the memory part 157 of the RFID circuit element To is initialized.

Subsequently, in step S410, a control signal is outputted to the transmission circuit 306 via the input/output interface 113 so as to transmit a carrier wave subjected to predetermined modulation to the RFID circuit element To of the information write target via the loop antenna LC as a "Verify" signal configured to check the content of the memory part 157, and prompt a response.

Thereafter, in step S415, a reply signal transmitted from the RFID circuit element To of the write target in response to the "Verify" signal is received via the loop antenna LC, and incorporated via the reception circuit 307 (see FIG. 15, etc.) and the input/output interface 113.

Subsequently, in step S420, the information stored in the memory part 157 of the RFID circuit elements To is checked based upon the received reply signal, and a determination is made as to whether or not the memory part 157 has been normally initialized.

In a case where a determination is made that the condition is not satisfied, the flow proceeds to step S425 where M is incremented by one. Then, in step S430, a determination is made as to whether or not M=5. In a case where M<4, the determination is made that the condition is not satisfied and the flow returns to step S405 and the same procedure is repeated. In a case where M equals five, the flow proceeds to step S435 where an error display signal is outputted to the PC 118 via the input/output interface 113 and the communication line NW so as to display the corresponding writing failure (error). Further, in step S437, the aforementioned flag F is set to 1, and the routine ends. With such an arrangement, a maximum of five reattempts are performed even if initialization fails.

When a determination is made in step S420 that the condition is satisfied, the flow proceeds to step S440 where a control signal is outputted to the transmission circuit 306 so as to transmit a carrier wave subjected to predetermined modulation to the RFID circuit element To of the information write target via the loop antenna LC as a "Program" signal configure to write desired data to the memory part 157, and write the information.

Subsequently, in step S445, a control signal is outputted to the transmission circuit 306 so as to transmit a carrier wave subjected to predetermined modulation as a "Verify" signal to the RFID circuit element To of the information write target via the loop antenna LC, and prompt a response. Subsequently, in step S450, a reply signal transmitted from the RFID circuit element To of the write target in response to the "Verify" signal is received via the loop antenna LC, and incorporated via the reception circuit 307 and the input/output interface 113.

Subsequently, in step S455, the information stored within the memory part 157 of the RFID circuit element To is checked based on the received reply signal, and a determination is made as to whether or not the transmitted predetermined information has been normally stored in the memory part 157, using a known error detecting code (CRC code: Cyclic Redundancy Check, etc).

In a case where a determination is made that the condition is not satisfied, the flow proceeds to step S460 where N is incremented by one. Then, in step S465, a determination is made as to whether or not N is equal to five. In a case where a determination is made that N is less than or equal to 4, a determination is made that the condition is not satisfied, the flow returns to step S440, and the same procedure is repeated.

In a case where N is equal to five, the flow returns to step S435 where the corresponding writing failure (error) is similarly displayed on the PC 118. Subsequently, in step S437, the flag F is set to one, and the routine ends. With such an arrangement, a maximum of five retries are performed even if information writing fails.

When a determination is made in step S455 that the condition is satisfied, the flow proceeds to step S470 where a control signal is outputted to the transmission circuit 306 so as to transmit a carrier wave subjected to predetermined modulation as a "Lock" command to the RFID circuit element To of the information write target via the loop antenna LC, and prohibit the writing of new information to the RFID circuit element To. As a result, the writing of RFID tag information to the RFID circuit element To, to which writing is to be performed, is completed.

Subsequently, the flow proceeds to step S480 where the combination of information written to the RFID circuit element To in step S440 and the corresponding print information of the label print R to be printed in the print area S by the print head 23 is outputted via the input/output interface 113 and the communication line NW and stored in the information server IS and router server RS. Furthermore, this stored data are stored and maintained within the database of each server IS and RS, for example, for use as reference by the PC 118 as needed. With the above, the routine ends.

FIG. 32 is a flowchart which shows the detailed procedure of step S500 described in FIG. 29 and FIG. 30.

First, in step S510 of the flow shown in FIG. 32, a determination is made as to whether or not the position of the rear half-cut line HC2 set in step S135 and the position of the cutting line CL set in step S140 are at a predetermined distance or more away from each other. When the position of the rear half-cut line HC2 and the position of the cutting line CL are too close, a determination is made that the condition is not satisfied, provision of the rear half-cut line HC2 separate from the cutting line CL is deemed inappropriate, and the routine ends. On the other hand, if the position of the rear half-cut line HC2 and the position of the cutting line CL are sufficiently far away from each other, a determination is made that the condition is satisfied and the flow proceeds to step S520. Note that step S510 is a procedure to prevent problems from arising in the operation of the apparatus, such as, for example, the positions of the cutting line CL and the rear half-cut line HC2 from getting too close to each other and the label being peeled off during the full cut, or the peeled tape from becoming attached to the movable blade 41, etc., of the cutting mechanism 15.

In step S520, similar to step S20, a determination is made as to whether or not the tag label tape 109 with print has been fed to the above-described rear half-cut position (in other words, whether or not the tag label tape 109 with print has arrived at the position where the half-cutter 34 of the half-cutting module 35 is in front of the rear half-cut line HC2 calculated in step S135). Similar to the above, this determination may also be made by detecting the fed distance after the identification mark PM of the base tape 101 has been detected in step S10, using a predetermined known method (by counting, for example, the number of pulses outputted by the feeding motor driving circuit 121 configured to drive the feeding motor 119, which is a pulse motor). Until the rear half-cut position is arrived, a determination is made that the condition is not satisfied and this step is repeated. Once the position has been arrived, a determination is made that the condition is satisfied, and the flow proceeds to the next step S530.

In step S530, similar to the previously described step S50, etc., a control signal is outputted to the feeding motor driving circuit 121 and the tape discharging motor driving circuit 123 via the input/output interface 113 so as to stop the driving of the feeding motor 119 and the tape discharging motor 65, thereby stopping the rotation of the feeding roller 27, the ribbon take-up roller 106, and the driving roller 51. With this arrangement, the feed-out of the base tape 101 from the first roll 102, the feed-out of the cover film 103 from the second roll 104, and the feeding of tag label tape 109 with print are stopped with the half-cutter 34 of the half-cutting module 35 in front of the rear half-cut position HC2 calculated in step S135.

Subsequently, the flow proceeds to step S540 where, similar to step S30, a control signal is outputted to the half-cutter motor driving circuit 128 so as to rotate the half-cutter 34, thereby cutting the cover film 103, the adhesive layer 101a, the base film 101b, and the adhesive layer 101c of the tag label tape 109 with print and perform the rear half-cutting process which forms the rear half-cut line HC2 (see FIG. 21I and FIG. 24I).

Then, the flow proceeds to step S550 where, similar to step S35, the feeding roller 27, the ribbon take-up roller 106, and the driving roller 51 are rotationally driven, thereby resuming the feeding of the tag label tape 109 with print, and the routine ends.

FIG. 33 is a flowchart showing the detailed procedure of step S600 described above in FIG. 29 or FIG. 30. In the flow shown in FIG. 33, first, in step S620, a determination is made as to whether or not the tag label tape 109 with print has been fed to the blank area printing start position described above (calculated in step S165 of FIG. 27). A determination at this time as well, similar to the above, may be made by detecting, for example, the fed distance after the identification mark PM of the base tape 101 has been detected in step S10, using a predetermined known method. Until the margin printing start position is arrived, a determination is made that the condition is not satisfied and this step is repeated. Once the position has been arrived, a determination is made that the condition is satisfied, and the flow proceeds to the next step S640.

In step S640, as described above, printing of the print count R1 is started by turning the power on to the print head 23 (see FIG. 21J and FIG. 24J).

Subsequently, the flow proceeds to step S660 where a determination is made as to whether or not the tag label tape 109 with print has been fed to the margin printing end position (substantially set in step S160 and step S165 of FIG. 27). A determination at this time as well, similar to the above, may be made by detecting, for example, the fed distance after the identification mark PM of the base tape 101 has been detected in step S10, using a predetermined known method. Until the margin printing end position is arrived, a determination is made that the condition is not satisfied and this step is repeated. Once the position has been arrived, a determination is made that the condition is satisfied, and the flow proceeds to the next step S680.

In step S680, similar to step S260 described above, the power supply to the print head 23 is stopped, thereby stopping the printing of the remaining number information R. Printing of the remaining number information R is thus finished for the front end area S1, and the routing finishes.

In the above, step S200 and step S300 executed by the control circuit 110 constitute the coordination control means for controlling in coordination operations of the feeding means, the transmitting/receiving means, and the printing means so as to perform the feeding of the feeding means and information transmission/reception with the transmitting/receiving means in the claims, and step S230 executed by the control circuit 110 constitutes the communication determining means for determining whether or not information transmission/reception with the RFID circuit element of the transmitting/receiving means was successful.

Further, step S175 and step S235 executed by the control circuit 110 constitute the decision means for deciding a feeding-stop condition based on feeding-conditions for transmitting/receiving and feeding-conditions for printing, constitute the print determining means for determining whether or not print defects have occurred in the print area of the printing means described in claim 2, and constitute the communication determining means for determining whether or not the distance from the transmitting/receiving means to the RFID circuit element is less than or equal to a predetermined value or the electric field intensity of the transmitting/receiving means is greater than or equal to a predetermined value described in claim 4.

Further, step S175 executed by the control circuit 110 constitutes the first calculating means for calculating and computing scores for each feeding timing after starting feeding by the feeding means and before executing printing by the printing means and information transmission/reception by the transmitting/receiving means described in claim 7.

In the tag label producing apparatus of the present embodiment constituted as described above, under control of the control circuit 110 the tag label tape 109 with print provided with the RFID circuit elements To is fed, printing to the print area S of the cover film 103 is done by the print head 23, and information transmission/reception in a non-contact manner is performed with the RFID circuit elements To via the loop antenna LC with the feeding stopped. The results of whether information transmission/reception was successful or not are determined, and if it is determined to have failed, information transmission/reception with the loop antenna LC is reattempted while the feeding of the tag label tape 109 with print is stopped. In this way, information transmission/reception is ordinarily performed without stopping the feeding of the tag label tape 109 with print and only stopping the feeding when information transmission/reception is performed and the information transmission/reception fails and is reattempted, thus making it possible to reduce the amount of time needed for RFID label production, and to improve label production process efficiency.

Deciding the feeding-stop position during a reattempt based on feeding-conditions for transmission/reception and feeding-conditions for printing makes it possible to decide a stop position at which information transmission/reception between the RFID circuit element To and the loop antenna LC is possible and print defects in the print area will not occur. This makes it possible to prevent the occurrence of print defects on the label surface, or it is possible to stop at a position where there is no need to perform overlap printing (so called connection printing) of existing printed parts in order to correct print defects, thus making it possible to improve label production process efficiency.

With the present embodiment in particular, the feeding-stop position during a reattempt is decided by scoring the ability to avoid print defects based on whether or not the printed characters at the position of the print head 23 when feeding is stopped is white solid, black solid, a horizontal line, or a diagonal/vertical line. It is thus possible to make the stop position a position at which the print head position is white solid or black solid, and avoid stop positions at which the print head position would be at a horizontal line or a diagonal/vertical line, making it possible to avoid the occurrence of print defects on the label surface such as white lines, or eliminating the need for overlap printing (so called connection printing) of printed parts in order to correct print defects.

With the present embodiment in particular, the feeding-stop position during reattempts is decided by scoring the ability to ensure communication based on whether the distance of the RFID circuit element To to the loop antenna LC is less than or equal to a predetermined value when substantially opposite the loop antenna LC, or whether the field intensity of the loop antenna LC is greater than or equal to a predetermined value. The feeding-stop position can thus be decided so as to be a range allowing good communication between the loop antenna LC and the RFID circuit element To.

With the present embodiment in particular, scores are calculated for each feeding-direction position along the tag label tape 109 with print, and the feeding-stop position is decided based on these scores. By deciding the feeding-stop position using numerical scores for the ability to ensure good communication and the ability to avoid print defects, an optimal feeding-stop position can be smoothly and reliably found which provides both.

With the present embodiment in particular, the feeding-stop position is decided using a correlation table stored and held in the RAM 117. It is possible to smoothly and reliably find a feeding-stop position (stop period) that is appropriate and provides both the ability to ensure good communication and the ability to avoid print defects by using data which is a numerical expression of a correlation related to communication determination results, printing determination results, and scores in the table.

With the present embodiment in particular, scores are calculated for each feeding-direction position along the tag label tape 109 with print during a preparatory process before executing printing to the print area S by the print head 23 and information transmission/reception with the RFID circuit element To by the loop antenna LC. Calculating all the scores for the various feeding positions (feeding timings) ahead of time before executing printing or transmission/reception for producing RFID labels makes it possible to decide the feeding-stop position quickly, as the amount of computation for deciding the feeding-stop position performed during a communication error can be minimized.

In addition to the above embodiment, various modifications may be made according to the present embodiment without departing from the spirit and scope of the present invention. Description will be made below regarding such modifications.

(1) Calculating Scores After the Occurrence of a Communication Error

With the present embodiment, scores are calculated for each feeding-direction position along the tag label tape 109 with print during a preparatory process before executing printing to the print area S by the print head 23 and information transmission/reception with the RFID circuit element To by the loop antenna LC, but this is not a limitation. Namely, it is also possible to calculate scores after an error occurs.

FIG. 34 is a flowchart showing a control procedure executed by a control circuit 110' (not shown) of the present modification. In FIG. 34, the difference with the flowchart shown in FIG. 29 described above is the addition of step S700. In other words, in step S230, a determination is made as to whether or not the information transmission/reception step S400 was successful, and if information transmission/reception wasn't successful, the flow moves to step S700, and a scores are calculated for each feeding-direction position along the tag label tape 109 with print as in step S175 described above (note however that in this case these are positions in the feeding-direction position after the occurrence of an error). Subsequently, in step S235, the feeding-stop position is decided with the highest score for the various feeding-direction positions along the tag label tape 109 with print after communication fails based on the calculation results of these scores. Note that all other procedures are the same as those in the flowchart shown in above-described FIG. 29, and descriptions thereof are omitted.

With the present modification, as in the embodiment above, a label production process can be performed with high efficiency while preventing the occurrence of print defects on label surfaces.

(2) Finishing Computation when a Score that Satisfies Predetermined Conditions is Found In modification (1) above, calculation of scores for all feeding-direction positions on the tag label tape 109 with print after the occurrence of an error are calculated after a communication error occurs, but this is not a limitation. In other words, it is also possible, for example, to finish computing when a score that satisfies predetermined conditions is found.

FIG. 35 is a flowchart showing a detailed procedure for step S700' executed by a control circuit 110" (not shown) in the present modification. Note that the procedure for the long print label producing process performed by the control circuit 110" is the same as that in the flowchart shown in FIG. 34 for modification (1), and a description is therefore omitted.

In FIG. 35, first, in step S710, an operator n indicating a feed-direction position of the tag label tape 109 with print is reset to 1.

Subsequently, in step S720, a score at a position where n=1 is calculated based on the table shown in FIG. 28C described above. Note that the position where n=1 indicates a feeding position of the tag label tape 109 with print at the moment a communication error occurs, and with each increment of n by 1, the position shifts by a unit of the feeding-direction position determined ahead of time (e.g., several dots) towards the front of the tag label tape 109 with print in the feeding direction.

Subsequently, in step S730, a determination is made as to whether or not the score thus calculated is greater than or equal to a predetermined threshold value. This threshold value is set appropriately ahead of time to a value such that the feeding-stop position is settable while satisfying predetermined conditions, and stored in memory (e.g., in the RAM 117, etc.). If the score is smaller than the threshold value, the determination is not satisfied, the flow moves to step S740, 1 is added to the operator n, and the flow returns to step S720. The score at the position corresponding to n+1 is calculated. On the other hand, if the score is greater than or equal to the threshold value, the determination is satisfied, and the routine is ended.

In this way, with the present modification, if the calculated score is greater than or equal to the threshold value, other computations are canceled. Thus, processing efficiency can be improved, as computation can be ended faster than if all the scores are calculated as in modification (1).

Note that, as in modification (1), the above description was given using as an example a case in which scores are calculated after the occurrence of a communication error, but, like in the above embodiment, this modification may also be applied to a situation in which scores are calculated during the preparatory process before executing printing and information transmission/reception. Thus, processing efficiency can be improved in this case too, as computation can be ended faster than if all the scores are calculated as in the embodiment described above.

(3) Not Performing Tape Bonding

Namely, instead of printing on the cover film 103 separately and then bonding it to the base tape 101 provided with the RFID circuit elements To, as described in the embodiment above, this is a case applied to a cartridge for a tag label producing apparatus for printing directly on cover film provided to tag tape.

FIG. 36 is a plan view illustrating in detail the structure of a cartridge 7' of the present modification, and corresponds to the aforementioned FIG. 4. Note that the parts identical to those in FIG. 4 are denoted using the same reference numerals, and descriptions thereof will be suitably omitted.

In FIG. 36, the cartridge 7' has a first roll 102' around which is wound a thermal tape 101' and a feeding roller 27' for feeding the thermal tape 101' in a direction out of the cartridge 7'.

The first roll 102' stores, in a manner such that it is wound around a reel member 102a', the strip transparent thermal tape 101', which has a structure in which a plurality of the RFID circuit elements To are serially formed along the longitudinal direction. The reel member 102a' is rotationally inserted and housed in a boss 95 established on the bottom of the cartridge 7'.

The thermal tape 101' wound around the first roll 102' has a three-layer structure in this example (see the partially enlarged view of FIG. 36), comprising a cover film 101a' formed of PET (polyethylene terephthalate) or the like having a thermal recording layer on the surface, an adhesive layer 101b' (adhesive layer) formed of a suitable adhesive material, and a separation sheet 101c'. The three layers of the thermal tape 101' are layered in that order from the side rolled to the inside to the side corresponding to the opposite side.

The loop antenna 152 configured to transmit/receive information and constructed in a loop coil shape is provided on the back side of the cover film 101a' in an integrated manner in this example, and the IC circuit part 151 is formed so that it is connected to the loop antenna 152 (tag loop antenna), thereby forming an RFID circuit element To. The separation sheet 101c' is affixed to the cover film 10la' by the adhesive layer 101b' on the back side of the cover film 101a'. A predetermined identification mark PM (a black identification mark in this example; may be a hole that passes through the thermal tape 101' formed by laser processing, etc., similar to the above) for feeding control is established in a predetermined position (a position farther forward than the front head of the antenna 152 on the forward side of the feeding direction in this example) corresponding to each RF1D circuit element To on the front side of the separation sheet 101c', similar to the separation sheet 101d.

When the cartridge 7' is loaded to the cartridge holder 6 and the roller holder 25 is moved to the contact position from a distant location, the thermal tape 101' is brought between the print head 23 and the platen roller 26, and then between the feeding roller 27' and a sub-roller 28'. Then, the feeding roller 27', the sub-roller 28', and the platen roller 26 are synchronously rotated so as to feed out the thermal tape 101' from the first roll 102'.

The fed thermal tape 101' is supplied to the print head 23 on the downstream side of the feeding direction from an opening part 94 while guided to a substantially cylindrical shaped reel 92 rotatably inserted in a reel boss 91 established on the cartridge bottom. Power is supplied to the plurality of heating elements from the print-head driving circuit 120 (see FIG. 15), causing the print head 23 to print the label print R on the front side of the cover film 101a' of the thermal tap 101' so as to form a tag label tape 109' with print, which is subsequently discharged to outside the cartridge 7' from a discharging exit 96.

After the label tape 109' with print has been discharged to outside the cartridge 7', the IC circuit part 151 is accessed (subjected to information reading/writing) via the loop antenna LC described above. The subsequent feeding by the driving roller 51 and cutting by the cutting mechanism 15 may be sufficiently performed using the same methods as those of the above embodiments, and descriptions thereof will be omitted.

The half-cutting module 35 differs from that corresponding to the so-called laminated type described in FIG. 10, etc. That is, the configuration described in FIG. 10, etc., has the receptacle 36 on the side of the print head 23, and the half-cutter 34 on the side of the platen roller 26. This is a configuration for performing half-cutting from the side opposite the side corresponding to the separation sheet of the tape to be produced. Nevertheless, in a case where thermal tape is used as in the present modification (and, similarly, in a case where ink ribbon is used with a type in which laminating is not performed, which is described below using FIG. 48), the separation sheet is on the side opposite that of the laminated type. Thus, since sections other than the separation sheet are subjected to half-cutting, the layout of the receptacle 36 and the half-cutter 34 is opposite the above. That is, the half-cutter 34 is located on the side of the print head 23, and the receptacle 36 is located on the side of the platen roller 26.

In this example, to make the cartridge type information, etc., related to the cartridge 7' automatically detectable on the apparatus side, the cartridge RFID circuit element Tc in which information related to the cartridge 7' is stored is established on the wall surface 93 on the outer periphery of the cartridge 7. Further, an antenna AT configured to transmit/receive signals via non-contact wireless communication with the RFID circuit element Tc is provided on a side-wall part 6A opposite the RFID circuit element Tc of the cartridge holder 6.

While detailed drawings are omitted, in this modification, as in the embodiment described above, the distance L from the tape feeding direction front end position of the identification mark PM to the tape feeding direction front end of the RFID circuit element To of the thermal tape 101' is preset so that it is equivalent to the tape feeding direction distance Lo between the mark sensor 127 and the print head 23. As a result, by performing the same control behavior as was described using FIG. 21 to FIG. 25 in the above embodiments, the same effect as in the above embodiments can be achieved.

While in the configuration of the above modification printing is performed by using thermal tape as the tag tape, particularly by simply the heat generated by the print head 23 and not ink ribbon, etc., the present disclosure is not limited thereto, and printing may be performed using ordinary ink ribbon as in the case of the above embodiment 1.

FIG. 37 is a plan view illustrating in detail the structure of a cartridge 7" of such a modification, and corresponds to the above FIG. 36 and the aforementioned FIG. 4. Note that the parts identical to those in FIG. 36 and FIG. 4 are denoted using the same reference numerals, and descriptions thereof will be suitably omitted.

In FIG. 37, the cartridge 7" of the modification has a first roll 102" around which is wound a base tape 101".

The first roll 102" stores, in a manner such that it is wound around a reel member 102a", the strip transparent base tape 101", which has a structure in which a plurality of the RFID circuit elements To are serially formed along the longitudinal direction.

The base tape 101" wound around the first roll 102" has a three-layer structure in this example (see the partially enlarged view of FIG. 37), comprising a colored base film 101a" formed of PET (polyethylene terephthalate) or the like, an adhesive layer 101b" formed of a suitable adhesive material, and a separation sheet 101c". The three layers of the base tape 101" are layered in that order from the side rolled to the inside to the side corresponding to the opposite side.

The loop antenna 152 configured to transmit/receive information and constructed in a loop coil shape is provided on the back side of the base film 101a" in an integrated manner in this example, and the IC circuit part 151 is formed so that it is connected to the loop antenna 152, thereby forming an RFID circuit element To. The separation sheet 101c" is affixed to the base film 101a" by the adhesive layer 101b" on the back side of the base film 101a". A predetermined identification mark PM (a black identification mark in this example;

may be a hole that passes through the base tape 101" formed by laser processing, etc., similar to the above) is established in a predetermined position (a position farther forward than the front end of the antenna 152 on the forward side in the feeding direction in this example) corresponding to each RFID circuit element To on the front side of the separation sheet 101c", similar to the above.

When the cartridge 7" is loaded to the cartridge holder 6 and the roller holder 25 is moved to the contact position from a distant location, the base tape 101" and the ink ribbon 105 are brought between the print head 23 and the platen roller 26, and then between the feeding roller 27' and the sub-roller 28'. Then, the feeding roller 27', the sub-roller 28', and the platen roller 26 are synchronously rotated so as to feed out the base tape 101" from the first roll 102".

Meanwhile, at this time, the print-head driving circuit 120 (see FIG. 15) supplies power to the plurality of heating elements of the print head 23 so as to print the label print R corresponding to the stored information of the RFID circuit element To on the front surface of the base film 101a" of the base tape 101", thereby forming a tag label tape 109" with print, which is then discharged to outside the cartridge 7".

After the label tape 109' with print has been discharged to outside the cartridge 7", the IC circuit part 151 is accessed (performing information reading/writing) via the loop antenna LC described above. The subsequent feeding by the driving roller 51 and cutting by the cutting mechanism 15 may be sufficiently performed using the same methods as those of the above embodiment, and descriptions thereof will be omitted. Further, the half-cutting module 35 is the same as that of the modification of the above-described FIG. 47.

In this modification, as in the modification of FIG. 36, the distance L from the tape feeding direction front end position of the identification mark PM to the tape feeding direction front end of the RFID circuit element To of the base tape 101 is preset so that it is equivalent to the tape feeding direction distance Lo between the mark sensor 127 and the print head 23. As a result, by performing the same control behavior as was described using FIG. 21 to FIG. 25 in the above embodiment, the same effect as in the above embodiment can be achieved.

(4) Other

The above was described using as an example a case of deciding a feeding-stop position as a feeding-stop condition for stopping the feeding of the tag label tape 109 with print, but this is not a limitation, and it is also possible to decide, for example, a feeding-stop period.

In the above, information transmission/reception is performed after the tag label tape 109 with print arrives at a position at which the loop antenna LC is substantially opposite the RFID circuit element To, but this is not a limitation, and it is also possible to perform information transmission/reception before reaching this opposite position.

In the above, a table is stored ahead of time indicating a correlation among scores regarding the ability to ensure communication and scores regarding the ability to avoid print defects, and the feeding-stop position is decided by making calculations based on this table, but this is not a limitation, and it is possible to search for a desire stop position (e.g., a position corresponding to a score of 2.0, which the area A—white solid; see FIG. 28C) directly without using the table. In this case, as in modification (2), computation can be ended, for example, as soon as a position corresponding to a score of 2.0 (area A:—white solid) and a position corresponding to a score of 1.7 (area A:—black solid or area B:—white solid) are found.

In the above print scores were found based on four printed characters:—white solid, black solid, horizontal line, and diagonal/vertical line, but this is not a limitation. In other words, it is possible to make the printed characters narrower, such as, for example, by changing the print score depending on how many horizontal or diagonal/vertical lines there are in a relevant area, or changing the print score according to the thickness of the horizontal or diagonal/vertical lines in the corresponding area. Specifically, if, for example, there are two horizontal lines as shown by AAA in FIG. 21F described above, the print score is lower than if there is one horizontal line.

In the above, the position with the maximum overall score is automatically decided when a communication error occurs, but it is also possible to, for example, determine the seriousness of a print defect based on the maximum score by assigning a low seriousness if the maximum score is greater than or equal to a predetermined value and a high seriousness if the maximum score is less than a predetermined value. As a result, it is possible to, for example, notify the determination results of seriousness in order to prompt the user to make a determination about whether or not to control the feeding-stop position to be a position such that print defects do not occur, or having the user set a seriousness allowance ahead of time and not performing the above control if the seriousness is within that allowance. It is thus possible to improve the user's convenience, since processes can be performed in accordance with the seriousness, such as, for example, stopping feeding when a communication error occurs without performing the above control if the seriousness is low, instead of always performing the above control when a print defect occurs.

Further, while the above has been described in connection with an illustrative scenario in which the tag label tape 110 with print that had been printed and accessed (performed reading/writing) with the RFID circuit element To is cut by the cutter 15 so as to form the RFID label T, the present disclosure is not limited thereto. That is, in a case where a label mount (a so-called die cut label) separated in advance to a predetermined size corresponding to the label is continuously disposed on the tape fed out from the roll, the present disclosure invention may also be applied to a case where the label is not cut by the cutter 15 but rather the label mount (a label mount containing the accessed RFID circuit element To on which corresponding printing has been performed) only is peeled from the tape after the tape has been discharged from the discharging exit 16 so as to form the RFID label T.

Furthermore, while in the description above, a case where the tag tape is wound around a reel member so as to form a roll, and the roll is disposed within the cartridge 100, and hence the tag tape is fed out from the cartridge has been described as an example, the present invention is not limited thereto. For example, an arrangement can be made as follows. Namely, a long-length or rectangular tape or sheet (including tape cut to a suitable length after being supplied from a roll) in which at least one RFID circuit element To is disposed is stacked (laid flat and layered into a tray shape, for example) in a predetermined housing part so as to form a cartridge. The cartridge is then mounted to the cartridge holder provided to the tag label producing apparatus 2. Then, the tape or sheet is supplied or fed from the housing part, and printing or writing is performed so as to produce RFID labels.

Furthermore, a configuration wherein the above-described roll is directly removably loaded to the tag label apparatus 2 side, or a configuration wherein a long, flat paper-shaped or strip-shaped tape or sheet is moved one piece at a time from outside the tag label apparatus 2 by a predetermined feeder mechanism and supplied to within the tag label producing apparatus 1 are also possible. Additionally, the structure of the roll is not limited to a type that is removable from the tag label producing apparatus 2 main body, such as the cartridge 100, but rather the first roll 102 may be provided as a so-called installation type or an integrated type that is not removable from the apparatus main body side. In each of these cases as well, the same effect is achieved.

Note that the "Scroll ID" signal, the "Ping" signal, the "Erase" signal, the "Verify" signal, and the "Program" signal, among others, used in the above comply with specifications established by EPC global. EPC global is a nonprofit corporation co-established by EAN (European Article Number) International, which is an international distribution code organization, and the Uniform Code Council (UCC), which is an American distribution code organization. Note that any signals compliant with other standards can be employed as long as the signals provide the same functions.

Additionally, other than those previously described, approaches according to the respective embodiments and exemplary modifications may be utilized in combination as appropriate.

The invention claimed is:
1. A tag label producing apparatus comprising:
a printing device for printing to a predetermined print area of a tag medium or a print-receiving medium bonded thereto, wherein an RFID circuit element provided with an IC circuit part for storing information and an antenna for transmitting/receiving information is disposed in said tag medium;
a transmitting/receiving device for performing information transmission/reception in a non-contact manner with said RFID circuit element;
a feeding device for feeding said tag medium for said printing device to perform printing to said print area;
a coordination control portion for controlling in coordination operations of said feeding device, said transmitting/receiving device, and said printing device so that feeding of said feeding device and said information transmission/reception by said transmitting/receiving device are performed;
a success determining portion for determining whether or not information transmission/reception with said RFID circuit element by said transmitting/receiving device has succeeded; and
a decision portion for deciding a feeding-stop condition for stopping feeding of said feeding device based on a feeding condition for transmission/reception by said feeding device for information transmission/reception by said transmitting/receiving device, and a feeding-condition for printing by said feeding device for printing to said print area by said printing device; wherein:

said coordination control portion controls in coordination operations of said feeding device, said transmitting/receiving device, and said printing device so as to stop feeding of said feeding device based on said feeding-stop condition decided by said decision portion and to perform retry of said information transmission/reception by said transmitting/receiving device when said communication determining portion determines that said information transmission/reception has failed;

wherein the feeding-stop condition defines a stop position, whereat an overall determination of an ability for transmission/reception with said RFID circuit element by said transmitting/receiving device and for avoiding print defects is relatively good compared with other positions in a tape feeding direction; and wherein said overall determination is based on predetermined values for communication conditions and print conditions.

2. The tag label producing apparatus according to claim 1, wherein:

said decision portion comprises a print determining portion for determining whether or not a print defect has occurred in said print area of said printing device as said feeding-condition for printing, when said RFID circuit element has arrived at a predetermined position at which information transmission/reception with said transmitting/receiving device is possible, and feeding is stopped.

3. The tag label producing apparatus according to claim 2, wherein: said print determining portion determines seriousness of a print defect.

4. The tag label producing apparatus according to claim 2, wherein: said print determining portion determines whether a feeding-direction position when said printing device has stopped printing during feeding-stop period is within a non-print margin part located between printed characters or inside a printed visual object, within a print fill area of a predetermined size, in the middle of drawing a straight line extending in a feeding direction, or in the middle of drawing a diagonal straight line intersecting the feeding direction at a predetermined angle, in said print area.

5. The tag label producing apparatus according to claim 2, wherein: said decision portion comprises a communication determining portion for determining as said feeding-condition for transmission/reception whether or not a distance from said transmitting/receiving device to said RFID circuit element is less than or equal to a predetermined value or whether or not an electric field intensity of said transmitting/receiving device is greater than or equal to a predetermined value.

6. The tag label producing apparatus according to claim 5, wherein: said decision portion determines said feeding-stop condition based on a score connected with the overall determination of the ability for transmission/reception with said RFID circuit element by said transmitting/receiving device and for avoiding print defects.

7. The tag label producing apparatus according to claim 6, further comprising a first calculating portion for calculating and computing said score for each feeding timing after feeding is started by said feeding device, before executing printing by said printing device to said print area and information transmission/reception with said RFID circuit element by said transmitting/receiving device.

8. The tag label producing apparatus according to claim 6, further comprising a second calculating portion for calculating and computing said score for each feeding timing after feeding is started by said feeding device, after initiating, execution of printing by said printing device to said print area or information transmission/reception with said RFID circuit element by said transmitting/receiving device.

9. The tag label producing apparatus according to claim 7, wherein: said first calculating portion stops computing once said feeding timing is found in which a score satisfies a predetermined condition after initiating calculating, said score at each feed timing, and said decision portion sets said feed timing, as said feeding-stop condition, the feed timing being when the computation is stopped.

10. The tag label producing apparatus according to claim 8, wherein: said second calculating portion stops computing once said feeding timing is found in which a score satisfies a predetermined condition after initiating calculating said score at each feed timing, and said decision portion-sets said feed timing as said feeding-stop condition, the feed timing being when the computation is stopped.

11. A tag label producing apparatus comprising:

a printing device that performs print to a print area of a tag medium or a print-receiving medium bonded to said to medium, wherein an RFID circuit element provided with an IC circuit part for storing information and an antenna for transmitting/receiving information is disposed in said tag medium;

a feeding device that feeds said tag medium so that said printing device performs print to said print area;

a transmitting/receiving device that performs information transmission/reception with said RFID circuit element via wireless communication during a feeding of said tag medium by said feeding device and a. printing to said print area by said printing device;

a success determining portion that determines whether or not information transmission/reception with said RFID circuit element by said transmitting/receiving device has succeeded, during a feeding of said tag medium by said feeding device and a printing to said print area by said printing device;

a first feed control portion that controls said feeding device to stop the feeding and that controls said printing device to stop the printing to said print area, when said printing device is positioned at one of the location in a non-print margin part located between printed characters or inside a printed visual object in said print area, the location in a print fill area of a predetermined size in said print area, the location in the middle of drawing a straight line extending in a feeding direction in said print area, and the location in the middle of drawing a diagonal straight line intersecting the feeding direction at a predetermined angle in said print area, in the case that said success determining portion determines that the information transmission/reception has failed;

a transmitting/receiving control portion that controls said transmitting/receiving device to perform a re-trial of said information transmission reception when said feeding and said printing are stopped by the control of said first feed control portion; and a second feed control portion that controls said feeding device to re-start the feeding and that controls said printing device to re-start the printing to said print area from the condition that said printing device is positioned at one of the location in said non-print margin part, the location in said print fill area, the location in said middle of drawing a straight line, and the location in said middle of drawing a diagonal straight line, when the information transmission/reception is finished by said information transmitting/receiving control portion.

12. The tag label producing apparatus according to claim 11, further comprising:
- a print determining portion that determines as a feeding-stop condition for stopping the feeding practiced by said feeding device whether or not said printing device is positioned at one of the location in said non-print margin part, the location in said print till area, the location in said middle of drawing a straight line, and the location in said middle of drawing a diagonal straight line;
- a communication determining portion that determines as a feeding-stop condition for stopping, the feeding practiced by said feeding device whether or not a distance from said transmitting/receiving device to said RFID circuit element is less than or equal to a predetermined value or whether or not an electric field intensity of said transmitting/receiving device is greater than or equal to a predetermined value.

13. The tag label producing apparatus according to claim 12, wherein: said first feed control portion controls said feeding device to stop the feeding based on a score assigned connected with a content of a determination of said print determining portion and a content of a determination of said communication determining portion for determining said feeding-stop condition.

14. The tag label producing apparatus according to claim 13, further comprising a correlation storing device that stores a correlation of said content of the determination of said print determining, portion, said content of the determination of said communication determining portion, and said score corresponding to the contents, wherein; said first feed control portion controls said feeding device to stop the feeding based on said correlation stored in said correlation storing device.

15. The tag label producing apparatus according to claim 14, further comprising a first calculating portion that calculates and computes said score for each feeding timing after feeding is started by said feeding device, before executing printing by said printing device to said print area and information transmission/reception with said RFID circuit element by said transmitting/receiving device.

16. The tag label producing apparatus according to claim 13, further comprising a second calculating portion that calculates and computes said score for each feeding timing after feeding is started by said feeding device, after initiating execution of printing by said printing device to said print area or information/transmission reception with said RFID circuit element by said transmitting/receiving device.

17. The tag label producing apparatus according to claim 15, wherein; said first calculating portion stops computing once said feeding timing is found in which a score satisfies a predetermined condition after initiating calculating said score at each feed timing, and said first feed control portion controls said feeding device to stop the feeding at said feed timing being when the computation is stopped.

18. The tag label producing apparatus according to claim 16, wherein; said second calculating portion stops computing once said feeding timing is found in which a score satisfies a predetermined condition after initiating calculating said score at each feed timing, and said first teed control portion controls said feeding device to stop the feeding at said feed timing being when the computation is stopped.

* * * * *